(12) United States Patent
Samad et al.

(10) Patent No.: US 11,401,436 B2
(45) Date of Patent: Aug. 2, 2022

(54) METHOD OF MAKING UHMWPE HYBRID NANOCOMPOSITE COATING REINFORCED WITH NANOCLAY AND CARBON NANOTUBES

(71) Applicant: King Fahd University of Petroleum and Minerals, Dhahran (SA)

(72) Inventors: Mohammed Abdul Samad, Dhahran (SA); Muhammad Umar Azam, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 536 days.

(21) Appl. No.: 16/545,669

(22) Filed: Aug. 20, 2019

(65) Prior Publication Data
US 2020/0317946 A1 Oct. 8, 2020

Related U.S. Application Data

(60) Provisional application No. 62/829,296, filed on Apr. 4, 2019.

(51) Int. Cl.
*C09D 123/06* (2006.01)
*C08K 3/04* (2006.01)
*C08K 3/34* (2006.01)
*B05D 1/04* (2006.01)
*B05D 3/02* (2006.01)
*C09D 123/04* (2006.01)
*B05D 3/14* (2006.01)
*B05D 1/06* (2006.01)
*B82Y 30/00* (2011.01)

(52) U.S. Cl.
CPC .............. *C09D 123/06* (2013.01); *B05D 1/04* (2013.01); *B05D 1/06* (2013.01); *B05D 3/0218* (2013.01); *B05D 3/0254* (2013.01); *B05D 3/142* (2013.01); *C08K 3/041* (2017.05); *C08K 3/34* (2013.01); *C08K 3/346* (2013.01); *C09D 123/04* (2013.01); *B05D 2202/25* (2013.01); *B05D 2401/32* (2013.01); *B05D 2601/20* (2013.01); *B82Y 30/00* (2013.01); *C08K 2201/003* (2013.01); *C08K 2201/011* (2013.01); *C08L 2205/14* (2013.01); *C08L 2207/068* (2013.01)

(58) Field of Classification Search
CPC .......... B05D 1/04; B05D 1/06; B05D 3/0254; B05D 3/0218; B05D 2601/20; B05D 3/142; B05D 2202/25; B05D 2401/32; C09D 123/06; C09D 123/04; C08K 3/041; C08K 3/346; C08K 3/34; C08K 2201/003; C08K 2201/011; B82Y 30/00; C08L 2205/14; C08L 2207/068
See application file for complete search history.

(56) References Cited

U.S. PATENT DOCUMENTS

2018/0023246 A1 1/2018 Edwards et al.
2018/0363168 A1 12/2018 Zhang et al.

FOREIGN PATENT DOCUMENTS

CN 103044754 A 4/2013

OTHER PUBLICATIONS

Brandenburg, et al.; Influence of mixing in mechanical properties of clay and carbon nanotube and high density polyethylene; AIP Conference Proceedings 1593, 261; Feb. 17, 2015; 5 Pages.
Silva, et al.; Influence of Intercalation Methods in Properties of Clay and Carbon Nanotube and High Density Polyethylene Nanocomposites Materials Research 17(6); pp. 1628-1636; 2014; 9 Pages.
Wen, et al.; Friction wear behavior of coupling modified nano-montmorillonite/ultra high molecular weight polyethylene composites; Journal of the Chinese Ceramic Society 35(8); pp. 1040-1045; Aug. 2007; Abstract Only; 1 Page.
Azam, et al.; Tribological Evaluation of a UHMWPE Hybrid Nanocomposite Coating Reinforced With Nanoclay and Carbon Nanotubes Under Dry Conditions; Journal of Tribology, vol. 140; Sep. 2018; 9 Pages.
Azam, et al.; UHMWPE hybrid nanocomposite coating reinforced with nanoclay and carbon nanotubes for tribological applications under water with/without abrasives; Tribology International 124; pp. 145-155; 2018; 11 Pages.

*Primary Examiner* — Angela C Scott
(74) *Attorney, Agent, or Firm* — Oblon, McClelland, Maier & Neustadt, L.L.P.

(57) ABSTRACT

A method for forming a nanocomposite coating on a substrate is described. The nanocomposite substrate comprises polyethylene, functionalized carbon nanotubes, and nanoclay. The method may use microparticles of UHMWPE with functionalized carbon nanotubes and clay nanoplatelets to form a powder mixture, which is then applied to a heated substrate to form the nanocomposite coating. The nanocomposite coating may have a Vickers hardness of 10.5-12.5 HV and a debonding strength of at least 25 N.

20 Claims, 45 Drawing Sheets

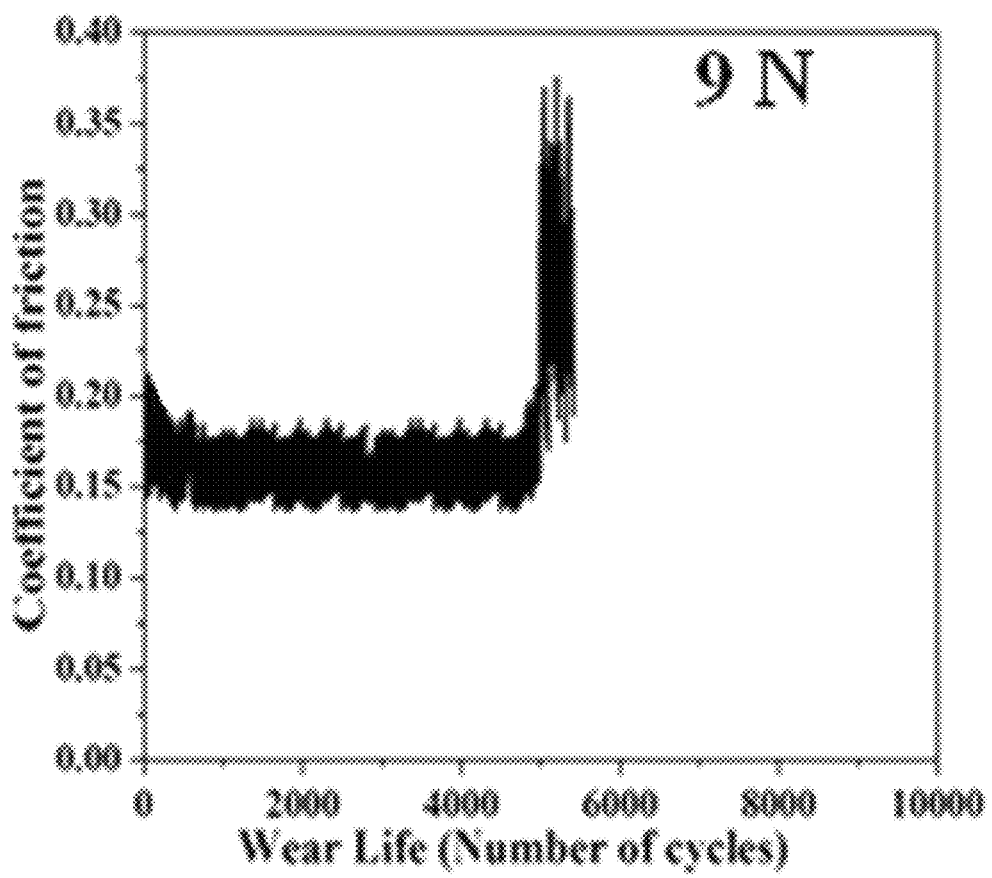
FIG. 5H
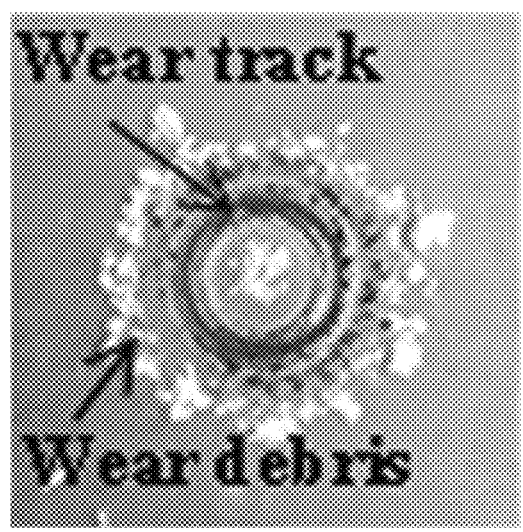 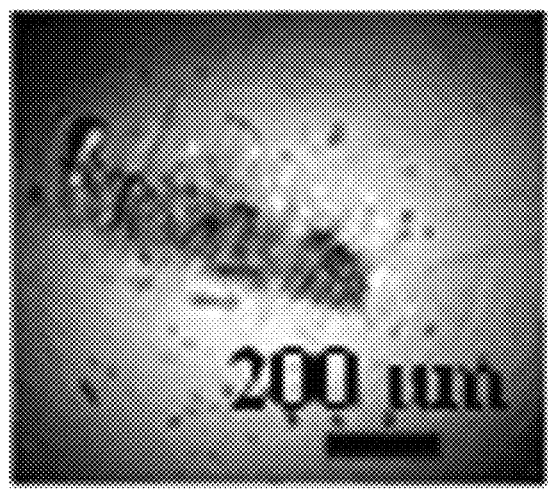
FIG. 5I             FIG. 5J

FIG. 6B    FIG. 6C

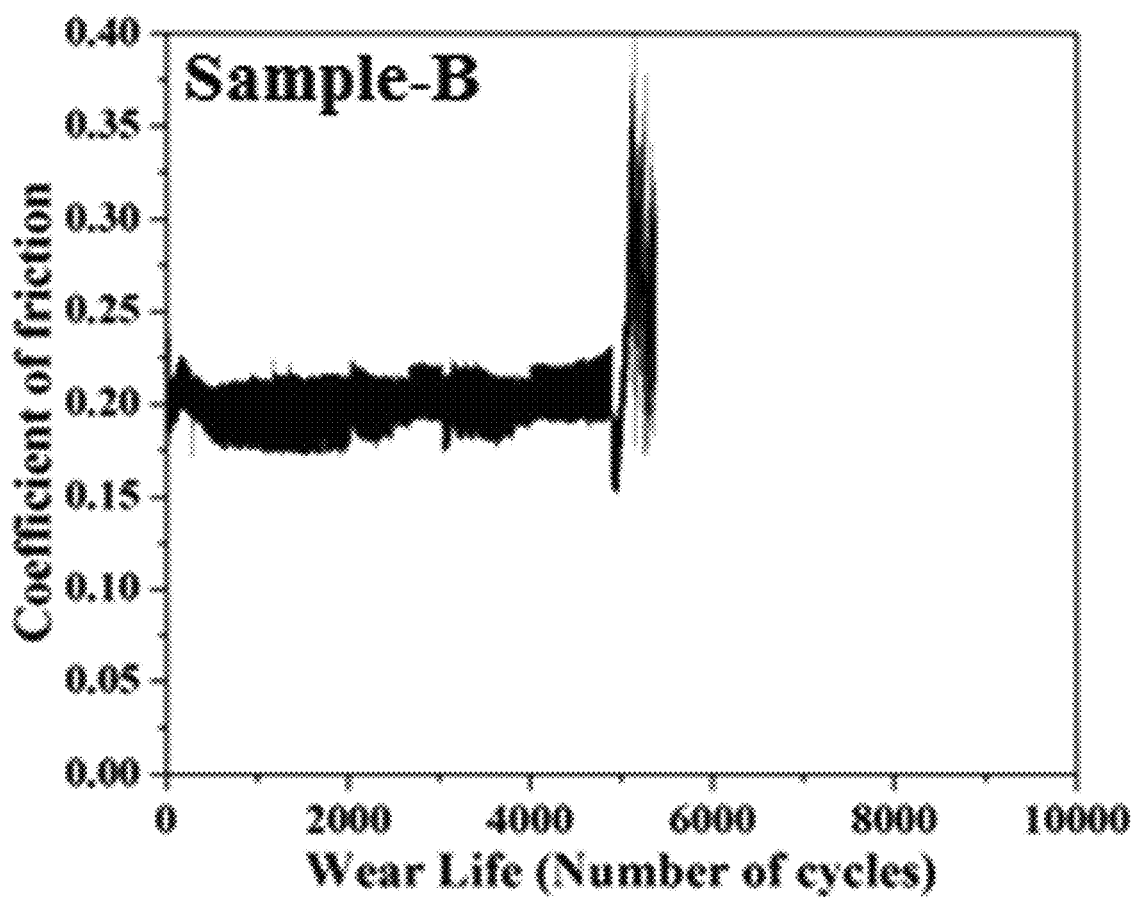
FIG. 8A
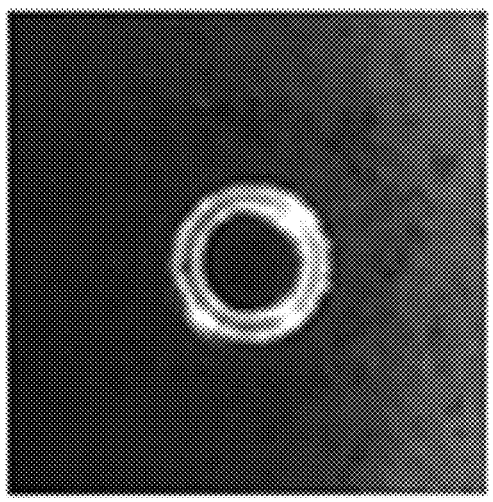
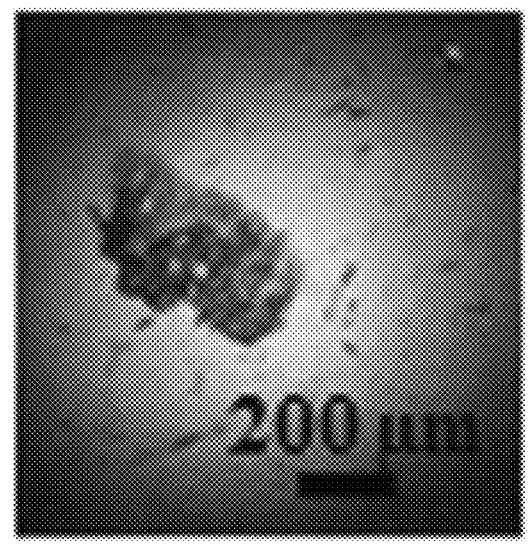
FIG. 8B  FIG. 8C

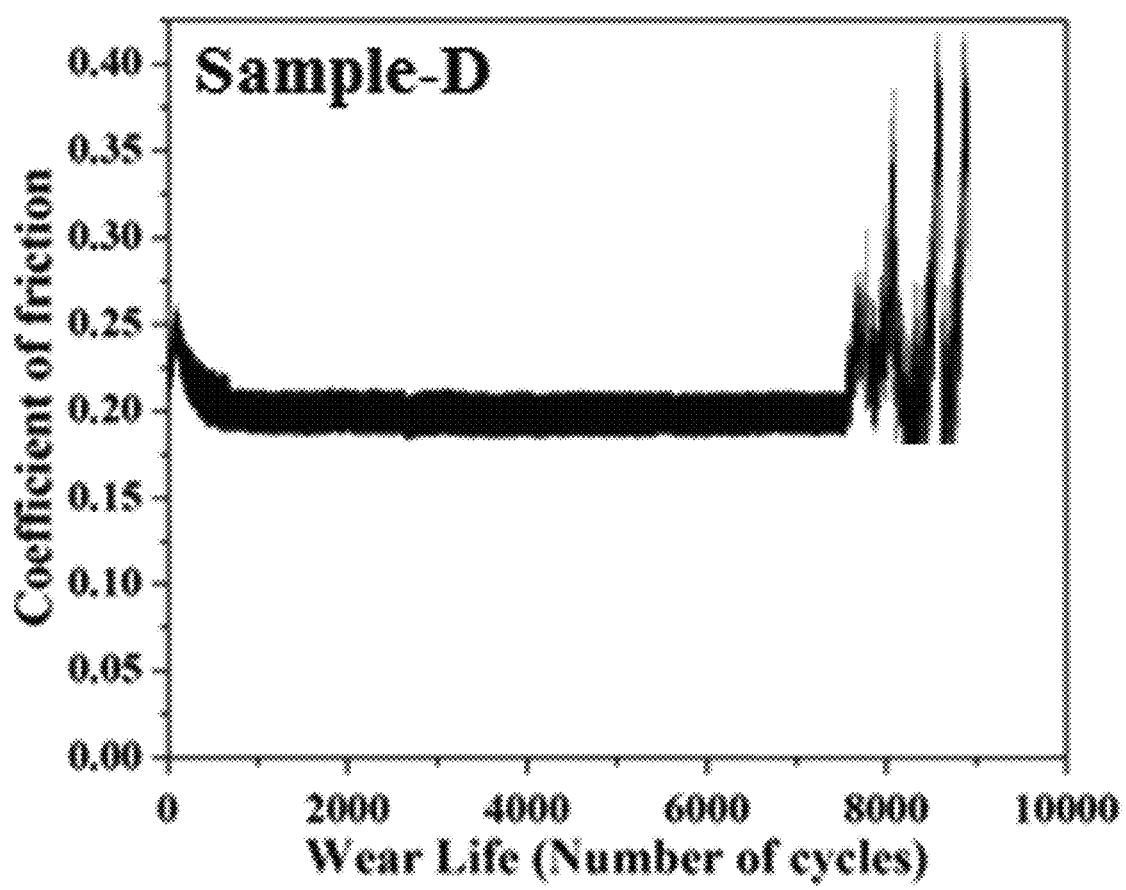
FIG. 8G
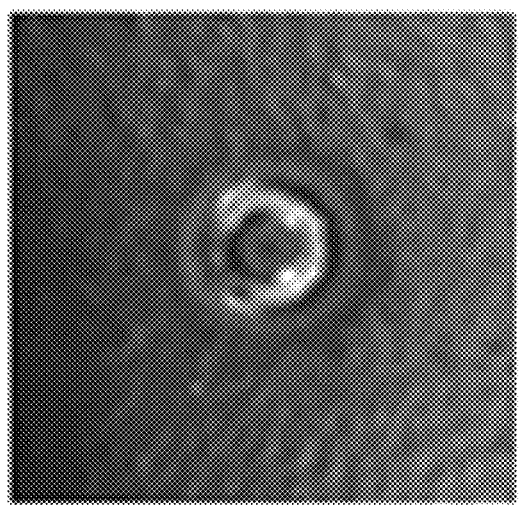 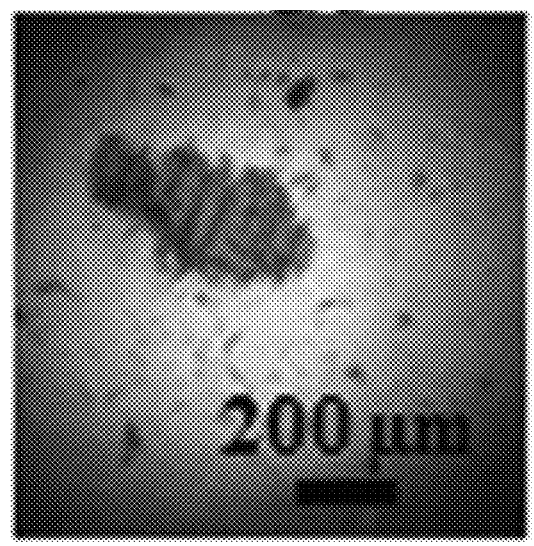
FIG. 8H    FIG. 8I

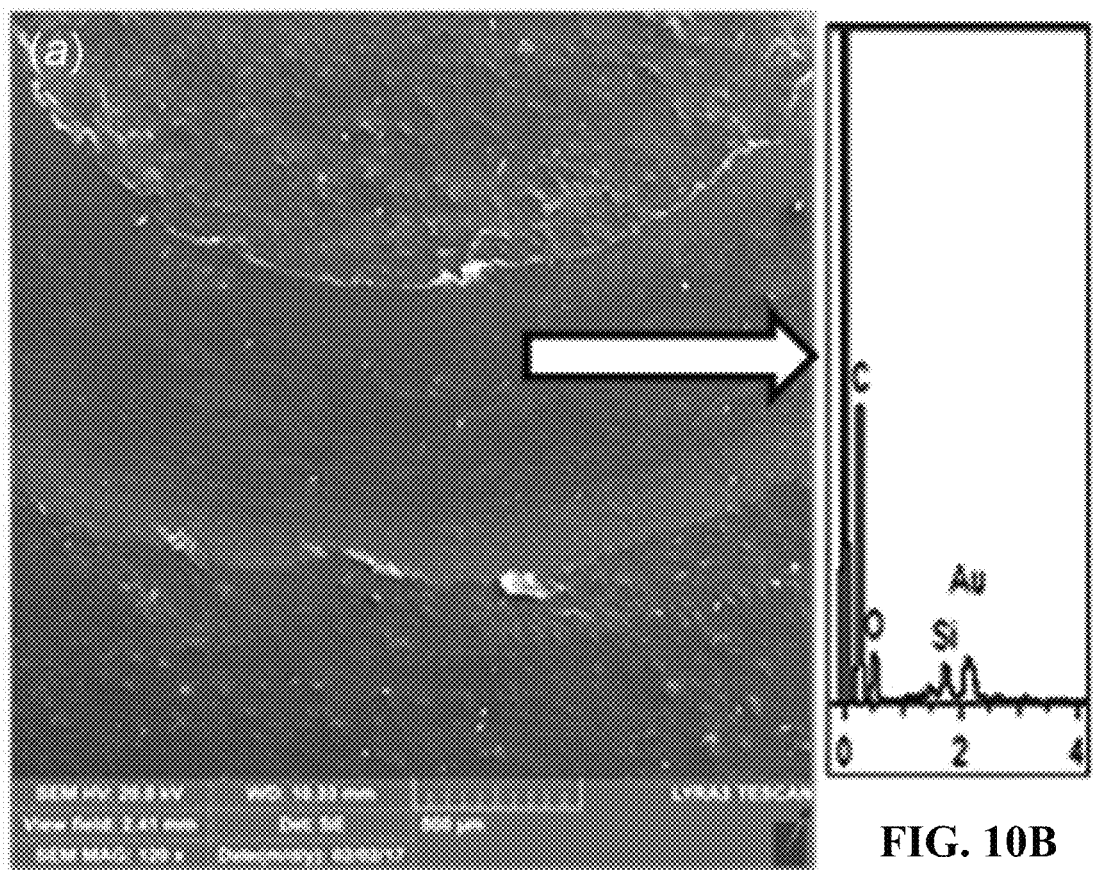
FIG. 10A
FIG. 10B
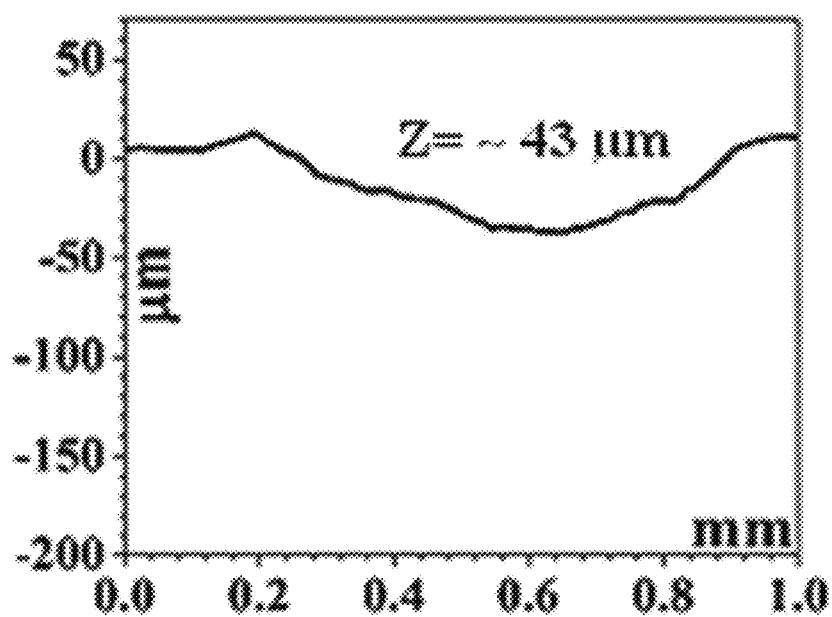
FIG. 10C

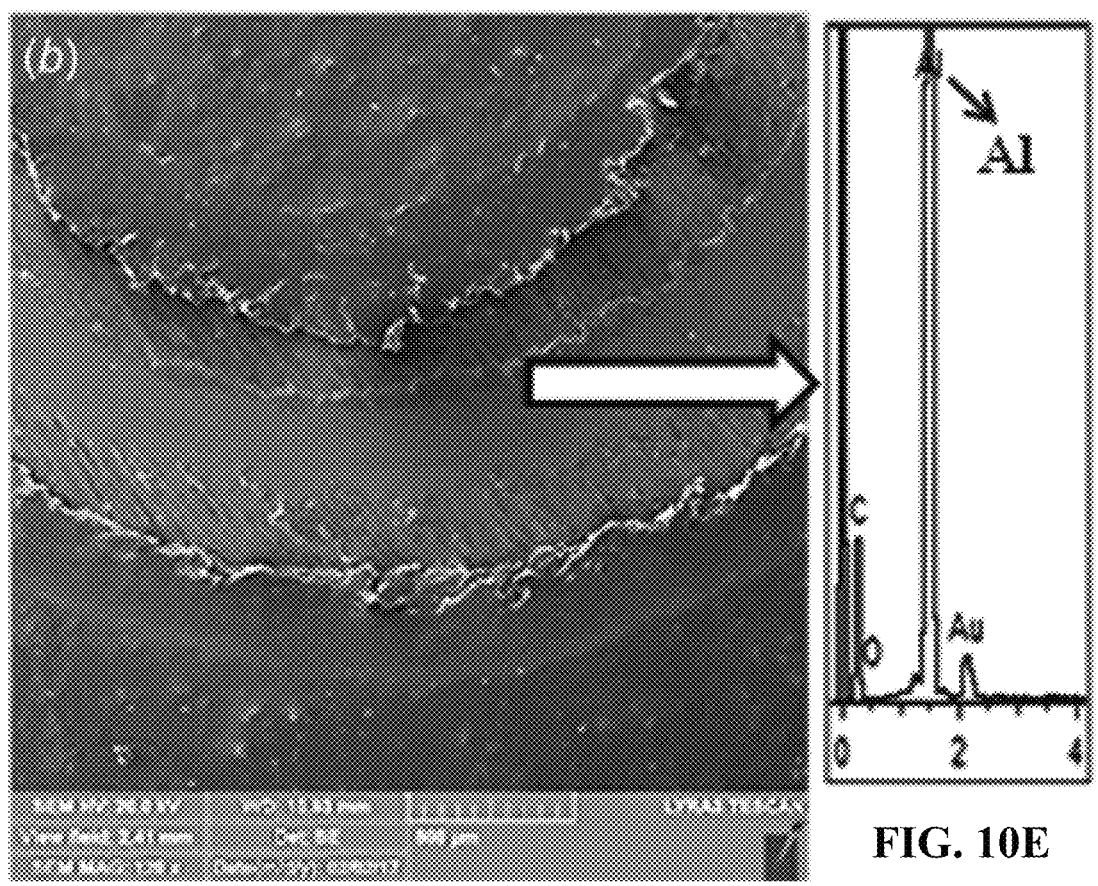
FIG. 10D
FIG. 10E
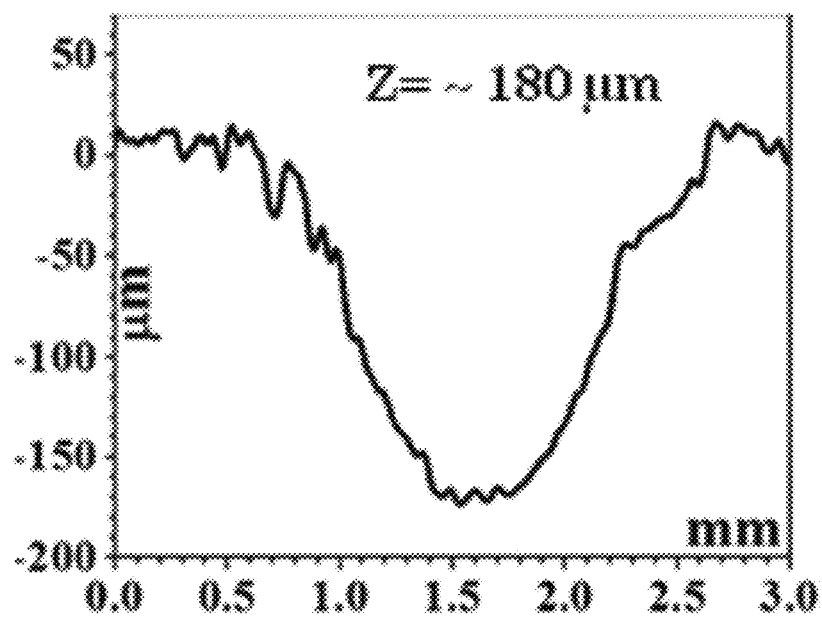
FIG. 10F

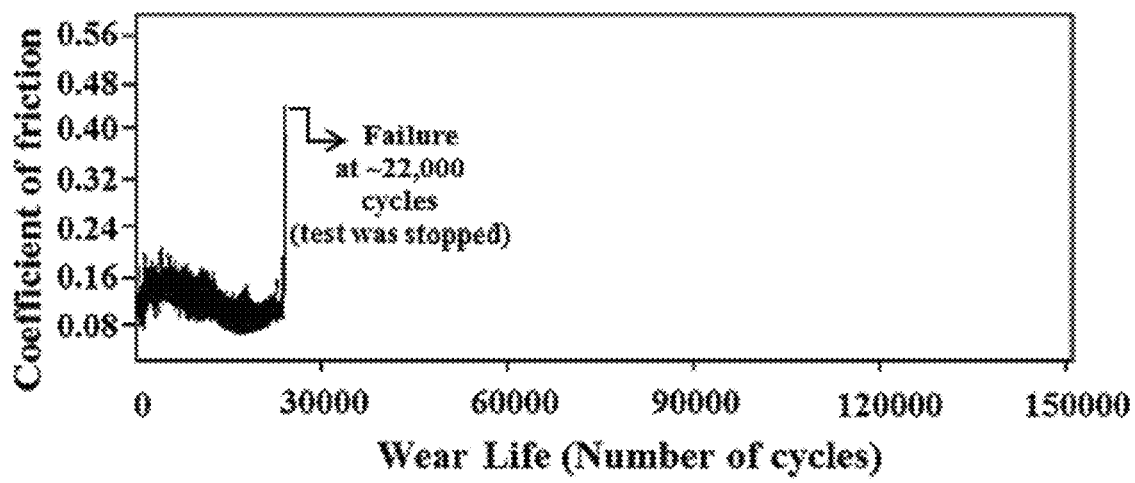
FIG. 18A
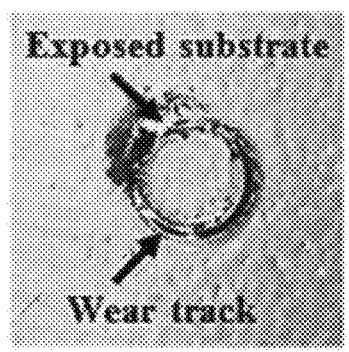 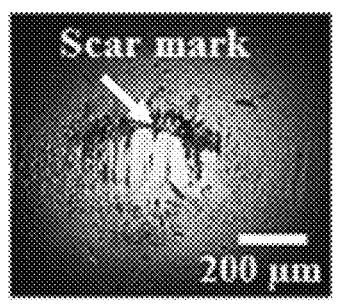
FIG. 18B  FIG. 18C

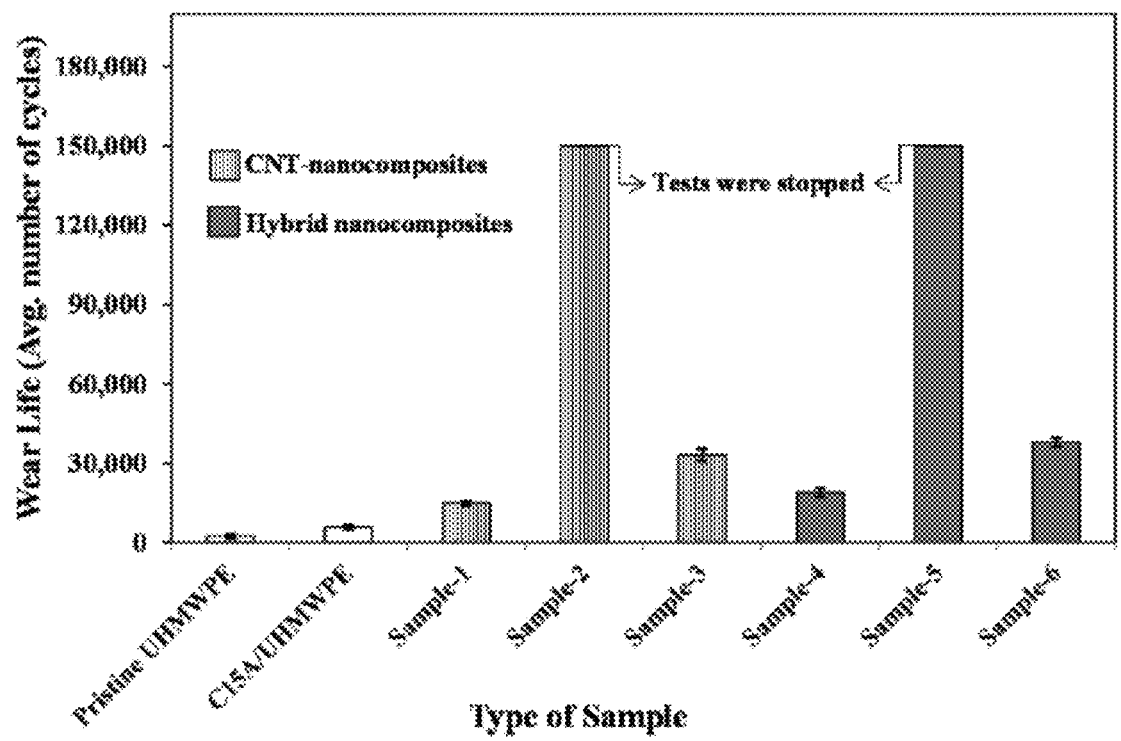
FIG. 19A
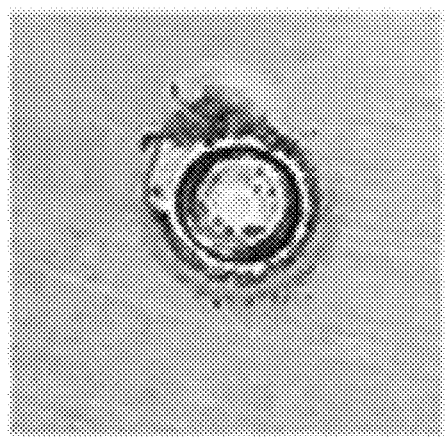 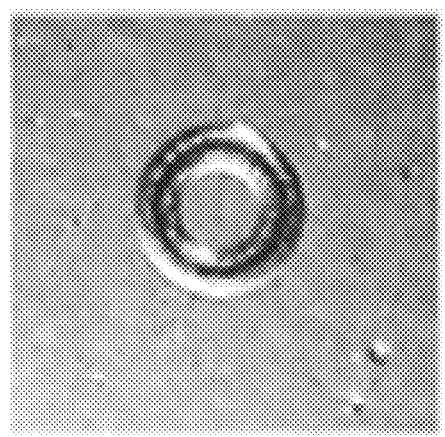
FIG. 19B            FIG. 19C

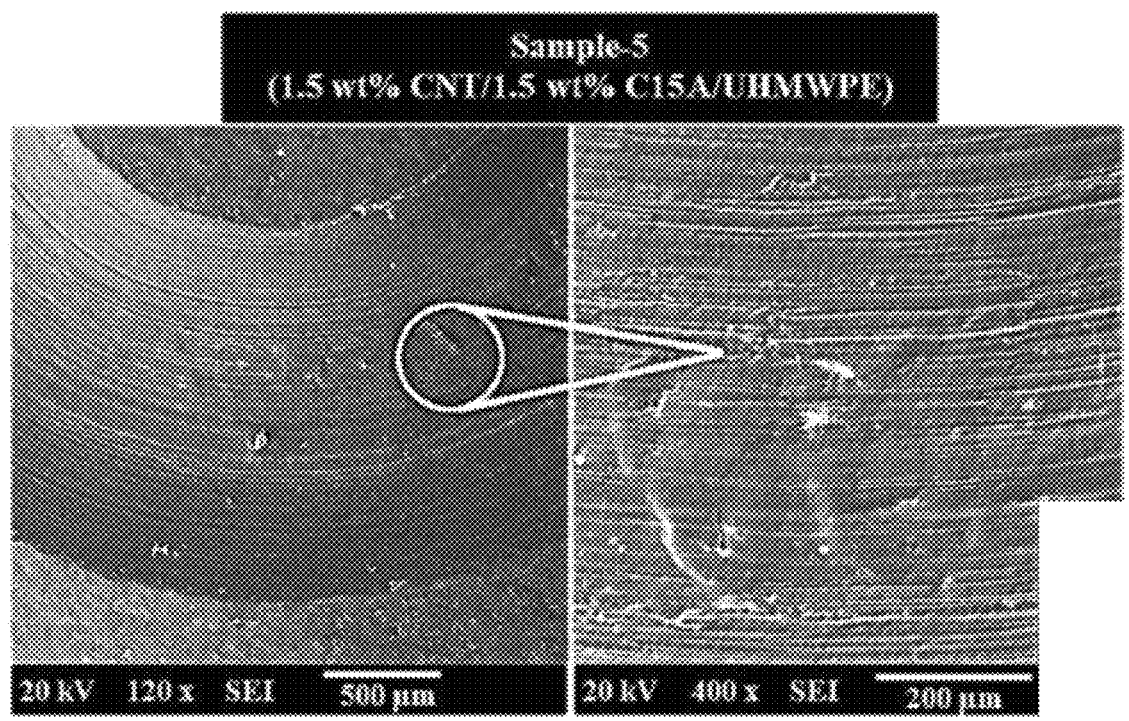
FIG. 21A          FIG. 21B
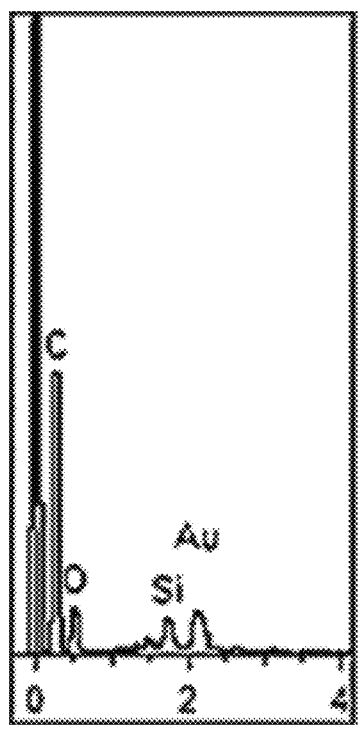       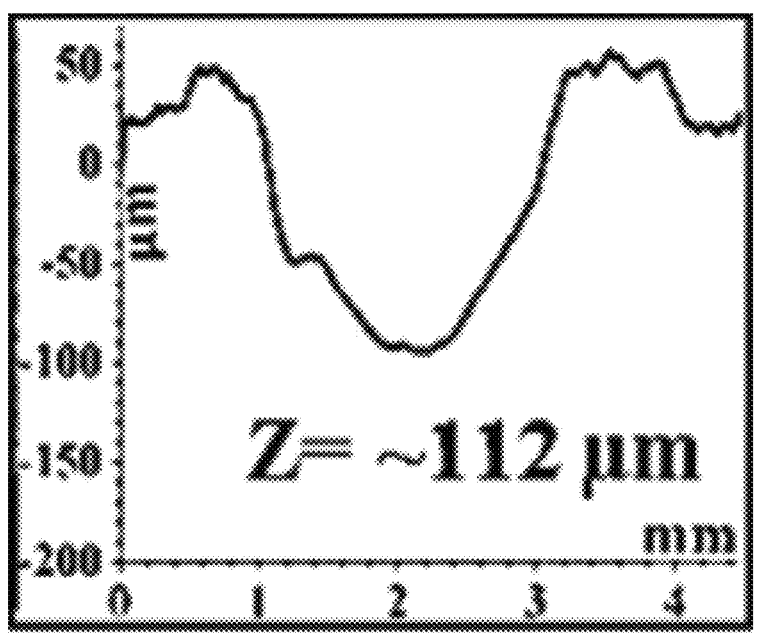
FIG. 21C          FIG. 21D

FIG. 25F   FIG. 25G   FIG. 25H

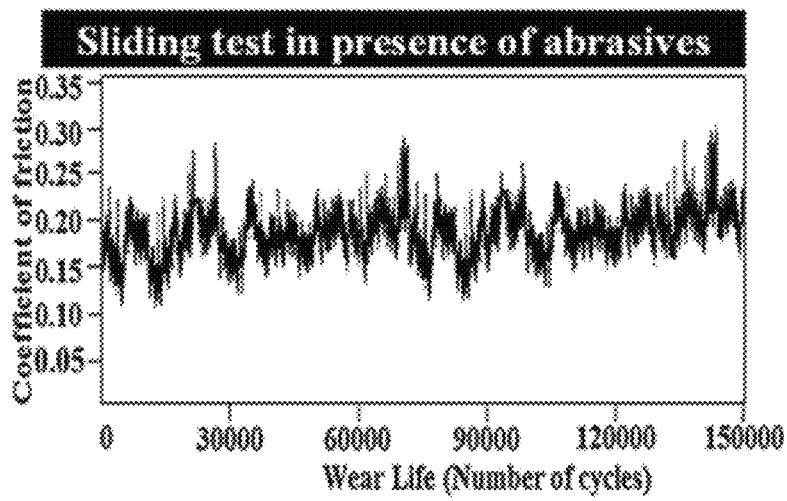
FIG. 25J
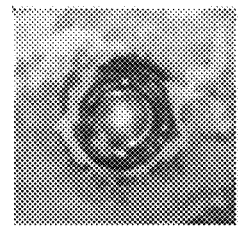
FIG. 25K
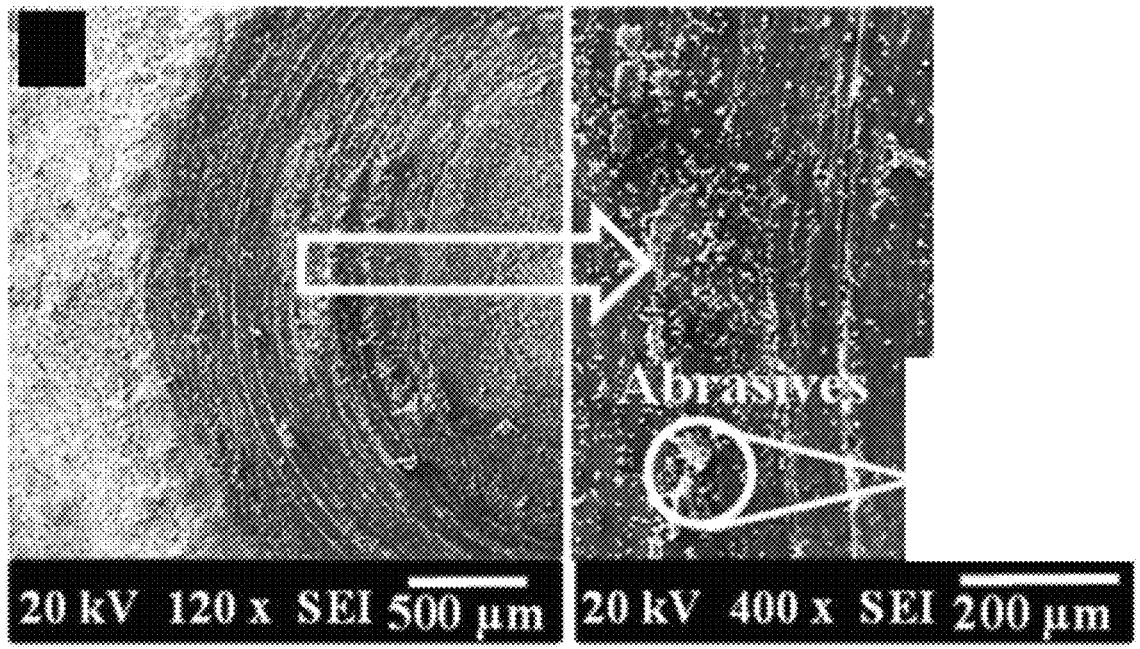
FIG. 25L  FIG. 25M

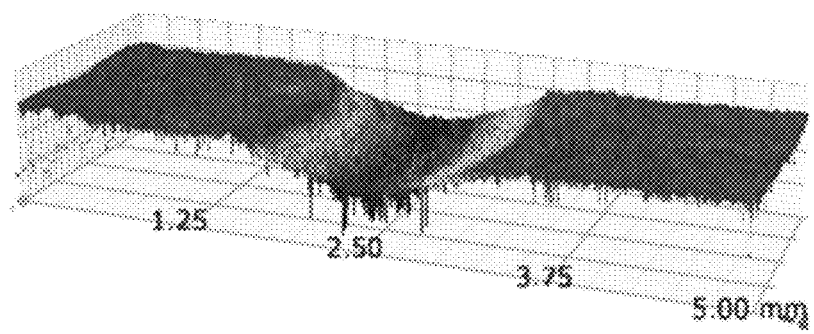
FIG. 25N
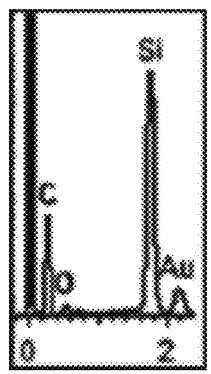     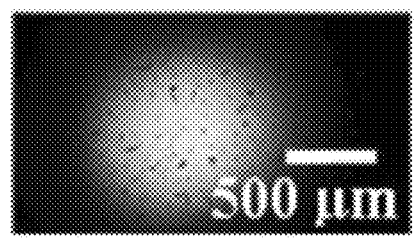     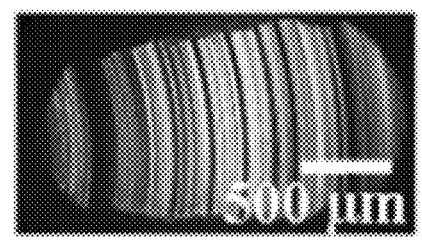
FIG. 25O     FIG. 25P     FIG. 25Q
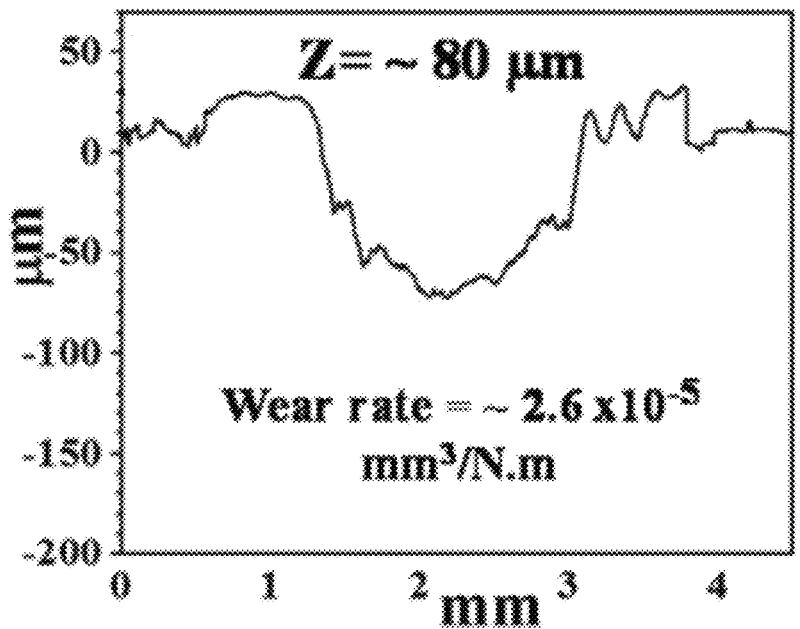     
FIG. 25R     FIG. 25S

METHOD OF MAKING UHMWPE HYBRID NANOCOMPOSITE COATING REINFORCED WITH NANOCLAY AND CARBON NANOTUBES

CROSS REFERENCE TO RELATED APPLICATIONS

This application claims the benefit of priority from U.S. Provisional Application No. 62/829,296 filed Apr. 4, 2019, which is incorporated herein by reference in its entirety.

STATEMENT REGARDING PRIOR DISCLOSURES BY THE INVENTORS

Aspects of this technology are described in the articles "Tribological Evaluation of a UHMWPE Hybrid Nanocomposite Coating Reinforced With Nanoclay and Carbon Nanotubes Under Dry Conditions" by Muhammad Umar Azam and Mohammed Abdul Samad, in *Journal of Tribology*, 140(5), 051304 (2018), DOI: 10.1115/1.4039956, and "UHMWPE hybrid nanocomposite coating reinforced with nanoclay and carbon nanotubes for tribological applications under water with/without abrasives," by Muhammad Umar Azam and Mohammed Abdul Samad, in *Tribology International*, 124 (2018) 145-155, DOI: 10.1016/j.triboint.2018.04.003. Each article is incorporated herein by reference in its entirety.

STATEMENT OF ACKNOWLEDGEMENT

This project was prepared through the Science & Technology Unit at King Fand University of Petroleum & Minerals (KFUPM): Project no. 12-ADV3036-04 with financial support from King Abdulaziz City for Science and Technology (KACST) as part of the National Science, Technology and Innovation Plan.

BACKGROUND OF THE INVENTION

Technical Field

The present invention relates to a method for forming a nanocomposite coating comprising nanoclay and functionalized carbon nanotubes in a polyethylene matrix

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the recent past, polymer coatings have been used as an alternative for lubricating and protecting metallic tribo-pairs due to their low cost, good tribological properties, and ability to be coated by using simple techniques. They have numerous tribological applications where friction and wear are major concerns regarding wear life of components. These applications include different types of bearings, bearing cages, biomedical implants, cams, valves, vacuum pumps, seals, automobile brake pads, etc. See Briscoe, B. J., and Sinha, S. K., 2013, "Chapter 1—Tribological Applications of Polymers and Their Composites—Past, Present and Future Prospects," *Tribology of Polymeric Nanocomposites*, 2nd ed., K. Friedrich and A. K. Schlarb, eds., Butterworth-Heinemann, Oxford, UK, pp. 1-22.

Ultrahigh molecular weight polyethylene (UHMWPE) is one of the most suitable polymers which can be used for coating purposes in tribological applications because of its unique properties such as low coefficient of friction (COF), high abrasion resistance, self-lubricity, high durability, and high impact resistance. See Stein, H. L., 1999, *Ultra High Molecular Weight Polyethylene (UHMWPE)*, Ticona LLC/ASM International, Materials Park, O H. However, it has some limitations such as low thermal properties, low load bearing capacity, and low Young's modulus. Various researchers have tried to improve the tribological, mechanical, and thermal properties of UHMWPE bulk by reinforcing with different nanofillers such as carbon nanotubes (CNTs), layered silicates, metal oxide nanoparticles, hydroxyapatite, and graphene oxide under dry sliding conditions. See Bakshi, S. R., Tercero, J. E., and Agarwal, A., 2007, "Synthesis and Characterization of Multiwalled Carbon Nanotube Reinforced Ultra-High Molecular Weight Polyethylene Composite by Electrostatic Spraying Technique," Compos. Part A, 38(12), pp. 2493-2499; Kumar, R. M., Kumar, S., Kumar, B. V. M., and Lahiri, D., 2015, "Effects of Carbon Nanotube Aspect Ratio on Strengthening and Tribological Behavior of Ultra-High Molecular Weight Polyethylene Composite," Compos. Part A, 76, pp. 62-72; Liu, P., White, K. L., Sugiyama, H., Xi, J., Higuchi, T., Hoshino, T., Ishige, R., Jinnai, R., Takahara, A., and Sue, H.-J., 2013, "Influence of Trace Amount of Well-Dispersed Carbon Nanotubes on Structural Development and Tensile Properties of Polypropylene," Macromolecules, 46(2), pp. 463-473; Chu, C.-C., White, K. L., Liu, P., Zhang, X., and Sue, H.-J., 2012, "Electrical Conductivity and Thermal Stability of Polypropylene Containing Disentangled Carbon Nanotubes," Carbon, 50(12), pp. 4711-4721; Mohammed, A. S., Ali, A. B., and Merah, N., 2017, "Evaluation of Tribological Properties of Organoclay Reinforced UHMWPE Nanocomposites," ASME J. Tribol., 139(1), p. 012001; Mohammed, A. S., Ali, A. B., and Merah, N., 2016, "Tribological Investigations of UHMWPE Nanocomposites Reinforced With Three Different Organo-Modified Clays," Polym. Compos., epub.; Plumlee, K., and Schwartz, C. J., 2009, "Improved Wear Resistance of Orthopaedic UHMWPE by Reinforcement With Zirconium Particles," Wear, 267(5-8), pp. 710-717; Alam, F., Kumar, A., Patel, A. K., Sharma, R. K., and Balani, K., 2015, "Processing, Characterization and Fretting Wear of Zinc Oxide and Silver Nanoparticles Reinforced Ultra-High Molecular Weight Polyethylene Biopolymer Nanocomposite," J. Miner. Met. Mater. Soc., 67(4), pp. 688-701; Mirsalehi, S. A., Khavandi, A., Mirdamadi, S., Naimi-Jamal, M. R., and Kalantari, S. M., 2015, "Nanomechanical and Tribological Behavior of Hydroxyapatite Reinforced Ultrahigh Molecular Weight Polyethylene Nanocomposites for Biomedical Applications," J. Appl. Polym. Sci., 132(23), pp. 1-11; Tai, Z., Chen, Y., An, Y., Yan, X., and Xue, Q., 2012, "Tribological Behavior of UHMWPE Reinforced With Graphene Oxide Nanosheets," Tribol. Lett., 46(1), pp. 55-63; and Bhattacharyya, A., Chen, S., and Zhu, M., 2014, "Graphene Reinforced Ultra-High Molecular Weight Polyethylene With Improved Tensile Strength and Creep Resistance Properties," Express Polym. Lett., 8(2), pp. 74-84.

In terms of UHMWPE-based nanocomposite coatings, researchers used CNTs, graphene, nano-alumina, nanosilica, and nanoclay in UHMWPE matrix to enhance the above-mentioned properties. See Mohammed, A. S., and Fareed, M. I., 2016, "Improving the Friction and Wear of Poly- Ether-Etherketone (PEEK) by Using Thin Nano-Composite Coatings," Wear, 364-365, pp. 154-162; Samad, M. A., and Sinha, S. K., 2011, "Mechanical, Thermal and Tribological Characterization of a UHMWPE Film Reinforced With Carbon Nanotubes Coated on Steel," Tribol. Int., 44(12), pp. 1932-1941; Chih, A., Ansón-Casaos, A., and Pu_ertolas, J. A., 2017, "Frictional and Mechanical Behaviour of Graphene/UHMWPE Composite Coatings," Tribol. Int., 116, pp. 295-302; Ravi, K., Ichikawa, Y., Ogawa, K., Deplancke, T., Lame, O., and Cavaille, J. Y., 2016, "Mechanistic Study and Characterization of Cold-Sprayed Ultra-High Molecular Weight Polyethylene-Nano-Ceramic Composite Coating," J. Therm. Spray Technol., 25(1-2), pp. 160-169; and Azam, M. U., and Samad, M. A., 2018, "A Novel Organoclay Reinforced UHMWPE Nanocomposite Coating for Tribological Applications," Prog. Org. Coat., 118, pp. 97-107.

However, there is still room to further improve the properties of these polymer nanocomposites and their use as coatings. In the recent past, a great amount of interest has been generated by a new approach, which is the development of hybrid nanocomposites in the bulk form or coatings. A hybrid nanocomposite or a hybrid nanocomposite coating is a new emerging approach of reinforcing any parent matrix with two or more nanofillers to take advantage of the individual properties of each nanofiller.

Hence, efforts are being made to develop polymer-based hybrid nanocomposite coatings and films to obtain synergic benefits in various fields such as in thermal, optical, anticorrosion, and electronic applications. In the field of tribology, various researchers developed bulk hybrid nanocomposites for better tribological properties. See Gbadeyan, O. J., and Kanny, K., 2018, "Tribological Behaviours of Polymer-Based Hybrid Nanocomposite Brake Pad," ASME J. Tribol., 140(3), p. 032003; Ali, A. B., Mohammed, A. S., and Merah, N., 2017, "UHMWPE Hybrid Nanocomposites for Improved Tribological Performance Under Dry and Water-Lubricated Sliding Conditions," Tribol. Lett., 65(3), pp. 1-10; and Shen, X., Pei, X., Liu, Y., and Fu, S., 2014, "Tribological Performance of Carbon Nanotube—Graphene Oxide Hybrid/Epoxy Composites," Compos. Part B, 57, pp. 120-125. However, no effort was made to develop a hybrid nanocomposite coating by adding "two different nanofillers" for improvement in tribological and mechanical properties.

Hence, the aim of the present disclosure is to develop and characterize the tribological performance of a novel hybrid nanocomposite coating of UHMWPE reinforced with nanoclay (C15A) and CNTs under dry conditions for better mechanical and tribological properties. Nanoclay, also known as layered silicates, is selected as one of the nanofillers to enhance the mechanical and tribological properties. Various researchers have enhanced barrier properties, mechanical properties, tribological properties, anticorrosion properties, and thermal properties of polymer coatings such as vinyl ester coating, epoxy coating, and acrylonitrile coating by reinforcing them with nanoclay. See Liu, M., Zhu, H., Siddiqui, N. A., Leung, C. K. Y., and Kim, J., 2011, "Glass Fibers With Clay Nanocomposite Coating: Improved Barrier Resistance in Alkaline Environment," Compos. Part A, 42(12), pp. 2051-2059; Kowalczyk, K., and Spychaj, T., 2008, "Epoxy Coatings With Modified Montmorillonites," Prog. Org. Coat., 62(4), pp. 425-429; Golgoon, A., Aliofkhazraei, M., Toorani, M., Moradi, M. H., and Rouhaghdam, A. S., 2015, "Corrosion and Wear Properties of Nanoclay-Polyester Nanocomposite Coatings Fabricated by Electrostatic Method," Procedia Mater. Sci., 11, pp. 536-541; and Yeh, J. M., Liou, S. J., Lu, H. J., and Huang, H. Y., 2004, "Enhancement of Corrosion Protection Effect of Poly(Styrene-Co-Acrylonitrile) by the Incorporation of Nanolayers of Montmorillonite Clay Into Copolymer Matrix," J. Appl. Polym. Sci., 92(4), pp. 2269-2277.

The selection of the second nanofiller as carbon nanotubes (CNTs) is based on various studies whereby CNTs helped in improving the mechanical/tribological properties of polymers in general and UHMWPE in particular. See previously-cited references Bakshi et al. (2007); Kumar et al. (2015); Liu et al. (2013); Chu et al. (2012); Mohammed et al. (2016); Samad et al. (2011); Gbadeyan, O. J., Kanny, K., and Pandurangan, M. T., 2017, "Tribological, Mechanical, and Microstructural of Multiwalled Carbon Nanotubes/Short Carbon Fiber Epoxy Composites," ASME J. Tribol., 140(2), p. 022002; May-Pat, A., Aviles, F., Toro, P., Yazdani-Pedram, M., and Cauich-Rodriguez, J. V., 2012, "Mechanical Properties of PET Composites Using Multiwalled Carbon Nanotubes Functionalized by Inorganic and Itaconic Acids," Express Polym. Lett., 6(2), pp. 96-106; and Wu, C. S., and Liao, H. T., 2017, "Interface Design of Environmentally Friendly Carbon Nanotube-Filled Polyester Composites: Fabrication, Characterisation, Functionality and Application," Express Polym. Lett., 11(3), pp. 187-198.

Polymer and polymer composite coatings are extensively used in demanding tribological applications to protect metallic components from wear and tear under different environments. However, limitations such as low strength, low load bearing capacity, low thermal stability and water absorption issues have hindered the use of these polymer coatings to their full potential.

With the advent of materials such as carbon nanotubes (CNTs), graphene, nanoclays etc. which can be used as reinforcements, a new class of materials called polymer nanocomposites have been developed in bulk and in the form of coatings or films with enhanced mechanical, thermal, and tribological properties. See Ali A B, Samad M A, Merah N. Tribological investigations of UHMWPE nanocomposites reinforced with three different organo-modified clays. Polym Compos 2016. http://dx.doi.org/10.1002/pc.24186; Golchin A, Wikner A, Emami N. An investigation into tribological behaviour of multi-walled carbon nanotube/graphene oxide reinforced UHMWPE in water lubricated contacts. Tribol Int 2016; 95:156-61; Lahiri D, Hec F, Thiesse M, Durygin A, Zhang C, Agarwal A. Nanotribological behavior of graphene nanoplatelet reinforced ultra high molecular weight polyethylene composites. Tribol Int 2014; 70:165-9; Kalin M, Zalaznik M, Novak S. Wear and friction behaviour of poly-ether-etherketone (PEEK) filled with graphene, WS2 and CNT nanoparticles. Wear 2015; 332-333:855-62; Zhang G, Wetzel B, Wang Q. Tribological behavior of PEEK-based materials under mixed and boundary lubrication conditions. Tribol Int 2015; 88:153-61; Zhang L, Zhang G, Chang L, Wetzel B, Jim B, Wang Q. Distinct tribological mechanisms of silica nanoparticles in epoxy composites reinforced with carbon nanotubes, carbon fibers and glass fibers. Tribol Int 2016; 104:225-36; Samad M A, Sinha S K. Mechanical, thermal and tribological characterization of a UHMWPE film reinforced with carbon nanotubes coated on steel. Tribol Int 2011; 44(12):1932-41; Bakshi S R, Tercero J E, Agarwal A. Synthesis and characterization of multiwalled carbon nanotube reinforced ultrahigh molecular weight polyethylene composite by electrostatic spraying technique. Composites Part A Appl Sci Manuf 2007; 38(12):2493-9; Samad M A, Sinha S K. Nanocomposite UHMWPE-CNT polymer coatings for boundary lubrication on aluminium substrates. Tribol Lett 2010; 38(3):301-11; Kowalczyk K, Spychaj T. Epoxy coatings with modified montmorillonites. Prog Org Coating 2008; 62(4):425-9; Golgoon A, Aliofkhazraei M, Toorani M, Moradi M H, Rouhaghdam A S. Corrosion and wear properties of nanoclay-polyester nanocomposite coatings fabricated by electrostatic method. Procedia Mater Sci 2015; 11:536-41; and Zhang H, Zhang H, Tang L, Zhang Z, Gu L, Xu Y, et al. Wear-resistant and transparent acrylate-based coating with highly filled nanosilica particles. Tribol Int 2010; 43:83-91.

Nanocomposites are a novel class of materials which have the advantage of exhibiting excellent properties as compared to conventional composites due to the very high surface to volume ratio and very high aspect ratios of certain nanofillers used as reinforcements. Hence, these polymer nanocomposites in the form of bulk molds or coatings are replacing metals and metallic/ceramic coatings in various demanding tribological applications (e.g. bearings) under dry sliding and lubricated conditions because of their enhanced mechanical, thermal and tribological properties. See Briscoe B J, Sinha S K. Chapter 1—Tribological applications of polymers and their composites—past, present and future prospects. In: Friedrich K, Schlarb A K, editors. Tribology of polymeric nanocomposites. Oxford: Butterworth-Heinemann; 2013. p. 1-22.

However, there are still domains to further improve the properties of these polymer nanocomposites and coatings so that they can be used in varying environments. The polymer or polymer nanocomposite coatings can be exposed to different environments during their operational life. For example, coated components may be operated under dry conditions or under aqueous environments. Thus, there is a likely chance that water (with/without abrasives) may be entrained into these sliding components either accidentally (through any leakage), deliberately (as a coolant or lubricant) or as a contaminant (as humidity or rain), etc., which may lead to the deterioration of the properties of the polymer coatings due to swelling by water absorption or abrading action by third body particles. On the other hand, different researchers have also explored a new approach in which they used water as an environment friendly lubricant in combination with polymer coating and studied the tribological behavior of polymers in aqueous environments and found that water could play a significant role in the reduction of coefficient of friction (COF) and absorb the heat generated due to friction. See Schmidig G, Patel A, Liepins I, Thakore M, Markel D C. The effects of acetabular shell deformation and liner thickness on frictional torque in ultrahigh-molecular-weight polyethylene acetabular bearings. J Arthroplasty 2010; 25(4):644-53; Gao C, Abeysekera J, Hirvonen M, Gronqvist R. Slip resistant properties of footwear on ice. Ergonomics 2004; 47(6):710-6; and Manning D P, Jones C. The superior slip-resistance of footwear soling compound T66/103. Saf Sci 1994; 18(1):45-60. Hence, there is an urgent need to further enhance the properties of these coatings so that they will be able to function as intended and protect sliding components against wear and tear, irrespective of the environment they are exposed to.

A hybrid nanocomposite or a hybrid nanocomposite coating is a way of reinforcing any parent matrix with two or more nanofillers to mainly take advantage of the individual properties of each of the nanofillers into one product. Various researchers have enhanced the tribological properties of bulk polymers by developing hybrid nanocomposites. See Friedrich K, Zhang Z, Schlarb A K. Effects of various fillers on the sliding wear of polymer composites. Compos Sci Technol 2005; 65(15-16):2329-43; Mai Y W, Yu Z Z. Polymer nanocomposites. first ed. Cambridge: Woodhead Publishing Ltd; 2006; Ali A B, Samad M A, Merah N. UHMWPE Hybrid Nanocomposites for improved tribological performance under dry and water-lubricated sliding conditions. Tribol Lett 2017; 65(102):1-10; and Shen X, Pei X, Liu Y, Fu S. Tribological performance of carbon nanotube—graphene oxide hybrid/epoxy composites. Composites Part B 2014; 57:120-5.

In order to develop polymer based hybrid nanocomposite coating that would protect the sliding components under aqueous environments (with/without abrasives), it is essential that the developed hybrid nanocomposite coating should have a low COF, high wear resistance, high durability, high load bearing capacity, and high resistance to water absorption. UHMWPE is one of the most promising polymers among all the other polymers which meets most of the above requirements in terms of high wear/abrasion resistance, high impact resistance, and low COF. However, it has some limitations such as low thermal properties, low load bearing capacity and low Young's modulus. See Harvey P, Stein L. Ultra high molecular weight polyethylene (UHMWPE). Materials Park, Ohio: Ticona LLC, ASM International; 1999. Various researchers have modified these properties by reinforcing UHMWPE with different nanofillers. See Samad M A, Fareed M I. Improving the friction and wear of poly-ether-etherketone (PEEK) by using thin nano-composite coatings. Wear 2016; 364-365:154-62; and Tai Z, Chen Y, An Y, Yan X, Xue Q. Tribological behavior of UHMWPE reinforced with graphene oxide nanosheets. Tribol Lett 2012; 46(1):55-63.

In view of the forgoing, one objective of the present invention is to provide a method for making nanocomposites that can be used to make materials having improved tribological performance such as a novel hybrid nanocomposite coating of UHMWPE reinforced with carbon nanotubes (CNTs) and nanoclay (C15A). CNTs may function to improve the load bearing capacity of the coating, and nanoclay may function to improve the resistance to water absorption along with other mechanical properties.

BRIEF SUMMARY OF THE INVENTION

According to a first aspect, the present invention relates to a method for forming a nanocomposite coating on a substrate. The method comprises the steps of mixing polyethylene microparticles with functionalized carbon nanotubes and nanoclay in an organic solvent to form a precursor mixture; heating the precursor mixture at a temperature in a range of 75-95° C. for 18-30 h to produce a dried precursor mixture; and applying the dried precursor mixture to the substrate heated at a temperature in a range of 160-200° C. to form the nanocomposite coating. The nanocomposite coating comprises functionalized carbon nanotubes and nanoclay dispersed within a polymeric matrix.

In one embodiment, the method further comprises the step of sonicating the functionalized carbon nanotubes and nanoclay in the organic solvent prior to the heating.

In one embodiment, the polyethylene microparticles have a mean diameter in a range of 20-120 µm.

In one embodiment, the polyethylene microparticles consist essentially of UHMWPE.

In one embodiment, the nanoclay is in the form of nanoplatelets having an average diameter in a range of 5-20 µm.

In one embodiment, the nanoclay comprises montmorillonite modified with a quaternary ammonium salt.

In one embodiment, the functionalized carbon nanotubes have an average diameter in a range of 15-35 nm.

In one embodiment, the applying includes electrostatically spraying the dried precursor mixture onto the substrate.

In one embodiment, the method further comprises heating the substrate at the temperature in a range of 160-200° C. for a period of 15-60 min immediately following the applying.

In one embodiment, the nanocomposite coating consists essentially of UHMWPE, nanoclay, quaternary ammonium salt, and functionalized carbon nanotubes.

In one embodiment, the nanocomposite coating comprises 0.5-5 wt % nanoclay, and 0.5-5 wt % functionalized carbon nanotubes, each relative to a total weight of the nanocomposite coating.

In one embodiment, forming the coating does not include silanizing, and the coating does not comprise any silanes.

In one embodiment, the substrate comprises at least 97 wt % Al metal relative to a total weight of the substrate.

In one embodiment, the substrate is planar and has a thickness in a range of 1-20 mm.

In one embodiment, the nanocomposite coating has an average thickness in a range of 100-250 μm on the substrate.

In one embodiment, the nanocomposite coating has a Vickers hardness in a range of 10.5-12.5 HV.

In one embodiment, the nanocomposite coating, after being in contact with water for a time of 8-18 h, has a Vickers hardness that is decreased by 0.01-4% compared to a Vickers hardness before being in contact with water In one embodiment, the substrate has a profile roughness parameter arithmetic average, $R_a$, in a range of 0.30-0.50 μm.

In one embodiment, the nanocomposite coating has a wear resistance against a sliding normal load of 8-20 N, wherein the wear resistance is 20-30 times a wear resistance of a substantially similar polyethylene coating that does not comprise nanoclay and functionalized carbon nanotubes.

In one embodiment, the nanocomposite coating has a debonding strength of at least 25 N.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5H shows a frictional graph of a pristine UHMWPE coating under a 9 N load and 0.1 m/s linear sliding velocity.

FIG. 5I shows the wear track produced in FIG. 5H.

FIG. 5J shows a 10× image of the counterface after sliding to produce the graph in FIG. 5H and after cleaning with acetone.

FIG. 6B shows and FESEM image of the wear track produced in FIG. 6A.

FIG. 6C shows an EDS analysis of the wear track produced in FIG. 6A.

FIG. 8A shows a frictional graph of a hybrid nanocomposite coating (Sample-B) for 10,000 cycles with normal load of 12 N and a linear sliding velocity of 0.1 m/s.

FIG. 8B shows the wear tracks formed by the process of FIG. 8A.

FIG. 8C shows an image of the counterface ball at 10× magnification, after the wear test of FIG. 8A and after cleaning with acetone.

FIG. 8G shows a frictional graph of a hybrid nanocomposite coating (Sample-D) for 10,000 cycles with normal load of 12 N and a linear sliding velocity of 0.1 m/s.

FIG. 8H shows the wear tracks formed by the process of FIG. 8G.

FIG. 8I shows an image of the counterface ball at 10× magnification, after the wear test of FIG. 8G and after cleaning with acetone.

FIG. 10A is an FESEM image of the wear tracks on Sample-C formed by a sliding test of a 12 N normal load for 100,000 cycles.

FIG. 10B is an EDS analysis of the wear track of FIG. 10A.

FIG. 10C is a 2-D optical wear profile of the wear track of FIG. 10A.

FIG. 10D is an FESEM image of the wear tracks on Sample-C formed by a sliding test of a 15 N normal load for 100,000 cycles.

FIG. 10E is an EDS analysis of the wear track of FIG. 10D.

FIG. 10F is a 2-D optical wear profile of the wear track of FIG. 10D.

FIG. 18A is a typical frictional graph of pristine UHMWPE coating after a sliding test performed at a normal load of 9 N under water at a linear speed of 0.1 m/s.

FIG. 18B is an image of the sample after the wear test of FIG. 18A.

FIG. 18C is an image of the counterface ball after the wear test of FIG. 18A and after cleaning with acetone.

FIG. 19A shows the wear life of different samples at a normal load of 12 N for 150,000 cycles under water.

FIG. 19B shows the wear track of the pristine UHMWPE sample.

FIG. 19C shows the wear track of the C15A/UHMWPE sample.

FIG. 21A is an SEM image of the wear track of Sample-5 after sliding tests were conducted at normal load of 12 N for 300,000 cycles.

FIG. 21B is a zoomed-in SEM image of the sample of FIG. 21A.

FIG. 21C is an EDS analysis of the wear track of FIG. 21A.

FIG. 21D is a 2D-optical wear profile of the wear track of FIG. 21A.

FIG. 25F is an EDS analysis of the wear track produced in FIG. 25A.

FIG. 25G is the counterface ball surface before the test of FIG. 25A.

FIG. 25H is the counterface ball surface after the test of FIG. 25A and after cleaning with acetone.

FIG. 25J is typical frictional graph of 1.5 wt % CNT/1.5 wt % C15A/UHMWPE hybrid nanocomposite coating with a 12 N normal load, a linear sliding speed of 0.1 m/s, water lubricated conditions, and with abrasive particles.

FIG. 25K show the wear track produced in FIG. 25J.

FIG. 25L shows an SEM image of the wear track produced in FIG. 25J.

FIG. 25M shows a zoomed-in SEM image of the wear track produced in FIG. 25J.

FIG. 25N shows a 3D optical profile of the wear track produced in FIG. 25J.

FIG. 25O is an EDS analysis of the wear track produced in FIG. 25J.

FIG. 25P is the counterface ball surface before the test of FIG. 25J.

FIG. 25Q is the counterface ball surface after the test of FIG. 25J and after cleaning with acetone.

FIG. 25R is a depth profile of the wear track produced in FIG. 25J.

FIG. 25S is a further zoomed-in view of FIG. 25M.

FIG. 27E is a zoomed-in SEM image of the dotted-circle region in FIG. 27D, corresponding to a particular critical load (Lc) for the sample and where the coating peel-off started, with the arrow indicating the sliding direction of the indenter.

FIG. 27F is an EDS analysis of the rectangular boxed region of FIG. 27D.

FIG. 27G is a low magnification SEM image of pristine UHMWPE after the scratch test, with the arrow indicating the sliding direction of the indenter.

FIG. 27H is a zoomed-in SEM image of the dotted-circle region in FIG. 27G, corresponding to a particular critical load (Lc) for the sample and where the coating peel-off started, with the arrow indicating the sliding direction of the indenter.

FIG. 27I is an EDS analysis of the rectangular boxed region of FIG. 27G.

FIG. 27J is a low magnification SEM image of pristine UHMWPE after the scratch test, with the arrow indicating the sliding direction of the indenter.

FIG. 27K is a zoomed-in SEM image of the dotted-circle region in FIG. 27J, corresponding to a particular critical load (Lc) for the sample and where the coating peel-off started, with the arrow indicating the sliding direction of the indenter.

FIG. 27L is an EDS analysis of the rectangular boxed region of FIG. 27J.

DETAILED DESCRIPTION OF THE EMBODIMENTS

Figure 1:
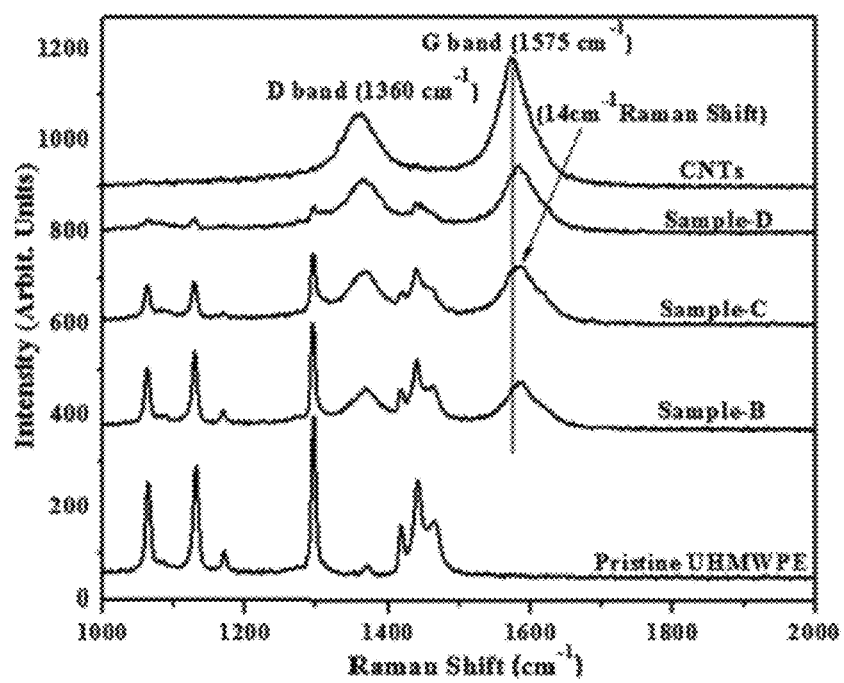
FIG. 1 shows the Raman spectra for pristine and hybrid nanocomposites.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2.6H_2O$, and any other hydrated forms or mixtures. $CuCl_2$ includes both anhydrous $CuCl_2$ and $CuCl_2.2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present invention is directed to a method for forming a nanocomposite coating on a substrate. The nanocomposite coating comprises functionalized carbon nanotubes and nanoclay dispersed within a polymeric matrix of polyethylene.

The method comprises mixing polyethylene microparticles with the functionalized carbon nanotubes and nanoclay to form a precursor mixture in an organic solvent, heating the precursor mixture to produce a dried precursor mixture, and applying the dried precursor mixture to the substrate to form the nanocomposite coating. The substrate is heated while the dried precursor mixture is applied.

Polyethylene or polythene (abbreviated PE; IUPAC name polyethene or poly(methylene)) is a common plastic. Its primary use is in packaging (plastic bags, plastic films, geomembranes, containers including bottles, etc.). Many kinds of polyethylene are known, with most having the chemical formula $(C_2H_4)_n$. This $C_2H_4$ monomer is ethylene (IUPAC name ethene).

PE is usually a mixture of similar polymers of ethylene with various values of n. Polyethylene is a thermoplastic; however, it can become a thermoset plastic when modified (such as cross-linked polyethylene). Ethylene is a stable molecule that polymerizes only upon contact with catalysts. The conversion is highly exothermic. Coordination polymerization is the most pervasive technology, which means that metal chlorides or metal oxides are used. The most common catalysts consist of titanium(III) chloride, the so-called Ziegler-Natta catalysts. Another common catalyst is the Phillips catalyst, prepared by depositing chromium(VI) oxide on silica. Polyethylene can be produced through radical polymerization, but this route has only limited utility and typically requires high-pressure apparatus.

In one embodiment, the polyethylene microparticles comprise Very-low-density polyethylene (VLDPE), Low-density polyethylene (LDPE), Medium-density polyethylene (MDPE), High-density polyethylene (HDPE), chlorinated polyethylene (PE-C), cross-linked polyethylene (PEX, XPE, or XLPE), and/or ultra-high molecular weight polyethylene (UHMWPE).

Very-low-density polyethylene (VLDPE) is defined by a density range of 0.880-0.915 g/cm$^3$. VLDPE is a substantially linear polymer with high levels of short-chain branches, commonly made by copolymerization of ethylene with short-chain alpha-olefins (for example, 1-butene, 1-hexene and 1-octene). VLDPE is most commonly produced using metallocene catalysts due to the greater co-monomer incorporation exhibited by these catalysts.

Low-density polyethylene (LDPE) is defined by a density range of 0.910-0.940 g/cm$^3$. LDPE has a high degree of short- and long-chain branching, which means that the chains do not pack into the crystal structure as well. It has, therefore, less strong intermolecular forces as the instantaneous-dipole induced-dipole attraction is less. This results in a lower tensile strength and increased ductility. LDPE is created by free-radical polymerization. The high degree of branching with long chains gives molten LDPE unique and desirable flow properties.

LLDPE is defined by a density range of 0.915-0.925 g/cm$^3$. LLDPE is a substantially linear polymer with significant numbers of short branches, commonly made by copolymerization of ethylene with short-chain alpha-olefins (for example, 1-butene, 1-hexene, and 1-octene). LLDPE has higher tensile strength than LDPE, and it exhibits higher impact and puncture resistance than LDPE. Lower thickness (gauge) films can be blown, compared with LDPE, with better environmental stress-cracking resistance, but is not as easy to process.

Medium-density polyethylene (MDPE) is defined by a density range of 0.926-0.940 g/cm$^3$. MDPE can be produced by chromium/silica catalysts, Ziegler-Natta catalysts, or metallocene catalysts. MDPE has good shock and drop resistance properties. It also is less notch-sensitive than HDPE; stress-cracking resistance is better than HDPE.

High-density polyethylene (HDPE) is defined by a density of greater or equal to 0.941 g/cm$^3$. HDPE has a low degree of branching. The mostly linear molecules pack together well, so intermolecular forces are stronger than in highly branched polymers. HDPE can be produced by chromium/silica catalysts, Ziegler-Natta catalysts or metallocene catalysts; by choosing catalysts and reaction conditions, the small amount of branching that does occur can be controlled. These catalysts prefer the formation of free radicals at the ends of the growing polyethylene molecules. They cause new ethylene monomers to add to the ends of the molecules, rather than along the middle, causing the growth of a linear chain. HDPE has high tensile strength.

Chlorinated polyethylene (PE-C) is an inexpensive variation of polyethylene having a chlorine content from 34 to 44%. It is used in blends with polyvinyl chloride (PVC) because the soft, rubbery chlorinated polyethylene is embedded in the PVC matrix, thereby increasing the impact resistance. In addition, it also increases the weather resistance. Furthermore, it is used for softening PVC foils, without risking plasticizer migration.

In one embodiment, the polyethylene microparticles consist essentially of ultra-high molecular weight polyethylene (UHMWPE), meaning that the polyethylene microparticles comprise at least 99.5 wt %, preferably at least 99.9 wt %, more preferably at least 99.99 wt %, or about 100 wt % UHMWPE relative to a total weight of the polyethylene microparticles.

UHMWPE is a subset of the thermoplastic polyethylene. Also known as high-modulus polyethylene, (HMPE), it has extremely long chains, with a molecular mass usually between 3.5 and 7.5 million amu. The longer chain serves to transfer load more effectively to the polymer backbone by strengthening intermolecular interactions. This results in a tough material, with the highest impact strength of any thermoplastic presently made.

UHMWPE embodies all the characteristics of high-density polyethylene (HDPE) with the added traits of being resistant to concentrated acids and alkalis, as well as numerous organic solvents. It is resistant to corrosive chemicals except oxidizing acids; has extremely low moisture absorption and a very low coefficient of friction; is self-lubricating; and is highly resistant to abrasion, in some forms being 15 times more resistant to abrasion than carbon steel. Its coefficient of friction is significantly lower than that of nylon and acetal, and is comparable to that of polytetrafluoroethylene (PTFE, Teflon®), but with UHMWPE having the advantage of better abrasion resistance than PTFE.

In one embodiment, the UHMWPE has a weight average molecular weight, or a number average molecular weight, in a range of 3,000-8,000 kDa, preferably 4,000-7,000 kDa, more preferably 4,500-6,500 kDa.

In an alternative embodiment, other polymeric compounds may be used in place or with the polyethylene. Suitable polymers may be selected from the group including, but not limited to, polyacrylates, acrylics, poly(acrylic acid), poly(acrylonitrile), poly(2-hydroxyethylmethacrylate), sodium polyacrylate, ethylene glycol dimethacrylate, poly(vinyl pyridine), poly(methyl acrylate), polymethacrylates, poly(methyl methacrylate), polychloroprene, polyacrylamide, poly(N-isopropylacrylamide), poly(tetrafluoroethylene) (PTFE), poly(N-vinyl pyrrolidone), poly(vinyl pyrrolidinone), poly(vinyl pyridine), polystyrene, poly(propylene), poly(isobutylene), poly(butylene), polyvinyl chlorides (PVC), polyvinyl chloride acetate, polyacrylonitriles, poly(ethyl acetate), poly(vinyl acetate), polyvinylacetates, polyvinyl acetate phthalate, ethylene vinyl acetates, poly(ethylene glycol), polyphenylene ethers, poly(ethylene vinyl alcohol), poly(vinylidene fluoride), poly(p-phenylenevinylene), poly(benzoxazole), polyphenylenebenzobisoxazole (PBO), polyaryletherketones, poly(ether ether ketones), polyphenylenesulfides, polyamide imides, polyarylates, polyarylsulphones, ethyl-vinyl-alcohol copolymers, copolymers of ethylene and 1-alkenes, polybutene-1, polymethylpentene, amorphous poly-alpha-olefins (APAO), terephthalates, polyacetylene, polyethylene oxides, polycycloolefins, polyisoprenes, polyamides, poly(ethylene terephthalate), poly(trimethylene terephthalate), poly(butylene terephthalate), polycarbonates, polychlorotrifluoroethylene, polyvinyldifluoride, polyperfluoroalkoxy, poly(ethylene oxide), ethylene oxide copolymers, poly(ethylene imine), poly(dimethyl siloxane), polysiloxanes, fluorosilicones, fluoropolymers, polybutadienes, butadiene copolymers, epoxidized natural rubbers, epoxy polymer resins, poly(cis-1,4-isoprene), poly (trans-1,4-isoprene), viton, phenolic resins, acrylic resins, vinylacetate resins, polyurethanes, polyurethane-urea, thermosetting polyimides, thermoplastic polyimides, poly(amic acid), polysulfones, polyetherimides, polyethersulfones, chlorosulfonates, polyoxymethylene, polyphenylene oxide, polyphenylenes, perfluorinatedpolyethylenepropylene, polyvinylidene chloride, fluoropoly(ether-imide), polyolefins, aromatic polyamides (Aramid, para-aramid), polyesters, conducting and conjugated polymers, liquid crystal polymers, liquid crystalline polyesters, vectran, biodegradable thermoplastic polyesters and their copolymers, thermosetting polyesters, unsaturated polyesters, acetals, fluorinated elastomers, rubbers, bismaleimides, copolymer rubbers, ethylene-propylene, ethylene-propylene-diene monomers (EPDM), nitrile-butadienes, nylons, thermoplastic continuous and discontinuous fiber composites, thermosetting continuous and discontinuous fiber composites, specialty polymers, and blends, mixtures, alloys, and copolymers thereof.

In one embodiment, the polyethylene microparticles have a mean diameter in a range of 20-120 µm, preferably 40-110 µm, more preferably 60-100 µm, or 75-90 µm, or about 85 µm. The polyethylene microparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. In one embodiment, the polyethylene microparticles may be substantially spherical, meaning that the distance from the nanoparticle centroid (center of mass) to anywhere on the microparticle outer surface varies by less than 30%, preferably by less than 20%, more preferably by less than 10% of the average distance.

In one embodiment, the polyethylene microparticles are monodisperse, having a coefficient of variation or relative standard deviation, expressed as a percentage and defined as the ratio of the particle diameter standard deviation ($\sigma$) to the particle diameter mean ($\mu$), multiplied by 100%, of less than 25%, preferably less than 10%, preferably less than 8%, preferably less than 6%, preferably less than 5%. In a preferred embodiment, the polyethylene microparticles are monodisperse having a particle diameter distribution ranging from 80% of the average particle diameter to 120% of the average particle diameter, preferably 85-115%, preferably 90-110% of the average particle diameter. In another embodiment, the polyethylene microparticles are not monodisperse.

In one embodiment, the nanoclay is in the form of nanoplatelets having an average diameter in a range of 5-20 µm, preferably 6-18 µm, more preferably 8-15 µm, and an average thickness in a range of 1-3 nm. The nanoclay may comprise a phyllosilicate, including but not limited to antigorite, chrysotile, lizardite, halloysite, kaolinite, illite, montmorillonite, vermiculite, talc, sepiolite, palygorskite (attapulgite), pyrophyllite, biotite, fuchsite, muscovite, phlogopite, lepidolite, margarite, glauconite, and chlorite. In one embodiment, the nanoclay is montmorillonite. In another embodiment, the nanoclay is bentonite, which comprises montmorillonite.

In one embodiment, the nanoclay may be organoclay. Organoclay is an organically modified phyllosilicate, derived from a naturally occurring clay mineral. By exchanging the original interlayer cations for organocations (typically quaternary alkylammonium ions) an organophilic surface is generated, consisting of covalently linked organic moieties. The lamellar structure remains analogous to the parent phyllosilicate.

Separation of the layers due to ion exchange, from the initial interlayer spacing of as little as 3 Å in the case of Na cations, to the distances in the range of 10-40 Å as well as the change of chemical character of the clay surface, allows the in-situ polymerization or mixing with certain polymers to obtain what is known as a nanocomposite. When ordered aluminasilicate sheets are lying parallel to each other, separated with polymer chains of certain type, the system is classified as intercalated nanocomposite. If separation of the layers is so significant, that they are no longer lying opposite to one another, but randomly ordered, then one get an exfoliated nanocomposite In one embodiment, the nanoclay is an organoclay modified with a quaternary ammonium salt. The nanoclay may comprise 0.01-5 wt %, preferably 0.05-3 wt %, more preferably 0.1-2 wt % quaternary ammonium salt relative to a total weight of the organoclay. Quaternary ammonium cations, also known as quats, are positively charged polyatomic ions of the structure $NR_4^+$, R being an alkyl group or an aryl group. Unlike the ammonium ion ($NH_4^+$) and the primary, secondary, or tertiary ammonium cations, the quaternary ammonium cations are permanently charged, independent of the pH of their solution. Quaternary ammonium salts or quaternary ammonium compounds (are salts of quaternary ammonium cations. Here, the quaternary ammonium salt or cation may be dimethyl dihydrogenated tallow quaternary ammonium, benzalkonium chloride, dimethyl benzyl hydrogenated tallow quaternary ammonium, methyl tallow bis-2-hydroxyethyl quaternary ammonium, dimethyl hydrogenated tallow 2-ethylhexyl quaternary ammonium, hexadecyltrimethylammonium chloride, distearyldimethylammonium chloride, diethyl ester dimethyl ammonium chloride, N-octadecyltrimethylammonium, didecyl dimethyl ammonium chloride, dicaprylyl dimonium chloride quaternary ammonium salt, dioctyl dimethyl ammonium chloride, bisoctyl dimethyl ammonium chloride quaternary ammonium salt, octadecyl trimethyl ammonium chloride, hexadecyl trimethyl ammonium chloride, or dodecyl trimethyl ammonium chloride quaternary ammonium salt. In one preferred embodiment, the nanoclay is an organoclay modified with dimethyl dihydrogenated tallow quaternary ammonium. In another preferred embodiment, the nanoclay is an organoclay modified with quaternary dimethyl di-hydrogenated ammonium.

In one embodiment, the nanoclay may be CLOISITE® 15A (C15A) nanoclay from BYK. In one embodiment, the nanoclay is montmorillonite modified with dimethyl dihydrogenated tallow quaternary ammonium.

In one embodiment, the functionalized carbon nanotubes may be single-walled and/or multi-walled and may have an average diameter in a range of 15-35 nm, preferably 16-32 nm, more preferably 18-28 nm, even more preferably 20-26 nm, or about 23 nm. The functionalized carbon nanotubes may have an average length in a range of 200 nm-1.5 µm, preferably 220 nm-1.0 µm, more preferably 250 nm-800 nm. The average diameter and average length as described above refers to the average of the diameters or the lengths of individual functionalized carbon nanotubes. In some cases, two or more functionalized carbon nanotubes may be twisted, stuck, or bundled together, leading to a greater combined thickness and/or combined length.

The functionalized carbon nanotubes utilized in this invention may be produced using any production method including, but not limited to, laser vaporization techniques, electric arc techniques, gas phase techniques, and chemical vapor deposition. In laser vaporization and electric arc techniques, the carbon nanotubes are produced by vaporizing graphite with or without a metal catalyst present using either a laser beam or an electric arc, respectively. In gas phase techniques, a carbon source is usually run across a bed of catalyst particles under pressure and heat to produce normally a continuous stream of carbon nanotubes. Chemical vapor deposition usually involves the use of a precursor compound that under proper conditions (heat, pressure, etc.), with or without the aid of a catalyst, will decompose to form carbon nanotubes. In one embodiment, the functionalized carbon nanotubes comprise carbon nanotubes that contain or comprise other elements in addition to carbon including, but not limited to, nitrogen, boron, oxygen, sulfur, and mixtures thereof. In one embodiment, the functionalized carbon nanotubes comprise functional groups, which include but are not limited to carboxylic acid, benzoic acid, polyamino benzoic acid, polyethylene glycol, octadecylamine, trifluoroacetic acid, urea, carbonyl groups, hydroxyl groups, fluorine, and dizaonium. In another embodiment, the functionalized carbon nanotubes may comprise carbon nanotubes that are non-covalently modified by physisorption of polymers such as polyacrylic acid, polyacrylamide, polyethylene glycol, or polyethylenimine. In one embodiment, the functionalized carbon nanotubes are produced by contacting carbon nanotubes with an acid, such as $HNO_3$ and/or $H_2SO_4$. Functionalized carbon nanotubes produced by contacting with $HNO_3$ and/or $H_2SO_4$ may have carboxylic acid groups covalently bound to the outer surface.

In one embodiment, nanocomposite coating further comprises carbon nanoparticles having an average diameter in a range of 1-2 µm, preferably 1.1-1.9 µm, more preferably 1.2-1.8 µm, though in some embodiments, the layer may further comprise carbon nanoparticles having an average diameter of less than 1 µm or greater than 2 µm. The nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. In one embodiment, the carbon nanoparticles may be substantially spherical, meaning that the distance from the nanoparticle centroid (center of mass) to anywhere on the nanoparticle outer surface varies by less than 30%, preferably by less than 20%, more preferably by less than 10% of the average distance.

In one embodiment, the carbon nanoparticles may be present within agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the carbon nanoparticles having a mean diameter as previously described. In another embodiment, the nanocomposite coating further comprises carbon nanofibers that are not nanotubes.

In one embodiment, the dried precursor mixture comprises nanoclay at a weight percentage of 0.5-5 wt %, preferably 0.8-4 wt %, more preferably 1.0-3 wt %, even more preferably 1.2-2 wt %, or about 1.5 wt % relative to a total weight of the dried precursor mixture. Similarly, in one embodiment, the dried precursor mixture comprises functionalized carbon nanotubes at a weight percentage of 0.5-5 wt %, preferably 0.8-4 wt %, more preferably 1.0-3 wt %, even more preferably 1.2-2 wt %, or about 1.5 wt % relative to a total weight of the dried precursor mixture. In one embodiment, the dried precursor mixture has a mass ratio of nanoclay to functionalized carbon nanotubes in a range of 1.0:1.1-1.1:1.0, preferably 1.0:1.05-1.05:1.0, more preferably 1.0:1.02-1.02:1.0, or about 1:1. The dried precursor mixture may comprise 90-99.9 wt %, preferably 93-99.0 wt %, more preferably 95-98 wt %, or about 97 wt % polyethylene, relative to a total weight of the dried precursor mixture.

In one embodiment, the nanocomposite coating comprises nanoclay at a weight percentage of 0.5-5 wt %, preferably 0.8-4 wt %, more preferably 1.0-3 wt %, even more preferably 1.2-2 wt %, or about 1.5 wt % relative to a total weight of the nanocomposite coating. Similarly, in one embodiment, the nanocomposite coating comprises functionalized carbon nanotubes at a weight percentage of 0.5-5 wt %, preferably 0.8-4 wt %, more preferably 1.0-3 wt %, even more preferably 1.2-2 wt %, or about 1.5 wt % relative to a total weight of the nanocomposite coating. In one embodiment, the nanocomposite coating has a mass ratio of nanoclay to functionalized carbon nanotubes in a range of 1.0:1.1-1.1:1.0, preferably 1.0:1.05-1.05:1.0, more preferably 1.0:1.02-1.02:1.0, or about 1:1. The nanocomposite coating may comprise 90-99.9 wt %, preferably 93-99.0 wt %, more preferably 95-98 wt %, or about 97 wt % polyethylene, relative to a total weight of the nanocomposite coating.

In an alternative embodiment, other nanofillers may be used in place of or along with the functionalized carbon nanotubes and nanoclay. These nanofillers include but are not limited to graphene, silicates, zinc oxide, iron oxide, alumina, silicon nitride, aluminum nitride, and boron nitride. Other suitable nanofillers include, for example, carbon nanofibers, main group metal oxides, transition metal oxides, metal carbides, cermet materials, Portland cement, ceramics, glass, perovskites, layered inorganic materials, fibrillar inorganic materials, and combinations thereof.

In one embodiment, the method further comprises the step of sonicating the nanoclay and the functionalized carbon nanotubes in an organic solvent prior to the mixing. A concentration of the nanoclay in the organic solvent may be in the range of 5-100 g nanoclay per L organic solvent, preferably 10-80 g/L, more preferably 20-70 g/L. A concentration of the functionalized carbon nanotubes in the organic solvent may be in the range of 5-100 g functionalized carbon nanotubes per L organic solvent, preferably 10-80 g/L, more preferably 20-70 g/L. In another embodiment, a concentration of the nanoclay and/or functionalized carbon nanotubes in the organic solvent may be in the range of 1-200 g per L organic solvent, preferably 2-150 g/L, more preferably 5-100 g/L. In one embodiment, the nanoclay and the functionalized carbon nanotubes are sonicated in an alcohol which may be benzyl alcohol, cyclohexanol, pentyl alcohol, phenol, 1-propanol, methanol, ethanol, butanol, isopropanol, or mixtures thereof. Preferably the alcohol is methanol, ethanol, butanol, or isopropanol. In a preferred embodiment, the alcohol is ethanol. In one embodiment, the nanoclay and the functionalized carbon nanotubes may be sonicated together in the same volume of organic solvent. In another embodiment, the nanoclay and the functionalized carbon nanotubes may be sonicated separately and then combined, with or without additional sonication.

In other embodiments, other solvents and liquids may be used for sonicating the nanoclay and/or functionalized carbon nanotubes. The solvent may be organic or aqueous, such as, for example, water, chloroform, chlorobenzene, water, acetic acid, acetone, acetonitrile, aniline, benzene, benzonitrile, bromobenzene, bromoform, carbon disulfide, carbon tetrachloride, cyclohexane, decalin, dibromethane, diethylene glycol, diethylene glycol ethers, diethyl ether, diglyme, dimethoxymethane, N,N-dimethylformamide, ethylamine, ethyl benzene, ethylene glycol ethers, ethylene glycol, ethylene glycol acetates, propylene glycol, propylene glycol acetates, ethylene oxide, formaldehyde, formic acid, glycerol, heptane, hexane, iodobenzene, mesitylene, methoxybenzene, methylamine, methylene bromide, methylene chloride, methylpyridine, morpholine, naphthalene, nitrobenzene, nitromethane, octane, pentane, terpineol, texanol, carbitol, carbitol acetate, butyl carbitol acetate, dibasic ester, propylene carbonate, pyridine, pyrrole, pyrrolidine, quinoline, 1,1,2,2-tetrachloroethane, tetrachloroethylene, tetrahydrofuran, tetrahydropyran, tetralin, tetra methylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solvent may be a halogenated organic solvent such as 1,1,2,2-tetrachloroethane, chlorobenzene, chloroform, methylene chloride, 1,2-dichloroethane, or chlorobenzene.

The functionalized carbon nanotubes and/or nanoclay may be sonicated continuously in the organic solvent for a time period in a range of 2-30 min, preferably 5-20 min, or about 10 min. In another embodiment, the functionalized carbon nanotubes and/or nanoclay may be sonicated for that time period but with on and off cycles, for instance, having an on cycle of 10-30 s sonication, preferably 15-25 s, or about 20 s, and an off cycle of 2-10 s, preferably 3-8 s, or about 5 s. The sonicating may be done with a bath sonicator or a sonicating horn or probe tip. In alternative embodiments, media milling or high-shear mixing may be used instead of the sonicating. In one embodiment, cold water, such as by chilling with refrigeration or with ice, may be used as a bath to keep the sonication from overheating the organic solvent.

In one embodiment, the nanoclay and functionalized carbon nanotubes may be stirred, agitated, or shaken in the organic solvent, before and/or after the sonicating, at a speed in a range of 200-5,000 rpm, preferably 500-4,000 rpm, more preferably 800-1,200 rpm for a time period of 0.5-10 min, preferably 1-5 min, more preferably about 2 min. The polyethylene microparticles may then be mixed with the nanoclay and functionalized carbon nanotubes in the organic solvent, and stirred, agitated, or shaken at a speed in a range of 200-5,000 rpm, preferably 500-4,000 rpm, more preferably 800-1,200 rpm, for a time period of 10 min-4 h, preferably 30 min-2 h, more preferably about 1 h. The mixing of the polyethylene microparticles with the functionalized carbon nanotubes and the nanoclay forms the precursor mixture.

In other embodiments, the polyethylene microparticles, the nanoclay and the functionalized carbon nanotubes may be mixed together as dried powders, or may be mixed together with water and/or an organic solvent without a sonication step. In another embodiment, the nanoclay and the functionalized carbon nanotubes may be mixed with the organic solvent and polyethylene microparticles, and this combined mixture may then be sonicated. In other embodiments, the nanoclay and/or the functionalized carbon nanotubes may be sonicated with a first organic solvent, then dried, and then mixed with a second organic solvent and the polyethylene microparticles, where the first and second organic solvents may have the same or different chemical compositions.

In one embodiment, the mixing and sonicating steps as previously described do not change the weight percentages of the nanoclay, functionalized carbon nanotubes, and polyethylene microparticles relative to their combined weight. For instance, before the mixing and sonicating, the combined components for the precursor mixture may comprise 1.5 wt % nanoclay, 1.5 wt % carbon, and 97 wt % polyethylene relative to a combined weight of nanoclay, carbon, and polyethylene, and after the mixing and sonicating, the precursor mixture may still comprise 1.5 wt % nanoclay, 1.5 wt % carbon, and 97 wt % polyethylene.

In another embodiment, the mixing and sonicating steps do not change the average dimensions of carbon nanotube, nanoclay, or polyethylene microparticle. In a further embodiment, the average diameter of the functionalized carbon nanotubes does not change throughout the entire method of forming the nanocomposite coating, which means before and after the steps of sonicating, mixing, heating, and applying. However, in some embodiments, sonication, if used, may decrease an average diameter or average length of the functionalized carbon nanotubes by 0.1-20%, by 0.5-5%, or by 1-3% of its initial value. Similarly, subjecting polyethylene microparticles or nanoclay to sonication may decrease an average diameter by 1-50%, by 2-20%, or by 5-15% of its initial value, though it may be possible that sonicating the polyethylene microparticles does not noticeably decrease an average diameter.

In one embodiment, preferably the polyethylene microparticles are mixed with the nanoclay, functionalized carbon nanotubes, and an organic solvent to form a precursor mixture, and the precursor mixture is heated at a temperature in a range of 75-95° C., preferably 76-90° C., more preferably 78-85° C., or about 80° C. for 12-30 h, preferably 20-28 h, more preferably about 24 h to produce a dried precursor mixture. In other embodiments, the precursor mixture may be filtered or dried (with or without heating) to remove the organic solvent and produce the precursor mixture. The precursor mixture may be heated in an oven or on a hotplate.

The dried precursor mixture is then applied to the substrate while the substrate is heated at a temperature in a range of 160-200° C., preferably 165-195° C., more preferably 170-190° C., even more preferably 175-185° C., or about 180° C. Preferably the substrate is preheated for 1-15 min, preferably 3-10 min immediately prior to the applying. However, in another embodiment, the dried precursor mixture may be applied to the substrate while at a lower temperature, such as room temperature, and then heated to the temperatures previously mentioned. In another embodiment, immediately after the applying, the substrate is heated at a temperature in a range of 160-200° C. for a period of 15-60 min, preferably 20-50 min, more preferably 25-45 min, even more preferably 30-40 min, or about 35 min. The substrate may then be allowed to cool to room temperature. The substrate may be heated by placing on top of a heating element, such as a hot plate, by passing an electric current through the substrate to heat by resistance, heating by induction, heat gun, flame, or by placing in an oven. In other embodiments, the substrate may be heated by irradiation.

Without being bound to any particular theory, the heated substrate melts the polyethylene microparticles into a polyethylene matrix comprising the nanoclay and the functionalized carbon nanotubes. This melting may also allow polyethylene to strongly adhere to the substrate, the nanoclay and/or the functionalized carbon nanotubes, conferring the hardness and wear resistance of the final product.

In one embodiment, the dried precursor mixture is applied to the substrate by pouring or scooping the dried precursor mixture onto the substrate. In a more preferred embodiment, the applying uses an electrostatic spray deposition such as delivering the dried precursor mixture to the substrate with an electrostatic spray gun or a powder coating system. In one embodiment, an electrostatic spray gun such as CRAFTSMAN Powder Coating System 17288 may be used. In one embodiment, immediately after the applying, the dried precursor mixture may have a thickness on the substrate that is 5-200%, preferably 7-100%, more preferably 10-50% greater than the thickness of the nanocomposite coating.

In alternative embodiments, a precursor mixture may be applied or sprayed onto the substrate as a wet powder or slurry rather than as a dry powder. In a further embodiment, a precursor mixture being sprayed onto the substrate in the form of droplets may use an electrostatic deposition system.

In an alternative embodiment, a precursor mixture may be extruded through a heated nozzle onto the substrate. In another embodiment, the substrate may be dip coated into a slurry of the precursor mixture, and then heated.

In one embodiment, the method of forming the nanocomposite coating does not use silanes or a silanization reaction. In other words, the forming the coating does not include silanizing, and the coating does not comprise any silanes. Silanes include, but are not limited to, methyldichlorosilane, dimethyldichlorosilane, methyltrichlorosilane, trichlorosilane, phenyldichlorosilane, octyltriethoxysilane, vinyltrimethoxysilane, (3-aminopropyl)-triethoxysilane, (3-aminopropyl)-diethoxy-methylsilane, (3-aminopropyl)-dimethyl-ethoxysilane, (3-aminopropyl)-trimethoxysilane, (3-glycidoxypropyl)-dimethyl-ethoxysilane, (3-mercaptopropyl)-trimethoxysilane, (3-mercaptopropyl)-methyl-dimethoxysilane, and the like.

In another embodiment, the entire method of forming the nanocomposite does not involve heating at any temperatures above 200° C., preferably above 190° C., more preferably above 180° C. For instance, a maximum temperature used in the entire process may not exceed 200° C., may not exceed 195° C., 190° C., 185° C., 180° C., 175° C., 170° C., or 165° C. In one embodiment, the method of forming the nanocomposite coating does not use a polymerization reaction. In other words, the number average molecular weight or the weight average molecular weight of the polyethylene does not change from the mixing to the applying steps of the method. In other embodiments, the number average molecular weight or the weight average molecular weight of the polyethylene may change only slightly, for instance, by less than 2% of its original or by less than 1% of its original value (i.e. the original value being before the mixing or heating).

In one embodiment, the nanocomposite coating consists essentially of UHMWPE, functionalized carbon nanotubes, and nanoclay, meaning that the nanocomposite coating comprises at least 99.5 wt %, preferably at least 99.9 wt %, more preferably at least 99.99 wt % UHMWPE, functionalized carbon nanotubes, and nanoclay, relative to a total weight of the nanocomposite coating. In one embodiment, the nanocomposite coating consists essentially of UHMWPE, functionalized carbon nanotubes, nanoclay, and quaternary ammonium salt. In a related embodiment, nanocomposite coating consists essentially of UHMWPE, functionalized carbon nanotubes, montmorillonite, and quaternary ammonium salt. In a related embodiment, the dried precursor mixture consists essentially of UHMWPE, functionalized carbon nanotubes, nanoclay, and quaternary ammonium salt.

In one embodiment, the substrate comprises aluminum, preferably as an aluminum alloy, and the substrate comprises at least 97 wt %, preferably at least 97.5 wt %, preferably at least 97.8 wt %, more preferably at least 98.0 wt % Al metal, relative to a total weight of the substrate. In one embodiment, the substrate comprises about 98.13 wt % Al relative to a total weight. In another embodiment, the substrate comprises at least 99.5 wt %, preferably at least 99.9 wt % or about 100 wt % Al relative to a total weight. In one embodiment, the substrate is an aluminum alloy further comprising less than 1 wt % of Fe, Si, Mn, Mg, Cr, and/or Ni. In one embodiment, the substrate is an aluminum alloy comprising 0.10-0.20 wt % Fe, preferably about 0.15 wt % Fe; 0.10-0.20 wt % Si, preferably about 0.17 wt % Si, 0.3-0.8 wt % Mn, preferably about 0.5 wt % Mn; 0.3-0.9 wt % Mg, preferably about 0.6 wt % Mg; 0.05-0.20 wt %, preferably about 0.10 wt % Cr; 0.1-0.5 wt % Ni preferably about 0.3 wt % Ni; and 97.8-98.5 wt % Al, or about 98.2 wt % Al, each relative to a total weight of the substrate.

In an alternative embodiment, the substrate does not comprise aluminum, and may instead comprise copper, ceramic, silver, pure iron, a metal oxide, silicate, or some other compound or alloy. In one embodiment, the substrate may be steel. Where the substrate may be steel, the steel may be one or more types of carbon steel, stainless steel, weathering steel, steel wool, Eglin steel, austenitic steel, ferritic steel, martensitic steel, and/or some other type of steel.

As defined here, steel is an alloy having 55-99.98 wt %, preferably 60-99.96 wt % of elemental iron, and may further comprise carbon, chromium, aluminum, nickel, molybdenum, manganese, vanadium, tungsten, cobalt, titanium, niobium, copper, zirconium, calcium, boron, phosphorus, and/or silicon. The steel may be a low-carbon steel, a medium-carbon steel, a high-carbon steel, or an ultrahigh-carbon steels. Each has a different carbon content, wherein the carbon content has an effect on mechanical properties, with increasing carbon content leading to increased hardness and strength.

In one embodiment, the substrate has a thickness in a range of 1-20 mm, preferably 2-15 mm, more preferably 4-10 mm, even more preferably 5-8 mm or about 6 mm. In one embodiment, the substrate may be planar with the surface for the applying having a surface area in a range of 1 cm$^2$-1 m$^2$, preferably 2-900 cm$^2$, more preferably 3-250 cm$^2$, though in some embodiments, surface areas larger than 1 m$^2$ may be used. In one embodiment, the substrate may not be strictly planer, but substantially planar, for instance, having a radius of curvature of greater than 1 m, preferably greater than 10 m.

In one embodiment, the substrate may be cleaned before the applying. The substrate may be cleaned by sonicating in any of the previously mentioned organic solvents or by exposing to oxygen or air plasma, ozone, or UV irradiation. In other embodiments, the substrate may be cleaned by polishing or grinding. Preferably the substrate is cleaned by grinding, sonicating, and air plasma treatment. The grinding or polishing may be used to produce a profile roughness parameter arithmetic average, $R_a$, in a range of 0.30-0.50 μm, preferably of 0.32-0.48 μm, more preferably of 0.35-0.46 μm, or about of 0.38-0.42 μm. In other embodiments, the $R_a$, may be lower, for instance, in a range of 0.10-0.20 μm. The substrate may be sonicated for a time period in a range of 5-30 min, preferably 10-20 min, or about 15 min. The plasma treatment may be carried out for 5-30 min, preferably 7-15 min, or about 10 min using air plasma generated with an RF power in a range of 10-50 W, preferably 15-40 W, more preferably 25-35 W.

Following the applying step and any subsequent cooling, the nanocomposite coating has an average thickness in a range of 100-250 μm, preferably 120-220 μm, more preferably 150-210 μm, even more preferably 160-200 μm, or 170-190 μm. This thickness refers to the average thickness of the nanocomposite coating on the substrate. In one embodiment, the nanocomposite coating has a density in a range of 0.92-1.30 g/cm$^3$, preferably 0.93-1.20 g/cm$^3$, more preferably 0.94-1.10 g/cm$^3$. In one embodiment, nanocomposite coating has a void volume percentage of less than 1%, preferably less than 0.5%, more preferably less than 0.1% or about 0%. A nanocomposite coating that is heated for a shorter time, at a lower temperature, or with large sized polyethylene microparticles may have a greater void volume percentage.

In one embodiment, the nanocomposite coating has a Vickers hardness in a range of 10.5-12.5 HV, preferably 10.7-12.4 HV, more preferably 10.9-12.3 HV, even more preferably 11.2-12.2 HV. In one embodiment, the nanocomposite coating has a Vickers hardness in a range of 9.0-12.5 HV, preferably 9.2-12.0 HV, more preferably 9.5-11.5 HV, even more preferably 10.0-11.5 HV. In one embodiment, the nanocomposite coating has a fracture toughness in a range of 10-1,000 Pa·m$^{1/2}$, preferably 50-700 Pa·m$^{1/2}$, more preferably 60-650 Pa·m$^{1/2}$. The fracture toughness may be determined by the indentation method or some other technique.

Figure 23:
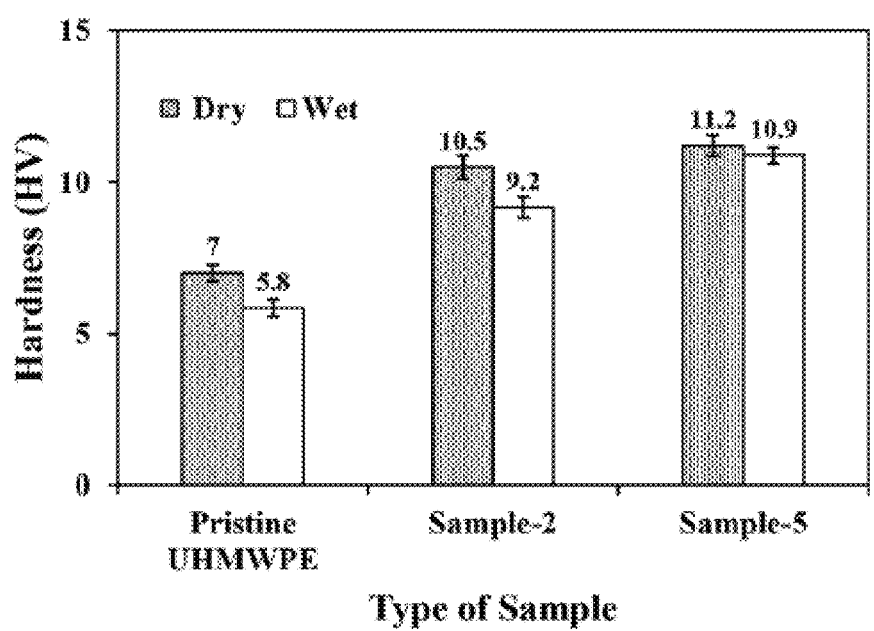
FIG. 23 shows the hardness values for pristine UHMWPE, Sample-2 (CNT-nanocomposite) and Sample-5 (hybrid nanocomposite) coatings before and after exposure to water for 10 h.

In one embodiment, the nanocomposite coating, after being in contact with water for a time of 8-18 h, preferably 9-15 h, more preferably about 10 h, has a Vickers hardness that is decreased by 0.01-4%, preferably 0.1-3%, more preferably 1-2.8%, or about 2.7% compared to a Vickers hardness before being in contact with water. For instance, a nanocomposite coating in a dry state may have a Vickers hardness of about 11.2 HV, and after being in contact with water for 10 h may have a Vickers hardness of about 10.9 HV (see FIG. 23). In one embodiment, the fracture toughness may decrease by a similar percentage. In one embodiment, the water may be pure water, though in another embodiment, the water may be within an aqueous solution. In one embodiment, the nanocomposite coating is submerged or completely covered with water or an aqueous solution; in another embodiment, the nanocomposite coating may be in contact with droplets of water or aqueous solution. In one embodiment, the nanocomposite coating in contact with water for 8-18 h, or longer, may have no measurable change in Vickers hardness.

Figure 11:
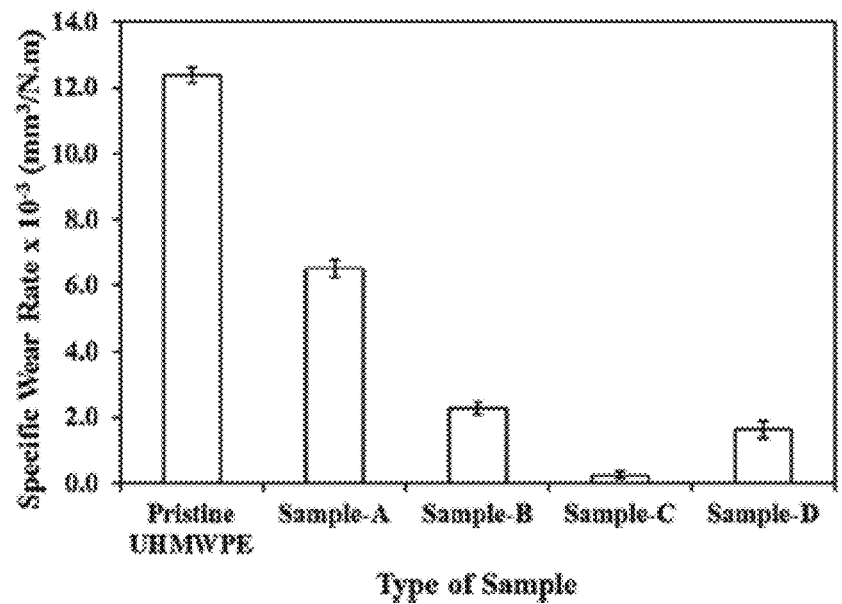
FIG. 11 shows specific wear rates of the coatings at a normal load of 12 N and a sliding velocity of 0.1 m/s.

In one embodiment, the nanocomposite coating has a wear resistance against a sliding normal load of 8-20 N, preferably 9-18 N, more preferably 10-17 N, or about 12 N or about 15 N, wherein the wear resistance is 20-30 times, preferably 22-28 times, or about 25 times a wear resistance of a substantially similar polyethylene coating that does not comprise nanoclay and functionalized carbon nanotubes (See FIG. 11). In one embodiment, the wear resistance is measured by a tribometer using a ball on disc configuration. In other embodiments, other tribometer configurations may be used such as four ball, pin on disc, ball on disc, ring on ring, ball on three plates, reciprocating pin, block on ring, bouncing ball, or twin disc. The wear to the nanocomposite coating may result from adhesive wear, abrasive wear, surface fatigue, fretting wear, and/or erosive wear. A material having a higher wear resistance means that it experiences less wear.

In one embodiment, the sliding normal load is a stainless steel ball having a diameter in a range of 5-10 mm, preferably 5.5-8 mm, more preferably 6-7 mm, or about 6.3 mm. In one embodiment, the stainless steel ball may comprise 440C stainless steel and may have a hardness value of about 62 RC. The sliding normal load may be applied to the nanocomposite coating at a linear speed in a range of 0.05-0.5 m/s, preferably 0.08-0.2 m/s, more preferably 0.09-0.15 m/s or about 0.1 m/s. A total sliding distance may be in a range of 500-2,000 m, preferably 800-1,500 m, more preferably 1,000-1,300 m. The sliding normal load may be applied for 10,000-300,000 cycles, preferably 50,000-250,000 cycles, more preferably 90,000-200,000 cycles, even more preferably 100,000-150,000 cycles. After 100,000 cycles exactly, the nanocomposite coating may have a wear track with a depth in a range of 10-130 μm, preferably 15-80 μm, more preferably 17-60 μm. In one embodiment, the nanocomposite coating has a wear rate in a range of $1 \times 10^{-6}$-$5 \times 10^{-4}$ mm$^3$/N·m, preferably $5 \times 10^{-6}$-$3 \times 10^{-4}$ mm$^3$/N·m, more preferably $1 \times 10^{-5}$-$1 \times 10^{-4}$ mm$^3$/N·m, where the unit mm$^3$/N·m represents the volume of material lost per weight of the sliding load per distance traveled by the sliding load. In one embodiment, the nanocomposite coating has a wear coefficient in a range of $5 \times 10^{-8}$-$1 \times 10^{-4}$, preferably $1 \times 10^{-7}$-$5 \times 10^{-5}$, more preferably $1.5 \times 10^{-7}$-$1 \times 10^{-6}$.

In another embodiment, the nanocomposite coating has a wear resistance against a sliding normal load of 8-20 N, preferably 9-18 N, more preferably 10-17 N, or about 12 N or about 15 N, wherein the wear resistance is 2-6 times, preferably 3.5-5.5 times, or about 5 times a wear resistance of a substantially similar polyethylene coating that does not comprise nanoclay and functionalized carbon nanotubes.

In one embodiment, the wear resistance may be related to a net loss of material, or the depth of a track formed on the nanocomposite coating following cycles of the sliding normal load. For instance, where the nanocomposite coating has a wear resistance 4 times a wear resistance of a substantially similar polyethylene coating that does not comprise nanoclay and functionalized carbon nanotubes, the nanocomposite coating may have a wear track that is 24 µm, while the polyethylene coating may have a wear track that is about 96 µm, for the same configuration of tribological testing (same number of cycles, same load, same speed, etc.). In one embodiment, the wear resistance may be related to a total number of cycles of wear until failure.

In another embodiment, the wear resistance may be related to the rate of material loss due to wear. For instance, as in FIG. 11, Sample-C has a wear rate of no greater than $0.5 \times 10^{-3}$ mm³/N·m, and pristine UHMWPE has a wear rate of about $12.5 \times 10^{-3}$ mm³/N·m. Pristine UHMWPE has a wear rate that is at least 25 times the wear rate of Sample-C; thus, Sample-C has a wear resistance that is at least 25 times that of Pristine UHMWPE.

In one embodiment, the nanocomposite coating may have a wear rate of $1 \times 10^{-3}$-$9 \times 10^{-3}$ mm³/N·m, $3 \times 10^{-3}$-$7 \times 10^{-3}$ mm³/N·m, or about $4.7 \times 10^{-3}$ mm³/N·m when submerged in water or an aqueous solution.

In another embodiment, the nanocomposite coating may have a reduced wear rate (and higher wear resistance) when in the presence of abrasives. In one embodiment, the wear rate may be reduced by 10-60%, preferably 20-50%, 30-48%, or about 45% when abrasives are added. Here, the abrasives include, but are not limited to, SiC, silica, tungsten carbide, ceramics, boron carbide, diamond, zirconia alumina, and cubic boron nitride. Here, the abrasives are located at the frictional interface of the nanocomposite coating. Preferably the abrasives are SiC. In one embodiment, the abrasives may have an average diameter in a range of 0.5-10 µm, preferably 1-8 µm, or about 6 µm. In one embodiment, the abrasives may cover 0.5-30%, preferably 0.8-20%, or 1-10% of a surface area of the nanocomposite. In the presence of water and abrasives, the nanocomposite coating may have a wear rate in a range of $5 \times 10^{-4}$-$8 \times 10^{-3}$ mm³/N·m, preferably $1 \times 10^{-3}$-$5 \times 10^{-3}$ mm³/N·m, more preferably $1.5 \times 10^{-3}$-$4 \times 10^{-3}$ mm³/N·m, or about $2.6 \times 10^{-3}$ mm³/N·m.

However, in another embodiment, the wear rate may be increased by 10-60%, preferably 20-50%, 30-48%, or about 45% when abrasives are added.

In one embodiment, the nanocomposite coating has a wear rate in a range of $2 \times 10^{-5}$-$6 \times 10^{-5}$ mm³/(N·m), preferably $3.0 \times 10^{-5}$-$5.5 \times 10^{-5}$ mm³/(N·m), more preferably $3.5 \times 10^{-5}$-$5.0 \times 10^{-5}$ mm³/(N·m) when under a normal load of 10-15 N, preferably 11-13 N with water lubrication (i.e. underwater or with liquid water present at the frictional interface) and a linear sliding speed in a range of 0.05-0.2 m/s, preferably 0.08-0.12 m/s or about 0.10 m/s.

In one embodiment, the nanocomposite coating has a coefficient of friction (preferably dry, kinetic friction) in a range of 0.15-0.25, preferably 0.17-0.23, more preferably 0.20-0.21. In one embodiment, the nanocomposite coating in contact with water has a coefficient of friction (water lubricated, kinetic friction) in a range of 0.10-0.20, preferably 0.11-0.19, more preferably 0.12-0.18.

Figure 26A:
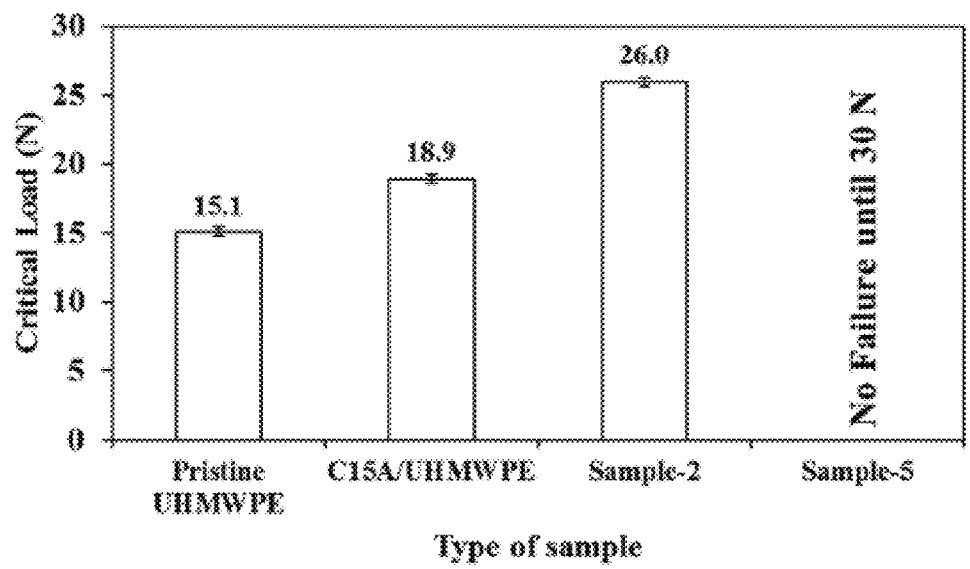
FIG. 26A shows the debonding strength of coatings, which here is represented as the applied load (Lc) at which the coatings started to peel off.
Figure 26B:
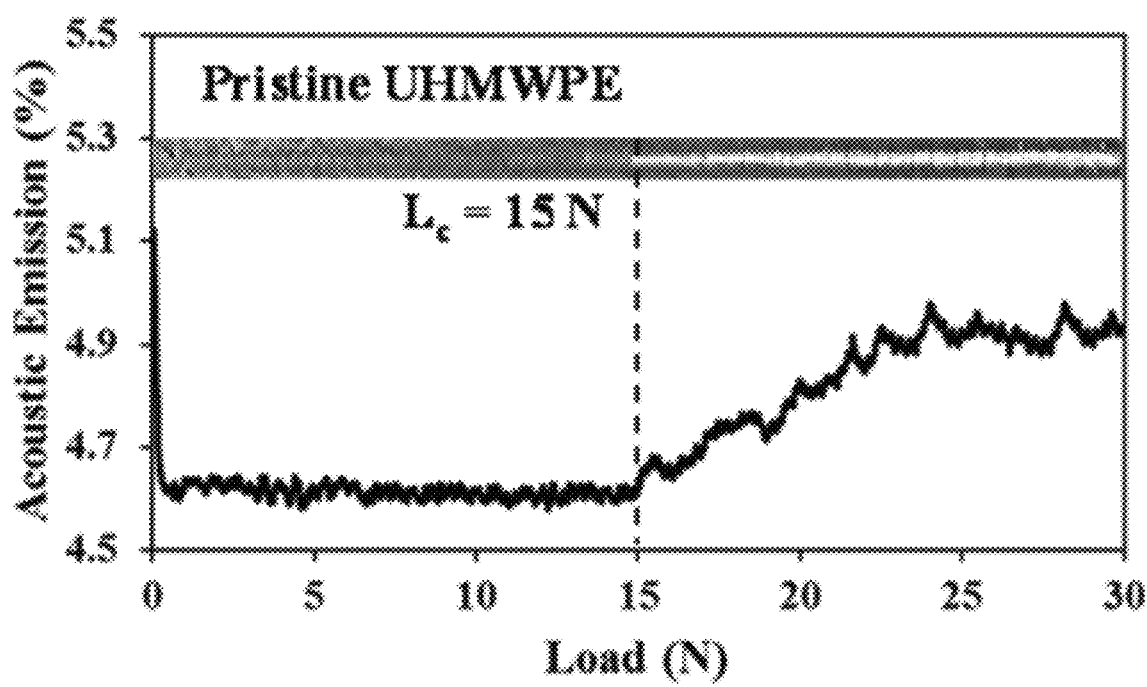
FIG. 26B is an acoustic emission graph corresponding to applied progressive load after scratch tests of pristine UHMWPE with corresponding optical panorama image.
Figure 26C:
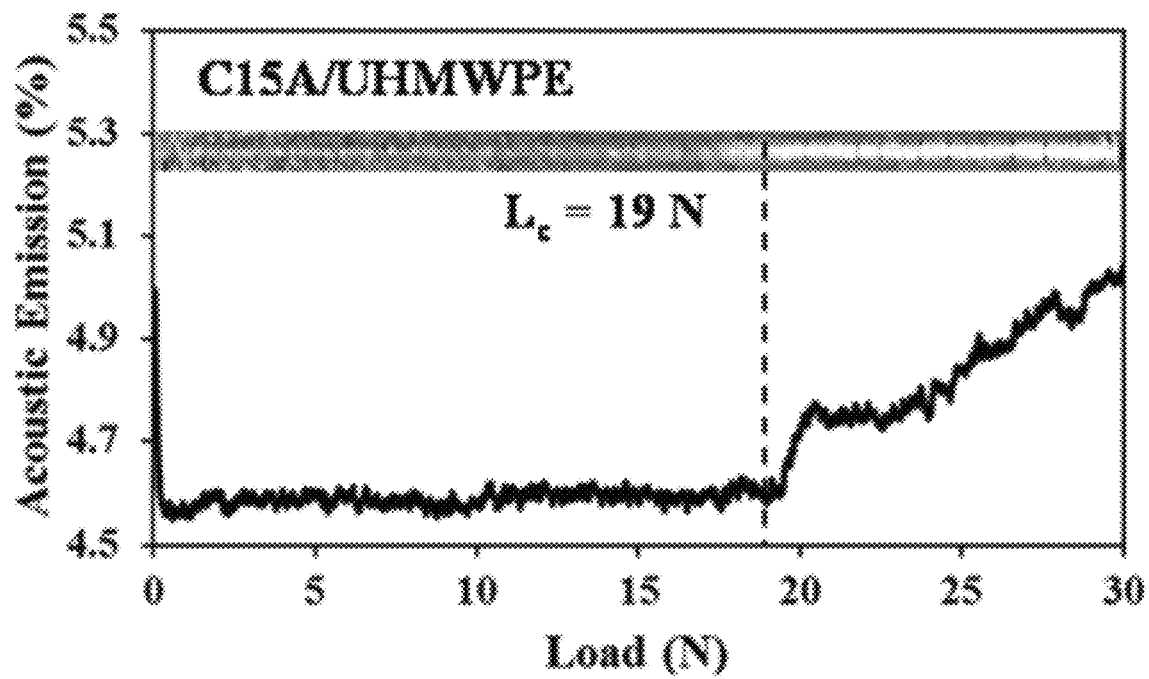
FIG. 26C is an acoustic emission graph corresponding to applied progressive load after scratch tests of C15A/UHMWPE with corresponding optical panorama image.
Figure 26D:
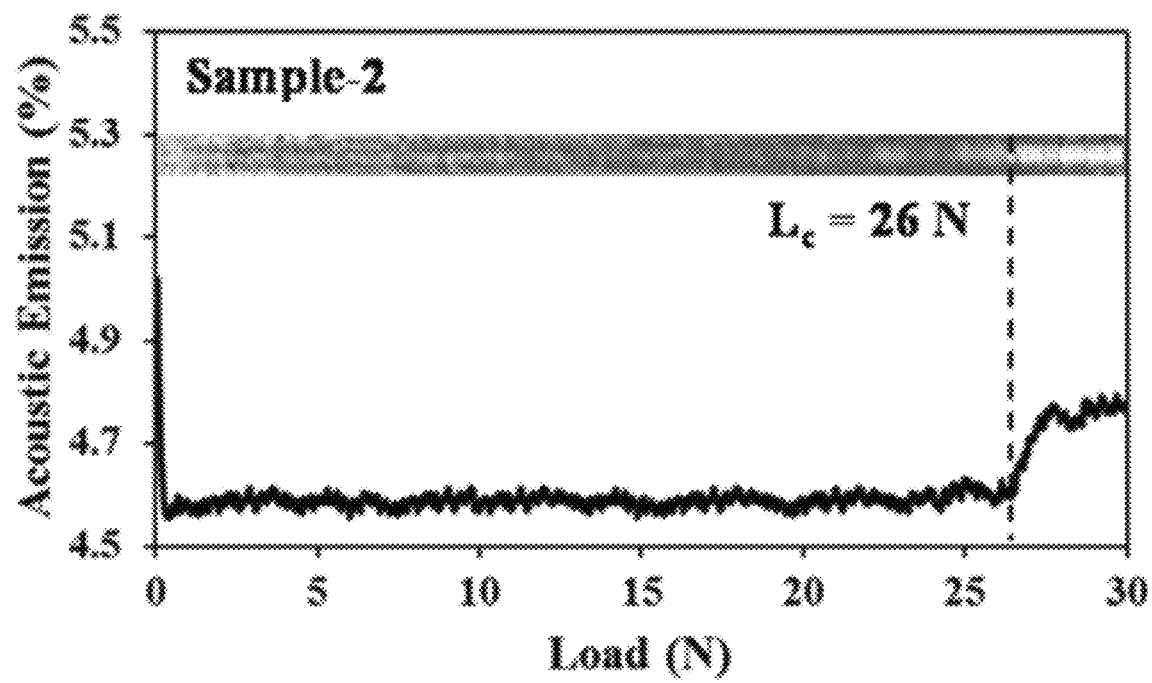
FIG. 26D is an acoustic emission graph corresponding to applied progressive load after scratch tests of Sample-2 with corresponding optical panorama image.
Figure 26E:
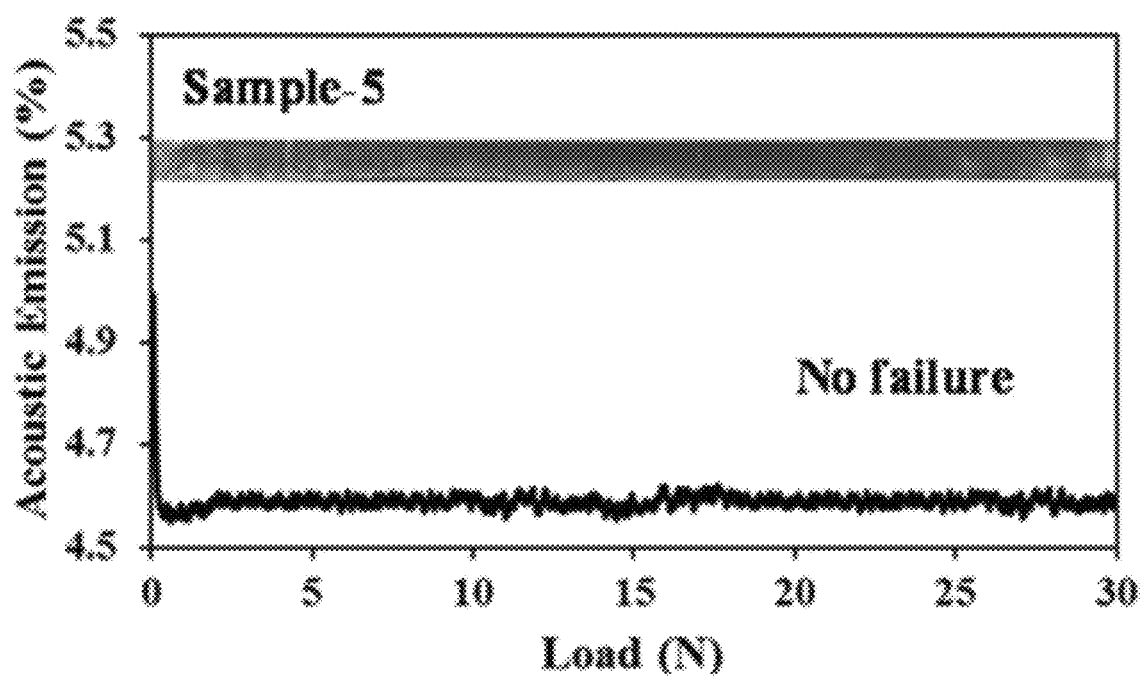
FIG. 26E is an acoustic emission graph corresponding to applied progressive load after scratch tests of Sample-5 with corresponding optical panorama image.
Figure 27A:
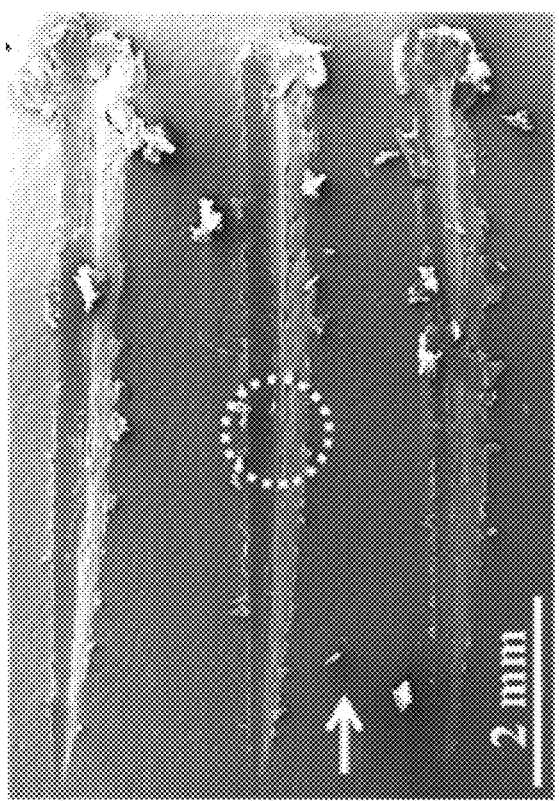
FIG. 27A is a low magnification SEM image of pristine UHMWPE after the scratch test, with the arrow indicating the sliding direction of the indenter.
Figure 27B:
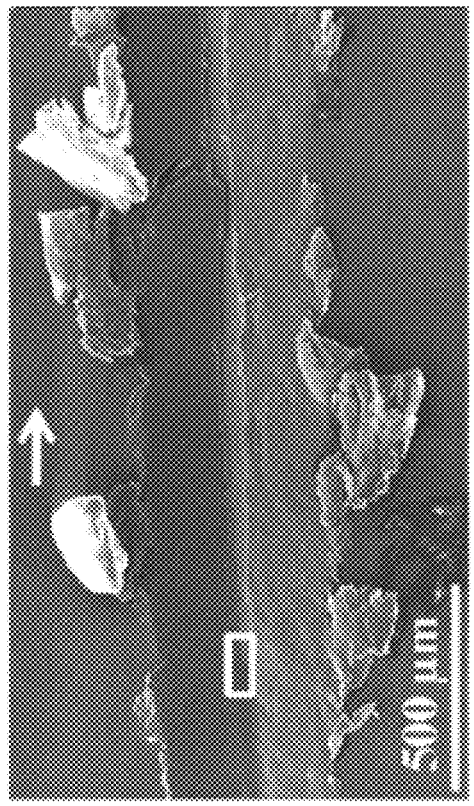
FIG. 27B is a zoomed-in SEM image of the dotted-circle region in FIG. 27A, corresponding to a particular critical load (Lc) for the sample and where the coating peel-off started, with the arrow indicating the sliding direction of the indenter.
Figure 27C:
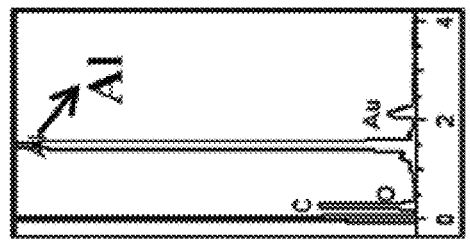
FIG. 27C is an EDS analysis of the rectangular boxed region of FIG. 27A.
Figure 27D:
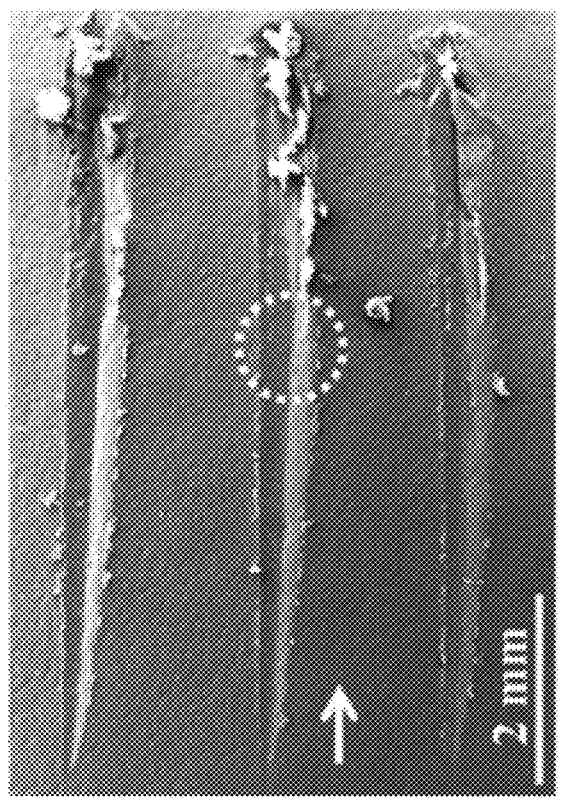
FIG. 27D is a low magnification SEM image of pristine UHMWPE after the scratch test, with the arrow indicating the sliding direction of the indenter.
Figure 27F:
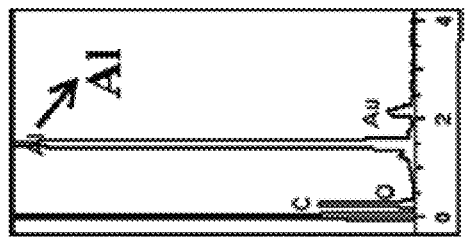
Figure 27E:
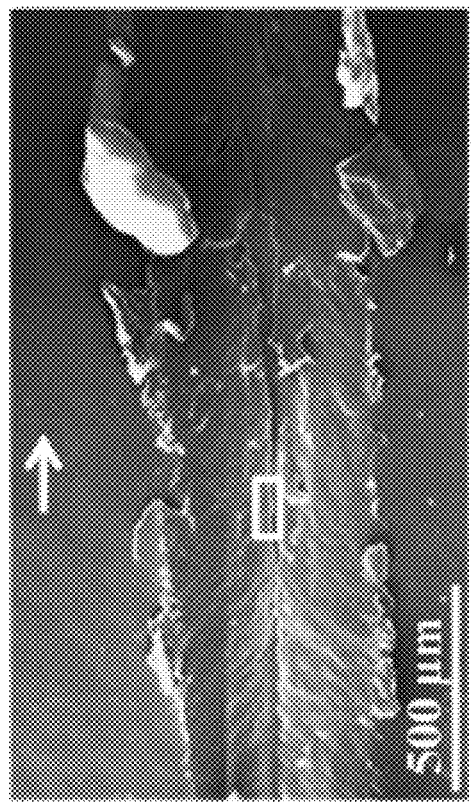
Figure 27G:
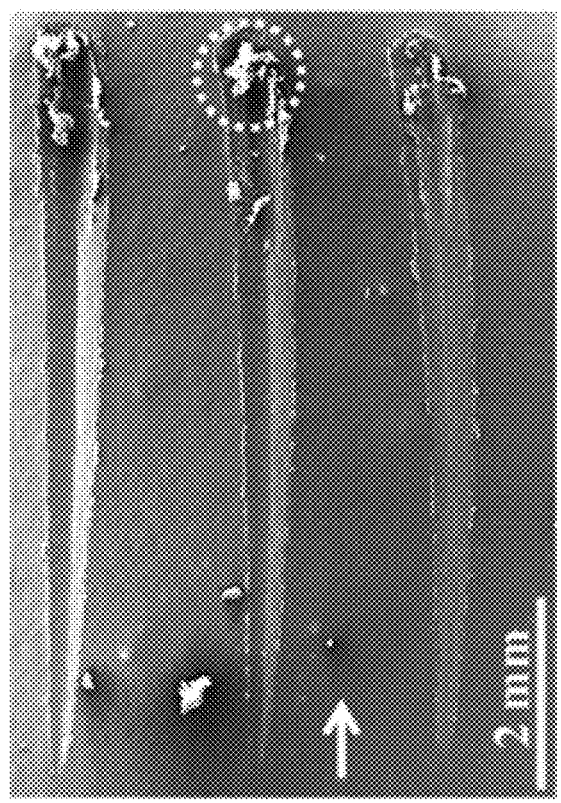
Figure 27I:
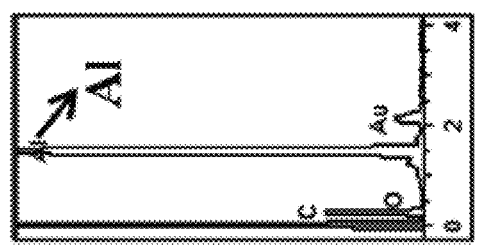
Figure 27H:
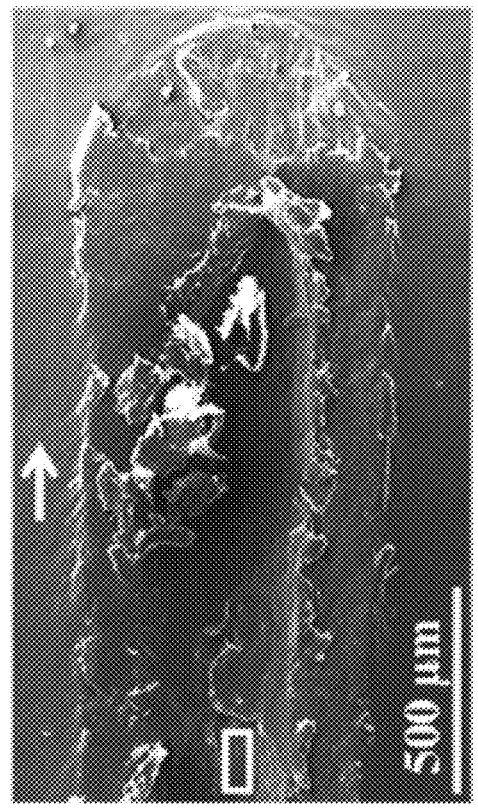
Figure 27J:
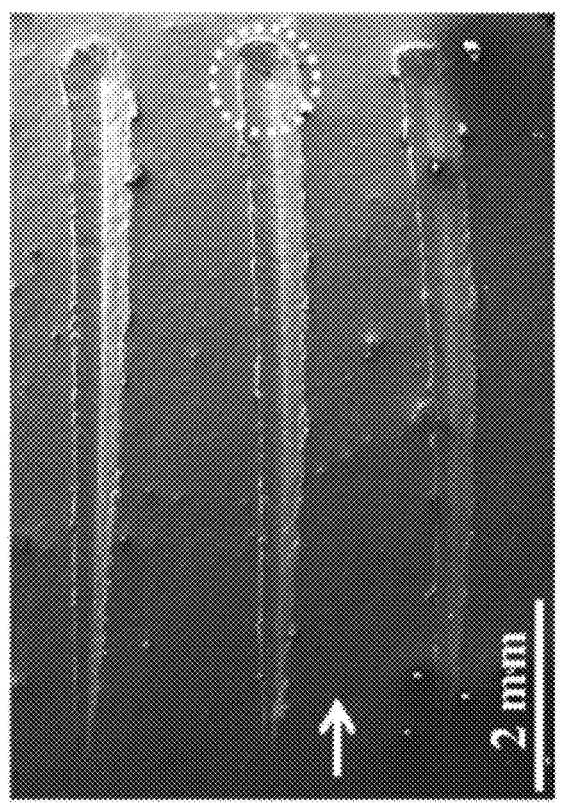
Figure 27L:
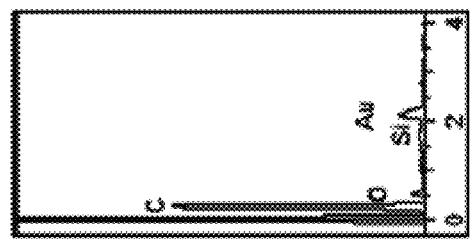
Figure 27K:
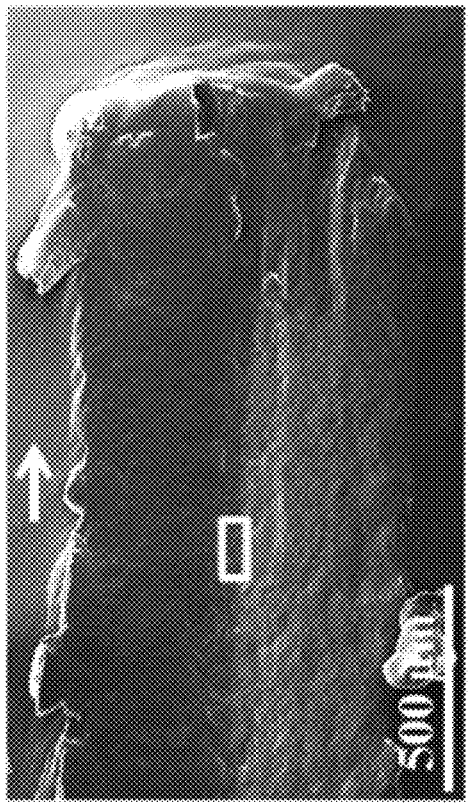

In one embodiment, the nanocomposite coating has a debonding strength of at least 25 N, at least 27 N, at least 30 N, at least 35 N, at least 40 N. In one embodiment, the debonding strength may be determined by a scratch test, for instance with a pyramidal shaped indenter of diamond or some other abrasive or hard material, with a tip radius of 50-150 µm, a speed of 3-8 mm/min, and a scratch length of 5-20 mm. In one embodiment, the debonding strength may be the minimum force at which the nanocomposite coating begins to peel off the substrate, and may be related to scratch resistance. The debonding strength may be determined in a scratch test, and by examining the scratch pattern or by measuring the acoustic emission of the sample while scratching. As shown in FIGS. 26B-26D, with increasing force, the acoustic emission increases at the point where debonding occurs.

In one embodiment, the mechanical properties of the nanocomposite coating, such as wear resistance and hardness are dependent on the substrate. For instance, switching to a softer substrate or thinner substrate may decrease the hardness measured of the nanocomposite coating. However, in other embodiments, the mechanical properties are independent of the type of substrate. In yet additional embodiments, some mechanical properties are dependent on the type of substrate while others are independent.

In one embodiment, the nanocomposite coating may be used in a medical implant, a piece of machinery (including for vehicles), containers, or in electronics housings. In other embodiments, the substrate of the nanocomposite coating may be steel that may be a part of a building, a bridge, a sign, a sculpture, an intermodal container, a wire, a train car, a railing, a cable, a ship, an aircraft, an automobile, a fire hydrant, a mailbox, a bicycle, a fence, a scaffolding, a pipeline, an oil well, a gas well, a storage tank, a construction equipment, a battery, a chain link, or a piece of furniture. The steel may be located outdoors, though in some instances the steel may be located indoors, such as an air duct, an exhaust hood, a plumbing, an electrode, or a part of an appliance. Preferably the steel may be prone to rusting or corrosion, such as steel located outdoors or otherwise exposed to humidity, acids, salts, or some other corrosive agent.

In one embodiment, a nanocomposite coating suffering wear or damage may be repaired or reinforced by heating as described in any of the previously mentioned heating steps. The worn or damaged nanocomposite coating may have an additional nanocomposite powder applied prior to the heating.

The examples below are intended to further illustrate protocols for preparing, characterizing the nanocomposite coating and uses thereof, and are not intended to limit the scope of the claims.

Example 1

Dry Conditions—Materials and Substrate

Ultrahigh molecular weight polyethylene (UHMWPE) powder was procured from Good Fellow Corp (Cambridge, UK) with following specifications: particle size=80-90 µm and density=0.94 g/cm³. Functionalized multiwalled carbon nanotubes were provided by Chemical Laboratory of KFUPM (Dhahran, Saudi Arabia), having an average diameter of 23±3 nm. Montmorillonite, i.e., CLOISITE (C15A)

clay modified with quaternary dimethyl dihydrogenated ammonium was procured from Southern Clay Product (Gonzales, Tex.) having a specific gravity of 1.7-1.9 and a platelet size of 8-15 μm. Aluminum alloy (Fe=0.15%, Si=0.17%, Mn=0.5%, Mg=0.6%, Cr=0.1%, Ni=0.3% and the rest=Al) was used as a substrate with sample size of 25×25×6 mm. Aluminum was selected because of its growing demand in many tribological applications in view of its light weight and high strength to weight ratio. See Sinha, S. K., Lee, C. B., and Lim, S. C., 2008, "Tribological Performance of UHMWPE and PFPE Coated Films on Aluminium Surface," Tribol. Lett., 29(3), pp. 193-199.

Preparation of Nanocomposite Powders

Table 1 shows compositions of three sets of samples with their designations used in this paper. Nanocomposite powders were prepared by using sonication method coupled with magnetic stirring. A weighted amount of required filler(s) was sonicated for 10 min by using a probe sonicator in 50 mL of ethanol with an amplitude of 30% and an on/off cycle time of 20/5 s. The mixture of filler(s) and ethanol was then magnetically stirred at 1000 rpm for 2 min using magnetic stirrers to further disperse the fillers uniformly. A weighted amount of UHMWPE powder was then added to the mixture, and this nanocomposite mixture was left for magnetic stirring for 1 h. Finally, this nanocomposite powder solution was placed in a furnace at 80° C. for 24 h for the complete evaporation of ethanol.

Coating Procedure

Prior to coating, the substrate was grinded by using two different grit size papers (120 and 240) to obtain a final roughness of 0.4±0.05 μm. After grinding, samples were cleaned with acetone by using an ultrasonic cleaning method for 15 min and then dried using an air blower followed by plasma treatment using Harrick Plasma equipment for 10 min with a radio-frequency power of 30 W. It has been observed in previous research that plasma treatment helps in cleaning the samples properly and functionalizing the surface, resulting in a significant increase in its surface free energy which helps in increasing the adhesion between the substrate and the coating. See Samad, M. A., Satyanarayana, N., and Sinha, S. K., 2010, "Tribology of UHMWPE Film on Air-Plasma Treated Tool Steel and the Effect of PFPE Overcoat," Surf. Coat. Technol., 204(9-10), pp. 1330-1338.

A Craftsman® electrostatic spray gun (Model no. 17288) was used for the deposition of powders onto the aluminum substrates. Cleaned and plasma-treated substrates were preheated for 5 min at 180° C. and then the powder of the required composition was sprayed onto the preheated substrates to obtain a uniform coating of the powder. The powder-coated samples were subjected to a post-heat treatment process on the heating plate at 180° C. for 30-35 min and then air cooled for uniform consolidation of the polymer powder.

TABLE 1

Classification and designation of samples used in this work.

| Composition | Sample designation |
|---|---|
| 1.5 wt % C15A/UHMWPE | A |
| 1.5 wt % C15A/0.5 wt % CNT/UHMWPE | B |
| 1.5 wt % C15A/1.5 wt % CNT/UHMWPE | C |
| 1.5 wt % C15A/3 wt % CNT/UHMWPE | D |

Example 2

Dry Conditions—Characterization Techniques
Raman Spectroscopy

Raman spectroscopy was performed on hybrid nanocomposites to analyze the interfacial interaction of CNTs within UHMWPE matrix by using a Raman microscope (DXR™, Thermo Scientific®). The following parameters were used for the analysis: laser power=1-2 mW, laser wavelength=455 nm, aperture=50 mm, and spot size=0.6 mm. On each of the samples, three spectra were obtained at different locations, and the typical images are presented.

Dispersion Analysis and Thickness Measurements of the Coatings

Field emission scanning electron microscope (FESEM) equipped with Schottky field emission gun (TESCAN®, Brno, Czech Republic) was also used to analyze the typical dispersion of nanofillers in the UHMWPE matrix. The analysis was carried out with the help of a secondary electron detector at a voltage of 20 kV at various locations and typical images are presented. Coating thicknesses were measured by analyzing cross-sectional images of the coated samples with the help of FE-SEM. A thin gold coating was deposited on each sample, prior to analysis, to make it conductive. Three readings for each set of samples were taken, and the average value of the coating thicknesses is reported.

Hardness Measurement of the Coatings

Microindentation equipment provided by CSM Instruments® was used to measure hardness. Normal load of 0.2 N was applied for 10 s with a constant loading and unloading rate of 0.4 N/min with the help of a pyramidal-shaped diamond indenter. Ten readings on each sample at different locations were taken and the average value is reported. It was made certain that the penetration depth was less than 10% of the coating thickness to avoid substrate effects during indentation. See Oliver, W. C., and Pharr, G. M., 1992, "An Improved Technique for Determining Hardness and Elastic Modulus Using Load and Displacement Sensing Indentation Experiments," J. Mater. Res., 7(6), pp. 1564-1583—incorporated herein by reference.

Tribological Evaluation of the Coatings

Ball-on-disk configuration was used to conduct friction and wear tests on coated samples by using a tribometer (UMT-3) under dry conditions. Stainless steel ball of grade 440C (ø=6.3 mm, hardness=62 RC) was used as counterface at room temperature while the relative humidity was 50±5%. Before each test, the counterface ball was cleaned with acetone. After every test, the counterface ball was observed under an optical microscope (MT7000, Meiji, Japan) to analyze the transfer film phenomenon before and after cleaning of the ball with acetone. Three wear tests were performed for each set of samples, and the average value of wear life is reported. The specific wear rate of the coatings was calculated from the total volume of the material lost (as calculated from the wear profiles) divided by the applied normal load and sliding distance.

Evaluation of the Wear Morphology and Mechanism

A field emission scanning electron microscope was used for wear track analysis in order to understand wear morphology and type of wear mechanisms involved. Energy-dispersive X-ray spectroscopy (EDS) was carried out for confirmation of coating failures by analyzing the composition of coatings inside and outside the wear tracks. Thin gold coating was deposited on each sample prior to SEM analysis to avoid charging effect on the surface of polymer coatings. Moreover, two-dimensional (2D) and three dimensional (3D) wear profiles were recorded to measure the depth of wear track (Z) with the help of an optical profilometer (GTK-A, Bruker).

Example 3

Dry Conditions—Results and Discussion
Evaluation of Carbon Nanotube Dispersion in Ultrahigh Molecular Weight Polyethylene Matrix Using Raman Spectroscopy FIG. 1 shows the Raman spectra of hybrid nanocomposite powders along with the spectra of UHMWPE and CNTs in the range of 1000-2000 $cm^{-1}$. The characteristic peaks for CNTs, corresponding to D and G bands, are at 1360 $cm^{-1}$ and 1575 $cm^{-1}$. The D band delineates disordered graphitic structures, and the G band is due to tangential stretching of the C—C bond. See Nemanich, R. J., and Solin, S. A., 1979, "First- and Second-Order Raman Scattering From Finite-Size Crystals of Graphite," Phys. Rev. B, 20(2), pp. 392-401; Saito, R., Dresselhaus, G., and Dresselhaus, M., 1998, *Physical Properties of Carbon Nanotubes,* Imperial College Press, London.

Pristine UHMWPE shows its characteristic peaks at 1064 $cm^{-1}$, 1130 $cm^{-1}$, 1297 $cm^{-1}$, and 1440 $cm^{-1}$. The characteristic peaks at 1064 $cm^{-1}$ and 1130 $cm^{-1}$ represent asymmetric and symmetric stretching modes of C—C bonds, whereas peaks at 1297 $cm^{-1}$ and 1440 $cm^{-1}$ indicate twisting and bending modes of $CH_2$. See Kip, B. J., Eijk, M. C. V., and Meier, R. J., 1991, "Molecular Deformation of High-Modulus Polyethylene Fibers Studied by Micro-Raman Spectroscopy," J. Polym. Sci. Part B, 29(1), pp. 99-108; Naylor, C. C., Meier, R. J., Kip, B. J., Williams, K. P. J., Mason, S. M., Conroy, N., and Gerrard, D. L., 1995, "Raman Spectroscopy Employed for the Determination of the Intermediate Phase in Polyethylene," Macromolecules, 28(24), pp. 2969-2978; and Wunder, S. L., and Merajver, S. D., 1986, "Ultrahigh-Molecular-Weight Polyethylene: Raman Spectroscopic Study of Melt Anisotropy," J. Polym. Sci. Part B, 24(1), pp. 99-110.

FIG. 1 shows that with the addition of CNTs in UHMWPE, the G band in all hybrid nanocomposites shifted toward higher frequencies. However, the maximum shift of 14 $cm^{-1}$ in the G band was observed for sample-C (1.5% C15A/1.5% CNTs/UHMWPE). The up-shift of the G band toward higher frequencies can be attributed to the disentanglement of the CNTs followed by uniform dispersion in the matrix as a result of polymer penetration into the CNT bundles. The up-shift also represents strong compressive stresses associated with polymer chains on multiwalled carbon nanotubes indicating good load transfer in the coatings. See McNallya, T., Potschke, P., Halley, P., Murphy, M., Martin, D., Bell, S. E. J., Brennan, G. P., Bein, D., Lemoine, P., and Quinn, J. P., 2005, "Polyethylene Multiwalled Carbon Nanotube Composites," Polymer, 46(19), pp. 8222-8232.

Evaluation of Dispersion of Nanofillers and the Coating Thickness Measurements Using Field Emission Scanning Electron Microscope Field emission scanning electron microscope (FESEM) images were also evaluated to conduct the dispersion analysis of nanofillers in polymer matrix as shown in FIGS. 2A-2E. There were no or negligible signs of nanoclay and CNTs agglomeration for samples-B and C, but sample-D showed agglomerates or clusters of nanoclay and CNTs, which indicates the ineffective dispersion and bonding between polymer and nanofillers as the CNT content increased.

In FIGS. 3A-3E, thicknesses of the coatings are reported which are the average of three readings with a variation of ±5 µm. In case of pristine UHMWPE coating and sample-A (1.5 wt % C15A/UHMWPE), thickness was found to be about 130 µm. However, in the case of hybrid nanocomposite coatings, similar but higher values of approximately 180 µm were observed. This increase in the thickness was in contrast to that as observed in our previous studies whereby dip coating was used to coat a steel substrate with UHMWPE nanocomposite coating reinforced with CNTs. See previously-cited references Mohammed et al. (2016); and Samad et al. (2011). This was attributed to the presence of CNTs which have a very high thermal conductivity which helps in dissipating the heat uniformly in all directions. This uniform distribution of heat in the matrix causes the free uniform flow of polymer resulting in reduced thickness. However, herein a different coating procedure was used, whereby electrostatic spray gun was used to coat the substrate. It is to be noted that in this case the nanocomposite powder (without being dissolved in a solvent) was deposited on a preheated substrate in the first stage. These powder particles fuse to the preheated substrate without actual melting. After this coating procedure, the substrate coated with the nanocomposite powder is subjected to a post-heat treatment process at a temperature of 180° C., which is much above the melting temperature of the polymer for the consolidation of the coating. The increase in thickness in this case may be attributed to the presence of the high concentration of CNTs in the polymer matrix, which increases the viscosity of the molten polymer leading to a reduction in the free flow of the polymer. Moreover, the CNTs may also act as obstacles hindering the smooth flow of the polymer during the post-heat treatment process, resulting in increased thickness.

Figure 4:
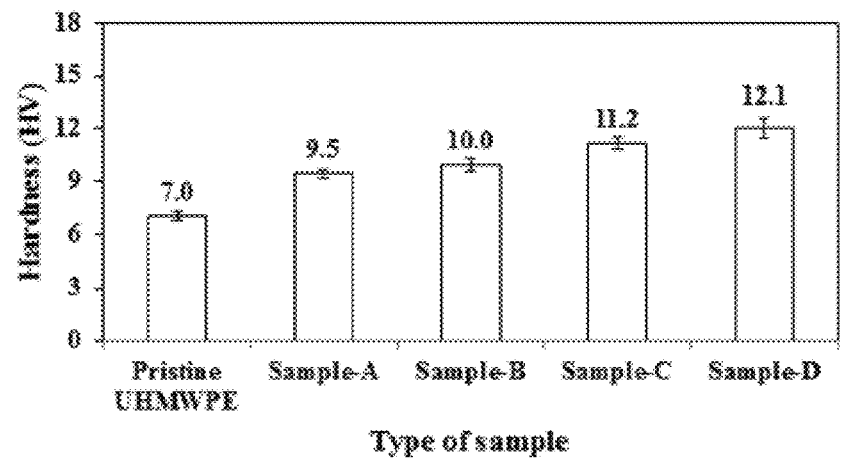
FIG. 4 shows the hardness of the coatings with different loadings of C15A/CNTs
Figure 5A:
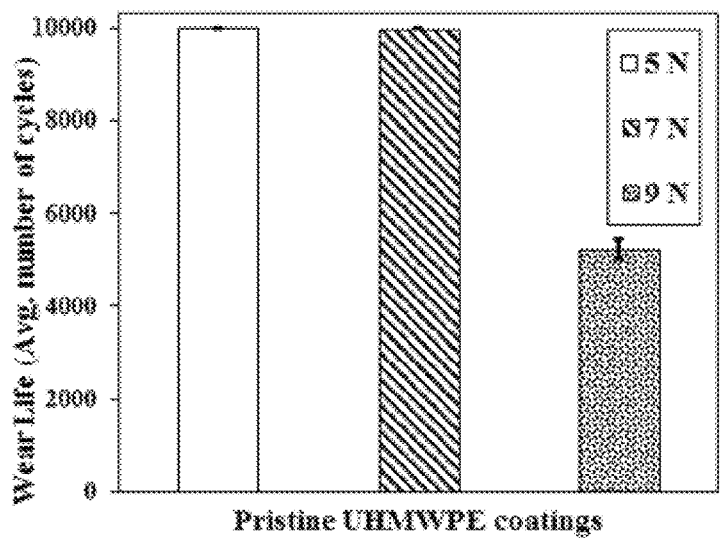
FIG. 5A shows the average wear life of pristine UHMWPE coatings under loads of 5, 7, and 9 N.
Figure 5B:
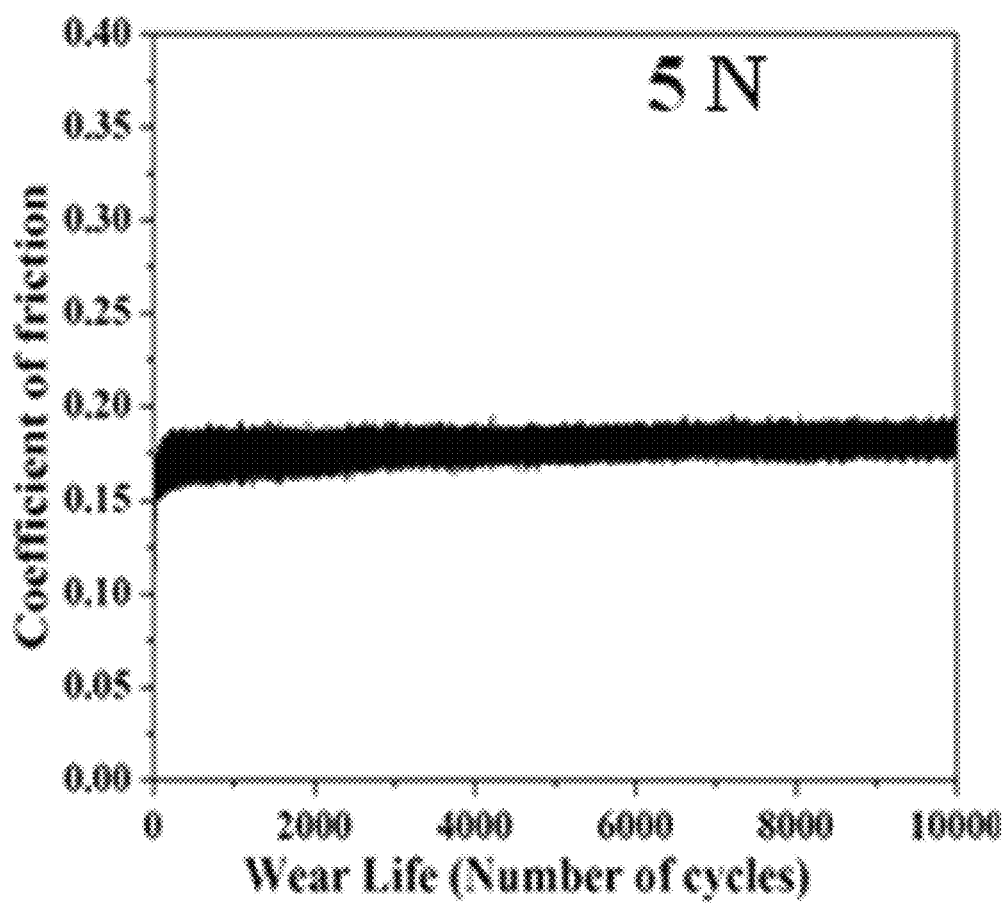
FIG. 5B shows a frictional graph of a pristine UHMWPE coating under a 5 N load and 0.1 m/s linear sliding velocity.
Figure 5C:
FIG. 5C shows the wear track produced in FIG. 5B.
Figure 5D:
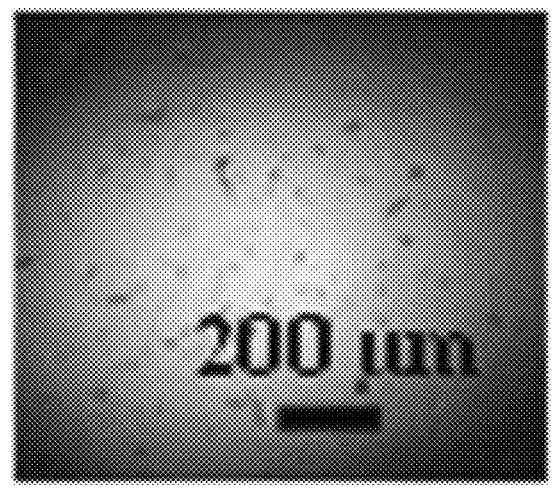
FIG. 5D shows a 10× image of the counterface after sliding to produce the graph in FIG. 5B and after cleaning with acetone.
Figure 5E:
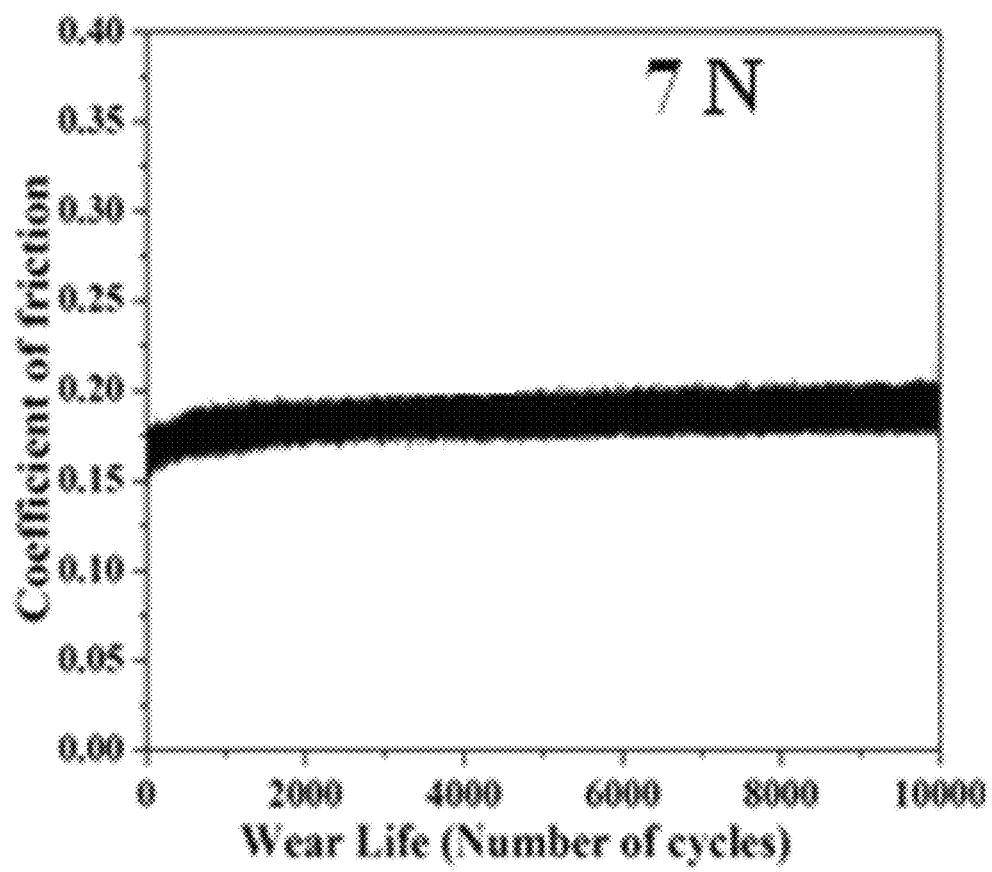
FIG. 5E shows a frictional graph of a pristine UHMWPE coating under a 7 N load and 0.1 m/s linear sliding velocity.
Figure 5F:
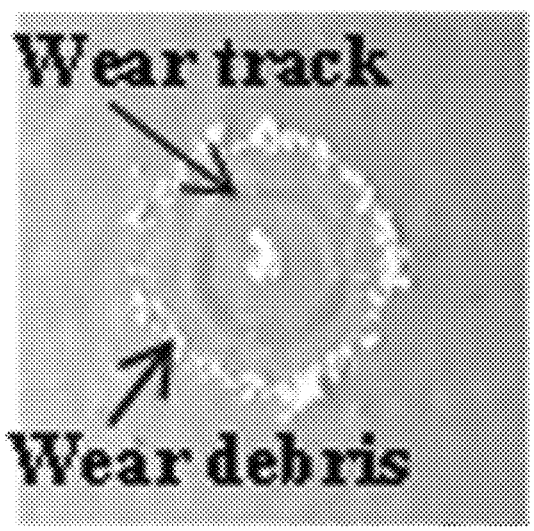
FIG. 5F shows the wear track produced in FIG. 5E.
Figure 5G:
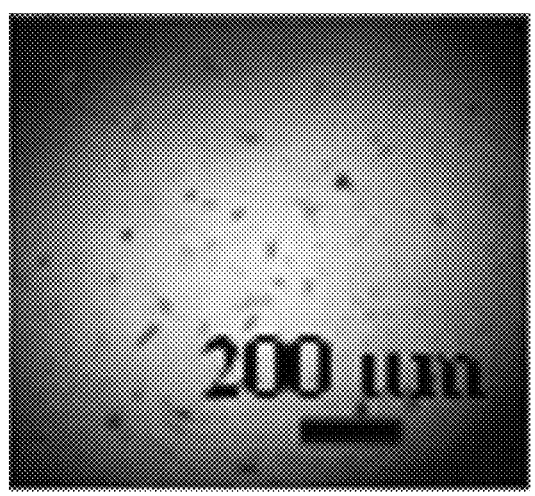
FIG. 5G shows a 10× image of the counterface after sliding to produce the graph in FIG. 5E and after cleaning with acetone.

Evaluation of Hardness of Pristine, C15A Nanocomposite and Hybrid Nanocomposite Coatings In general, an increase in hardness was observed with the addition of nanofillers (nanoclay and CNTs) in polymer matrix. In case of C15A-nanocomposite coating, the improvement in hardness is associated with clay platelets that participated in anchoring the polymer matrix. In the case of hybrid-nanocomposite coating, the improvement in hardness is associated with the excellent mechanical properties of clay platelets along with CNTs in the soft matrix holding the polymer chains together, resulting in greater resistance to penetration or indentation. Hence, maximum hardness was observed for sample-D (1.5 wt % C15A/3 wt % CNTs/UHMWPE). FIG. 4 compares the average hardness values of all types of the coatings.

Evaluation of the Tribological Performance of the Pristine, C15A-Nanocomposite and Hybrid Nanocomposite Coatings To evaluate the load bearing capacity of the pristine UHMWPE coating, initial sliding tests were performed on pristine UHMWPE coatings at different normal loads (5, 7, and 9 N) at a linear sliding speed of 0.1 m/s (480 rpm) for 10,000 cycles, corresponding to a sliding distance of 125 m. The wear track radius for all the tests was kept constant at 2 mm. It is to be noted that the wear tests were stopped in case there was an indication of a large value of COF (beyond 0.3), suggesting a metal to metal contact because of the failure of the coating. FIGS. 5A-5J show the average wear life in terms of cycles and typical frictional graphs for pristine UHMWPE coatings at three different loads as mentioned earlier. It can be observed from the frictional graphs that pristine UHMWPE coating failed at a normal load of 9 N just after 5,000 cycles. The photograph of the wear track showing the exposed substrate and the scar mark on the counterface ball also confirmed the failure of coating at 9 N load, which was not observed for coatings tested at 5 and 7 N, respectively.

Figure 6A:
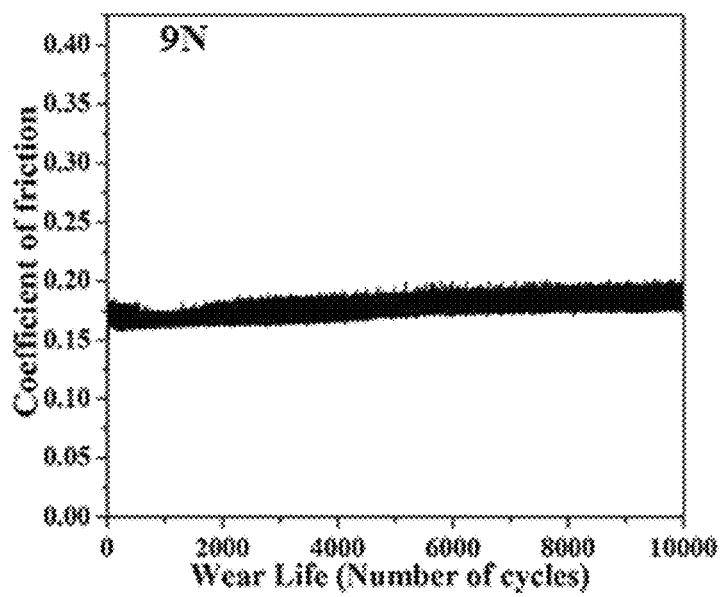
FIG. 6A shows a frictional graph of Sample A (1.5 wt % C15A/UHMWPE nanocomposite) produced by a wear test performed at normal load of 9 N and a sliding speed of 0.1 m/s.
Figure 6D:
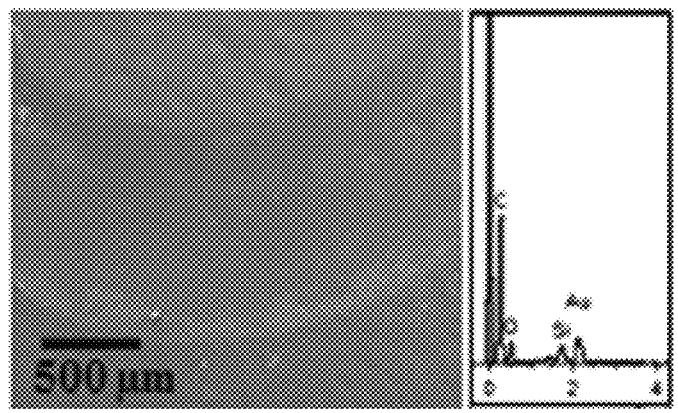
FIG. 6D is an image of the counterface ball after the wear test of FIG. 6A and cleaning with acetone.
Figure 6D:
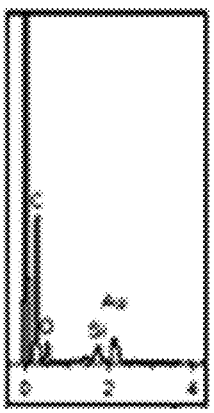
Figure 6D:
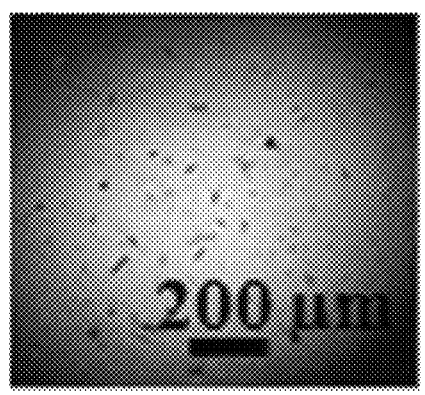
Figure 6E:
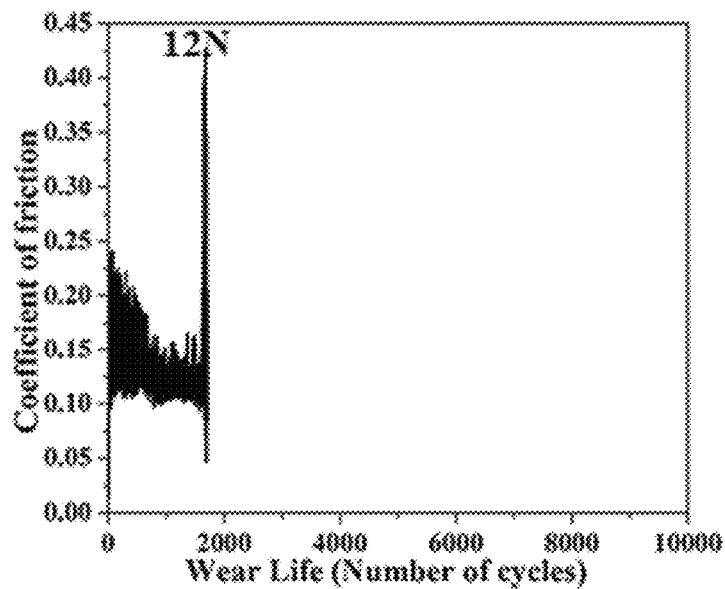
FIG. 6E shows a frictional graph of Sample A (1.5 wt % C15A/UHMWPE nanocomposite) produced by a wear test performed at normal load of 12 N and a sliding speed of 0.1 m/s.
Figures 6F, 6G:
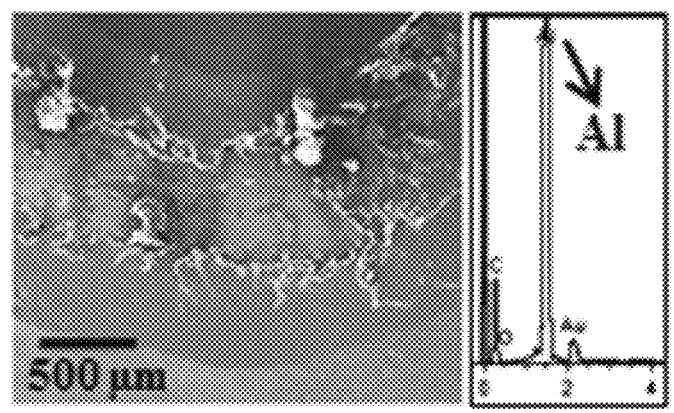
FIG. 6F shows and FESEM image of the wear track produced in FIG. 6E.
FIG. 6G shows an EDS analysis of the wear track produced in FIG. 6E.
Figure 6H:
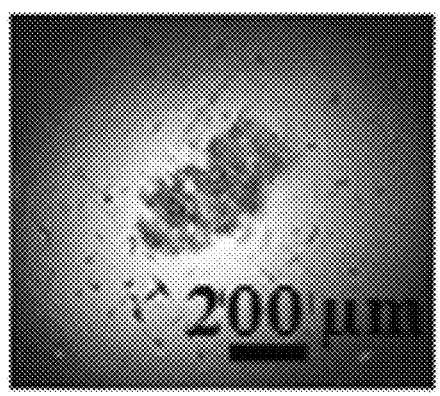
FIG. 6H is an image of the counterface ball after the wear test of FIG. 6E and cleaning with acetone.

To enhance the load bearing capacity of the pristine coating, C15A-nanocomposite coating with loading of nanoclay (1.5 wt %) was developed and evaluated at normal loads of 9 and 12 N, respectively. See previously-cited Mohammed et al. (2017). It was observed that the nanocomposite coating did not fail until 10,000 cycles at a normal load of 9 N, indicating the improved wear resistance as compared to the pristine coating. The improvement in wear resistance is attributed to the presence of clay platelets which help in anchoring the polymer chains in the polymer matrix, preventing them from being pulled out. However, the C15A-nanocomposite coating failed at a higher normal load of 12 N, showing a wear life of 2,000 cycles as can be seen in FIG. 6E. FE-SEM images of the wear tracks of sample-A (1.5 wt % C15A/UHMWPE) after sliding tests conducted at normal loads of 9 and 12 N, respectively, along with their corresponding EDS analysis on the wear track, and counterface ball images are all shown in FIGS. 6A-6H. It can be seen that at 12 N there was a complete failure of the coating as EDS confirmed the peaks of bare aluminum substrate (which appears at 1.49 keV) on the wear track. Also, a scar mark on counterface ball image due to the metal-to-metal contact is a clear indication of the failure of the coating at 12 N. However, no peak of bare aluminum substrate on the wear track was observed at a normal load of 9 N, which confirmed that this coating did not fail at this load.

Figure 2A:
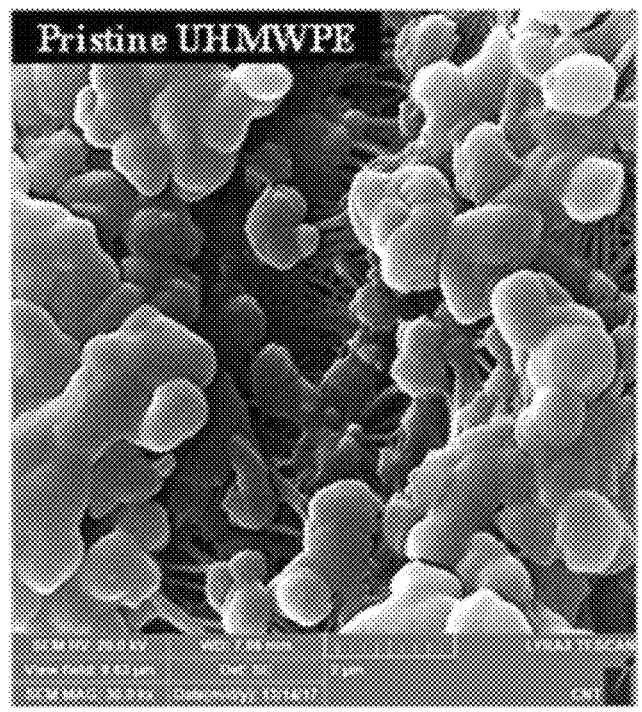
FIG. 2A is a field emission SEM image of the pristine UHMWPE sample for dispersion analysis.
Figure 2B:
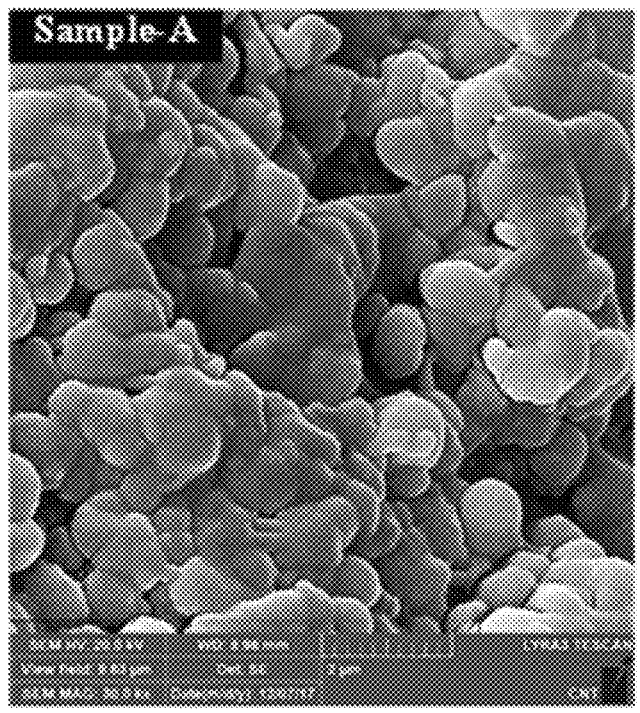
FIG. 2B is a field emission SEM image of Sample A for dispersion analysis.
Figure 2C:
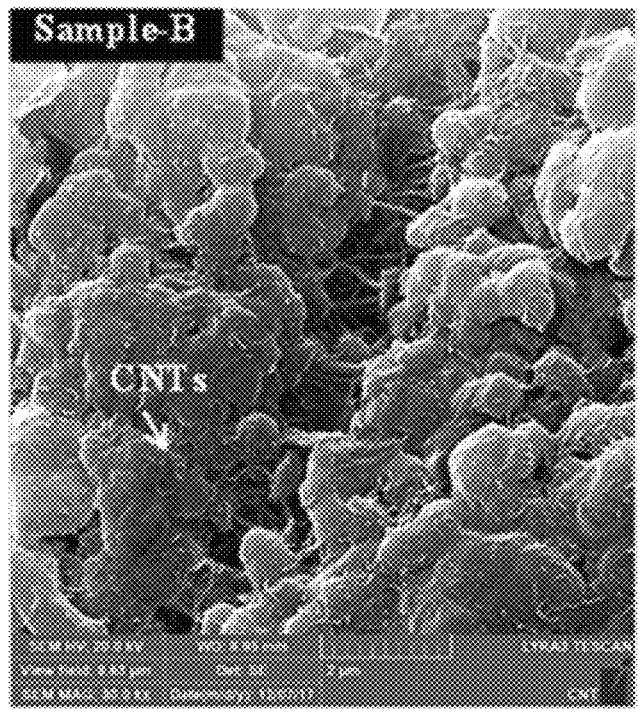
FIG. 2C is a field emission SEM image of Sample B for dispersion analysis.
Figure 2D:
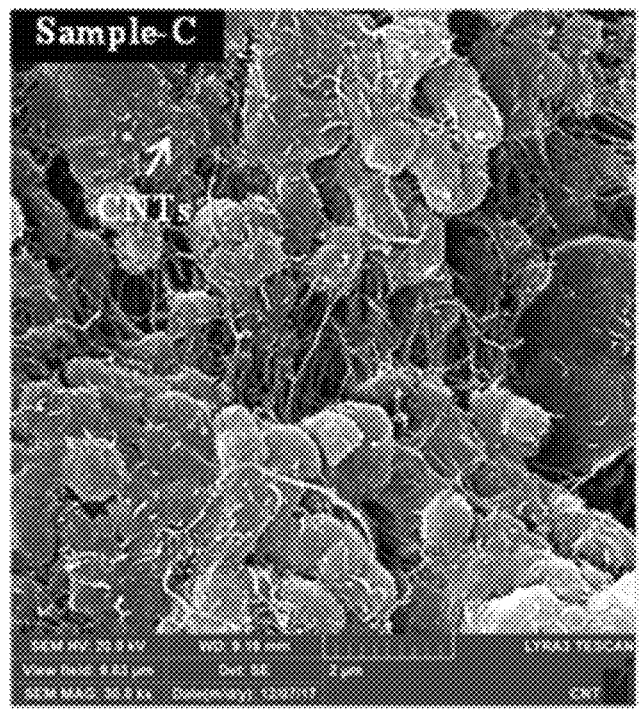
FIG. 2D is a field emission SEM image of Sample C for dispersion analysis.
Figure 2E:
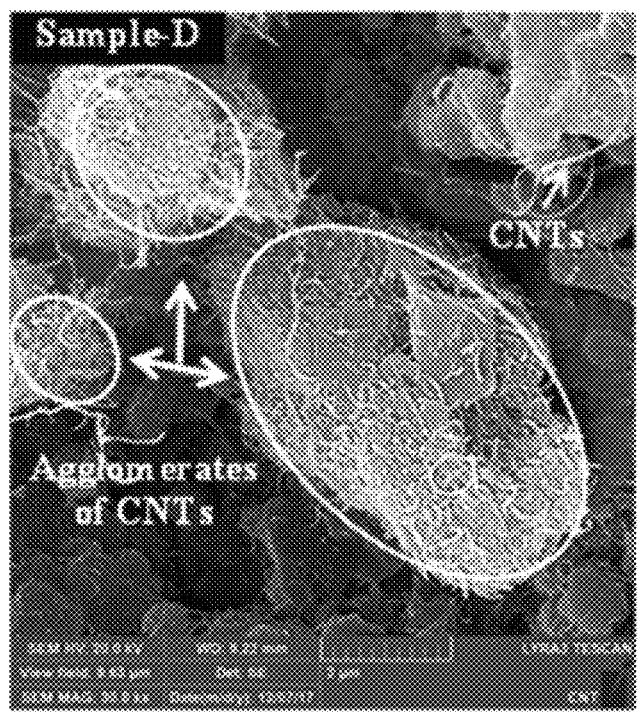
FIG. 2E is a field emission SEM image of Sample D for dispersion analysis.
Figure 3B:
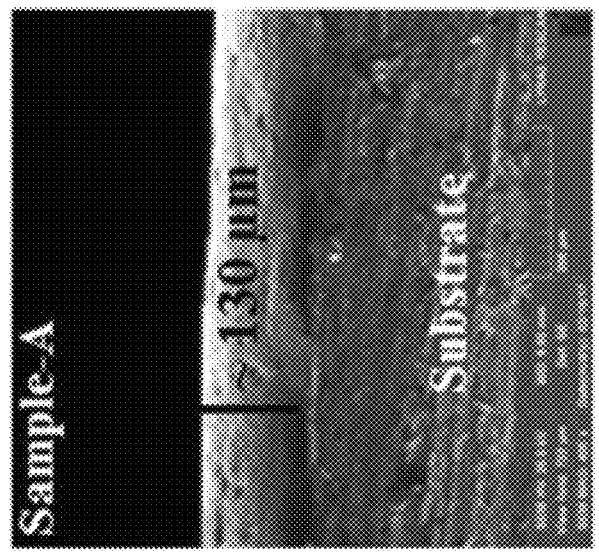
FIG. 3B is a cross-sectional FE-SEM image of Sample A.
Figure 3A:
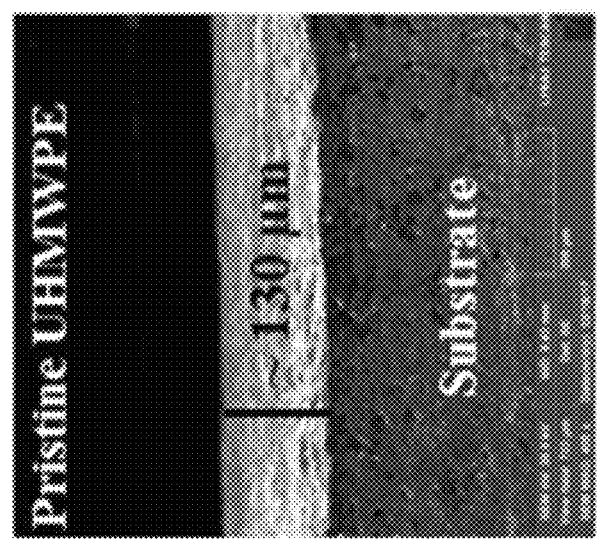
FIG. 3A is a cross-sectional FE-SEM image of the pristine UHMWPE sample.
Figures 3C, 3D, 3E:
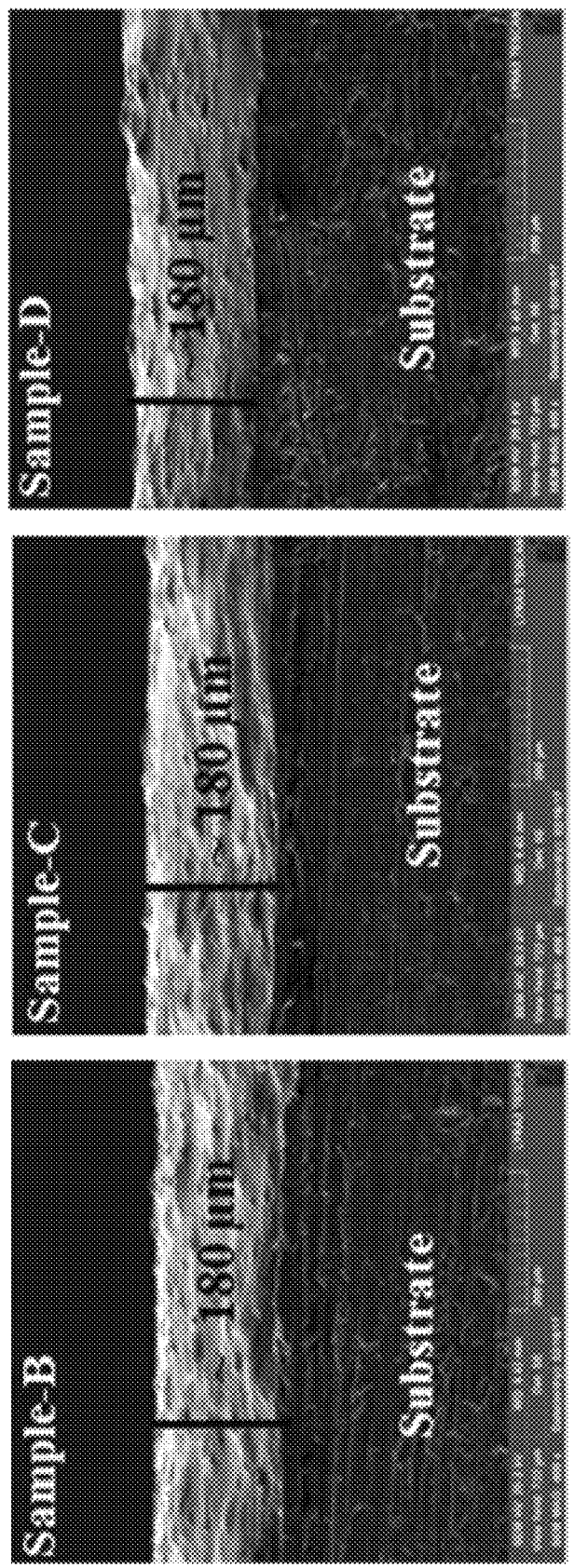
FIG. 3C is a cross-sectional FE-SEM image of Sample B.
FIG. 3D is a cross-sectional FE-SEM image of Sample C.
FIG. 3E is a cross-sectional FE-SEM image of Sample D.
Figure 7:
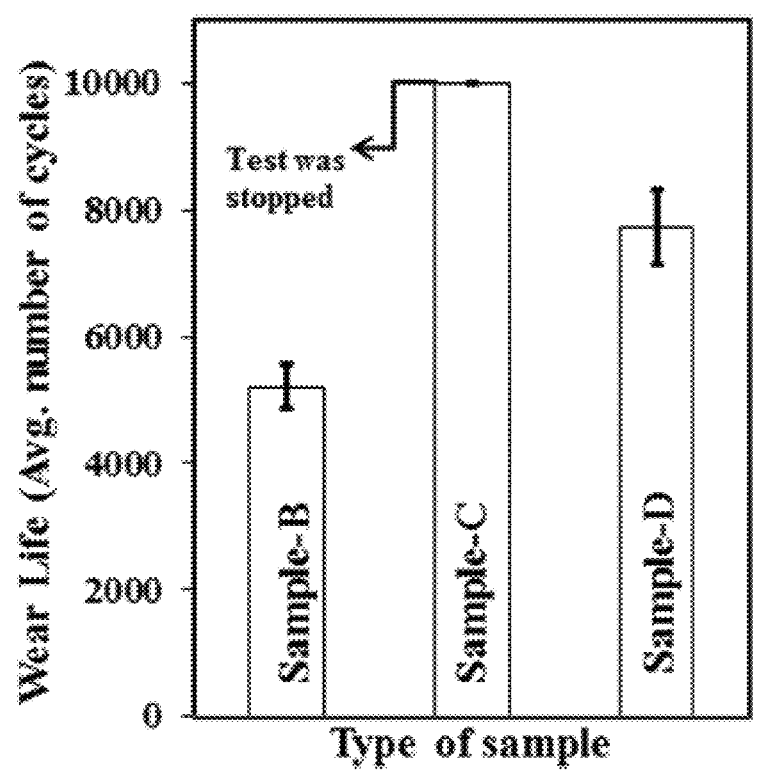
FIG. 7 shows the average wear life of three hybrid nanocomposite coatings samples for 10,000 cycles at a normal load of 12 N and a linear sliding velocity of 0.1 m/s.

In order to further enhance the load bearing capacity of the C15A-nanocomposite coating, hybrid nanocomposite coatings of the mentioned compositions (Table 1) were developed and evaluated at normal loads of 12 N. It can be seen from FIG. 7 that only sample-C (1.5 wt % C15A/1.5 wt % CNTs/UHMWPE) showed a wear life of 10,000 cycles as compared to sample-B and sample-D, which failed earlier than 10,000 cycles. The better performance of sample-C is attributed to the uniform dispersion of the reinforcements, nanoclay, and CNTs, respectively, in the UHMWPE matrix as confirmed by the SEM results as shown in FIG. 2D, which helps in anchoring the polymer chains in the polymer matrix and preventing them from being pulled out. The failure of sample-B earlier than 10,000 cycles can be attributed to the insufficient amount of CNTs leading to an ineffective anchoring of the polymer chains of the matrix while the failure of sample-D can be attributed to the agglomerations of CNTs or possible formation of two-phase structures due to agglomerations: softer phase (polymer matrix alone) and harder phase (CNTs agglomerates) as indicated in FIG. 2C, causing poor bonding and bridging effect between polymer and CNTs resulting in an ineffective load sharing by the CNTs during the wear test. It is to be noted that the wear rate of nanocomposites/hybrid nanocomposites is very much dependent on the uniform dispersion of the nanofillers. See Pesetskii, S. S., Bogdanovich, S. P., and Myshkin, N. K., 2013, "Tribological Behavior of Polymer Nanocomposites Produced by Dispersion of Nanofillers in Molten Thermoplastic," *Tribology of Polymeric Nanocomposites: Friction and Wear of Bulk Materials and Coatings,* 2nd ed., Vol. 55, K. Friedrich and A. K. Schlarb, eds., Butterworth-Heinemann, Oxford, UK, pp. 119-162.

Figure 8D:
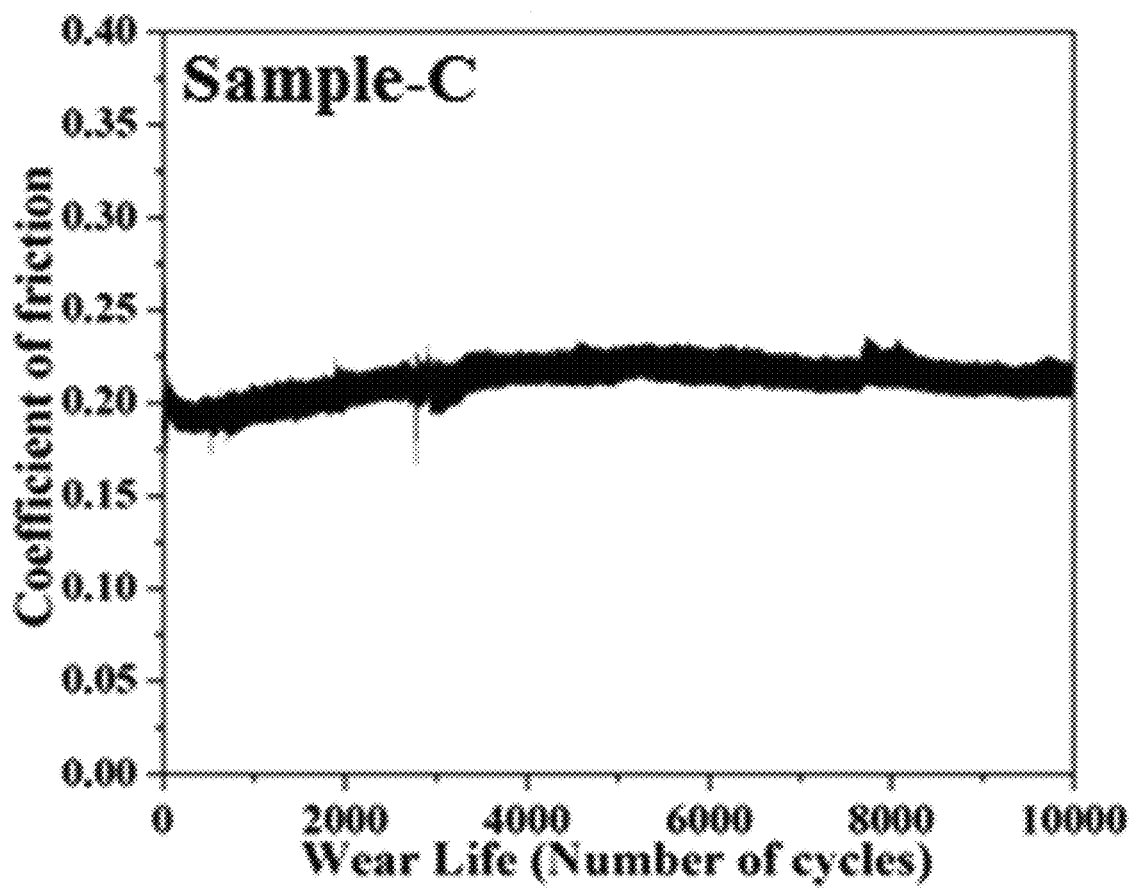
FIG. 8D shows a frictional graph of a hybrid nanocomposite coating (Sample-C) for 10,000 cycles with normal load of 12 N and a linear sliding velocity of 0.1 m/s.
Figure 8E:
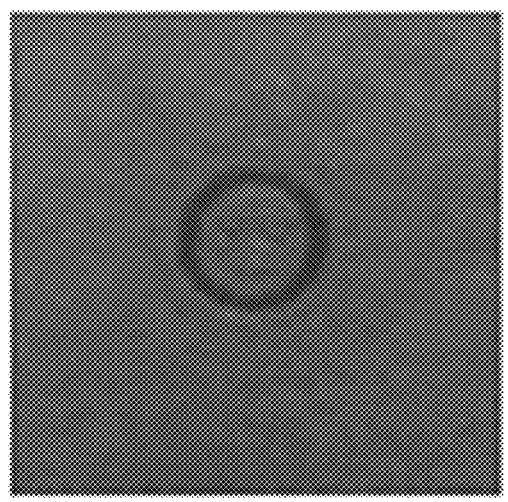
FIG. 8E shows the wear tracks formed by the process of FIG. 8D.
Figure 8F:
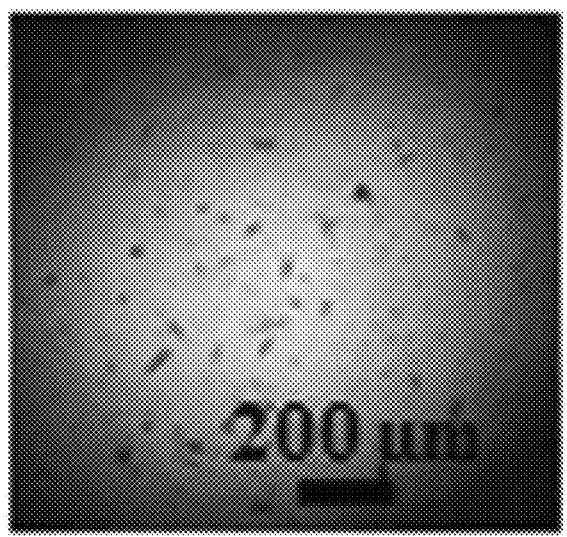
FIG. 8F shows an image of the counterface ball at 10× magnification, after the wear test of FIG. 8D and after cleaning with acetone.

In the case of poor dispersion, a two-phase morphology of hard and soft phases is formed whereby the softer phase may act as the weak areas for the initiation of failure/peeling off of the coating resulting in a significant material pull-out. The typical frictional graphs, photographs of the wear track showing the exposed substrate, and the scar mark on counterface ball as shown in FIGS. 8C and 8I confirmed the failure of sample-B and D. Regarding COF, slight changes were observed as its average value increased from ~0.17 (for pristine UHMWPE) to ~0.21 for hybrid nanocomposite coatings, respectively, due to the increased hardness. A similar trend was observed by Samad and Sinha. See previously cited Samad et al. (2011).

Figure 9:
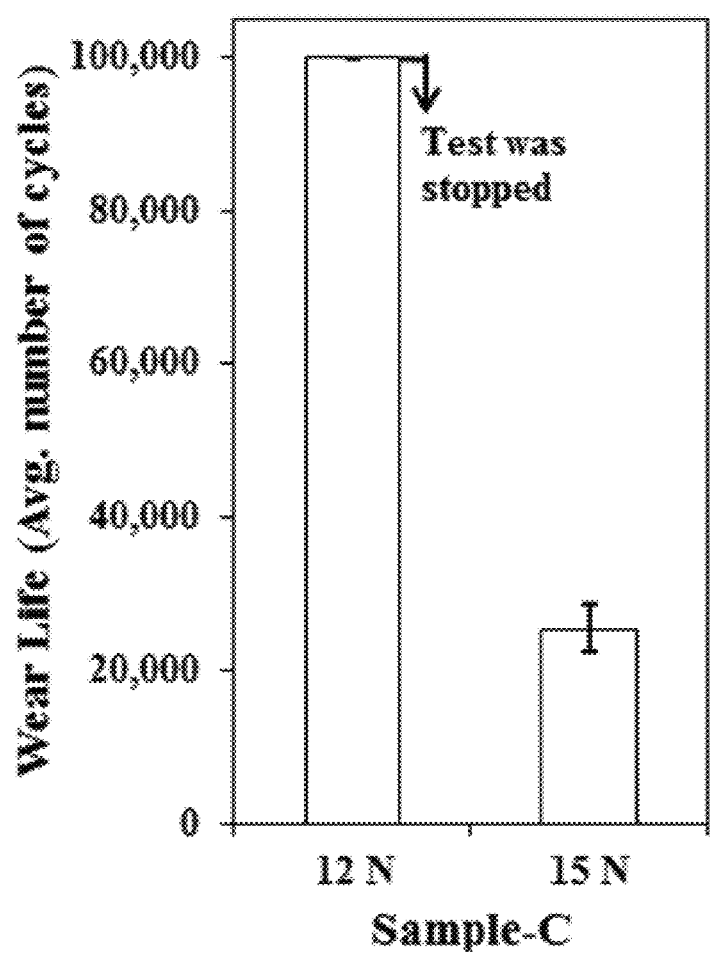
FIG. 9 shows the average wear life of sample-C (1.5 wt % C15A/1.5 wt % CNT/UHMWPE) at normal loads of 12 and 15 N for 100,000 cycles at a linear sliding velocity of 0.1 m/s

After these screening tests, sample-C was found to perform the best in terms of improved wear life which was further tested for longer durations of 100,000 cycles (sliding distance=1.3 km) at normal loads of 12 and 15 N, respectively, with the same linear speed of 0.1 m/s (480 rpm) to evaluate its performance for prolonged durations and at higher loads. From FIG. 9, it can be seen that at 12 N the hybrid nanocomposite coating (sample-C) did not fail until 100,000 cycles while it failed very early at a higher load of 15 N. SEM images of the wear tracks of sample-C (FIGS. 10A and 10D) after sliding tests conducted at normal loads of 12 and 15 N, respectively, along with their corresponding EDS analysis (FIGS. 10B and 10E) on the wear track and 2D-optical wear profiles (FIGS. 10C and 10F) are provided. It can be seen that at 15 N, there was a complete failure of the coatings as EDS confirmed the peaks of bare aluminum substrate on the wear track and the wear profile depths (Z) reached to ~180 µm, which is the thickness of the coating. However, at 12 N, no peak of bare aluminum substrate on the wear track was observed, and the wear profile depth (Z) was also much less than the coating thickness, which confirmed that this coating did not fail, suggesting that the working load for the hybrid nanocomposite coating without failure is about 12 N at a speed of 0.1 m/s. FIG. 11 shows the comparison of the specific wear rate of the coatings at a normal load of 12 N and a sliding velocity of 0.1 m/s.

Effect of Linear Sliding Speed on Tribological Performance of Sample-C (1.5 C15A/1.5CNT/UHMWPE)

From the previously-mentioned analysis, it was established that 1.5 wt % CNT/1.5 wt % C15A/UHMWPE hybrid nanocomposite coating (sample-C) performed the best in terms of high wear resistance as it did not fail at a normal load of 12 N until 100,000 cycles at a linear speed of 0.1 m/s. To further investigate the tribological performance of this particular hybrid nanocomposite coating, wear tests were carried out at different linear speeds of 0.1, 0.2, and 0.3 m/s, respectively, at a normal load of 12 N for 25,000 cycles (sliding distance=314 m) with a wear track radius of 2 mm.

Figure 12:
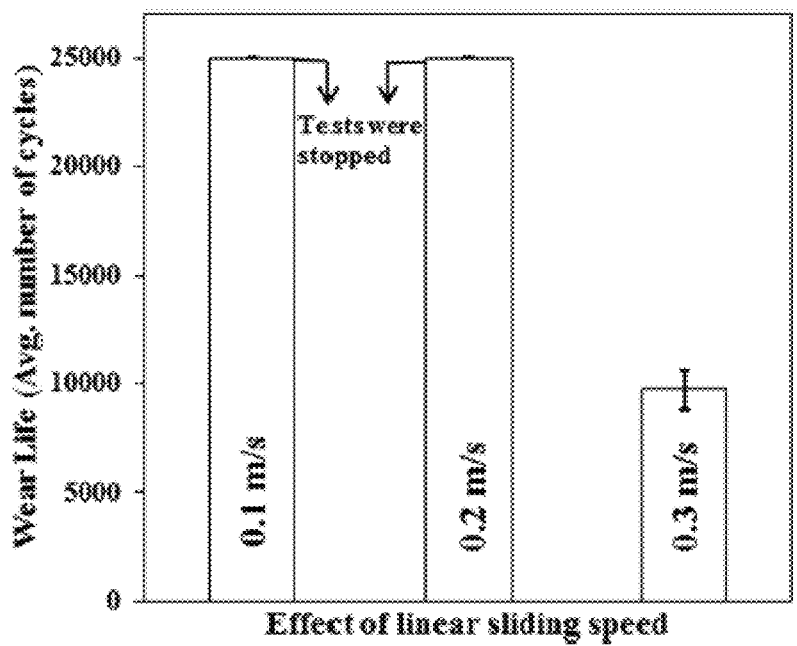
FIG. 12 shows the wear life of Sample-C (1.5 wt % C15A/1.5 wt % CNT/UHMWPE) at a normal load of 12 N for 25,000 cycles at three different sliding velocities.
Figure 13A:
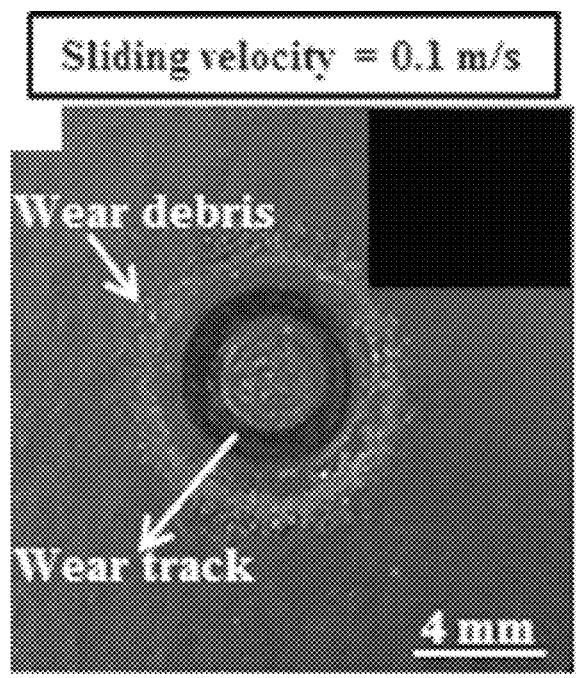
FIG. 13A shows the wear tracks on sample C after a wear test with a normal load of 12N for 25,000 cycles with a 0.1 m/s sliding velocity.
Figure 13B:
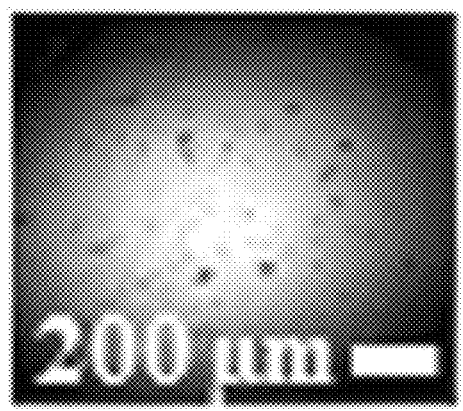
FIG. 13B shows an image of the counterface ball after the wear test of FIG. 13A and after cleaning.
Figure 13C:
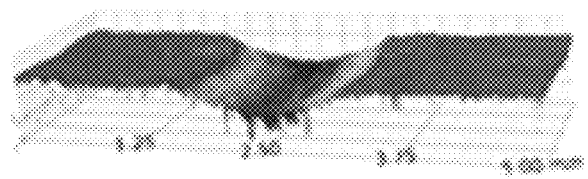
FIG. 13C shows a 3D optical profile image of the wear track of FIG. 13A.
Figure 13D:
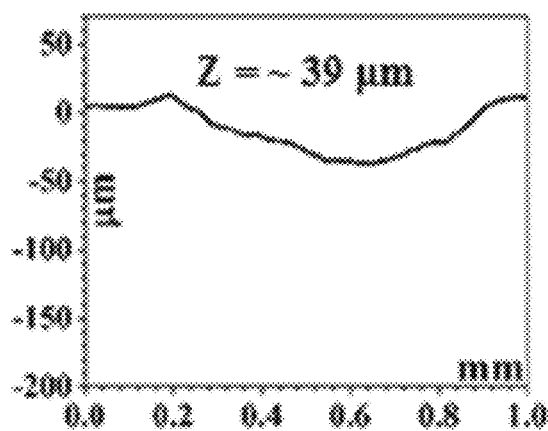
FIG. 13D shows the wear track profile depth Z of the wear track of FIG. 13A.
Figure 13E:
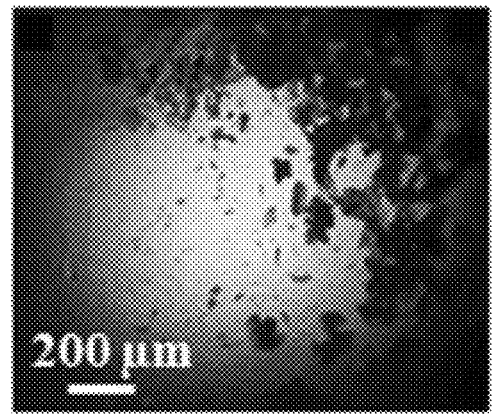
FIG. 13E shows the counterface ball after the wear test of FIG. 13A.
Figure 13F:
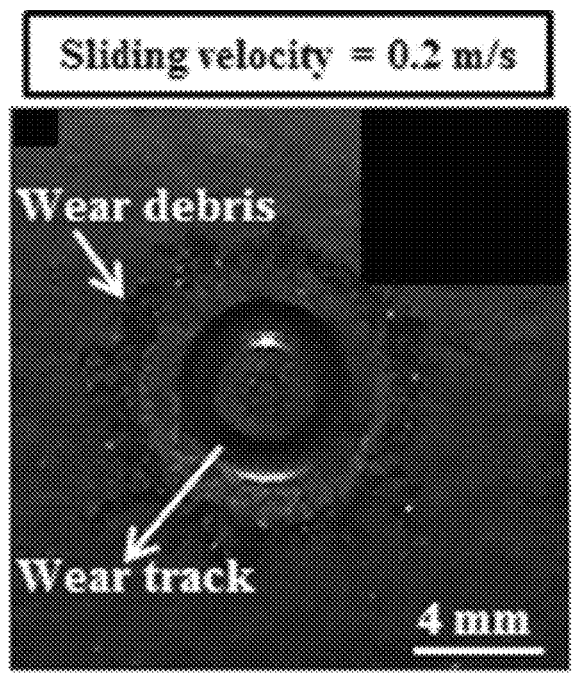
FIG. 13F shows the wear tracks on sample C after a wear test with a normal load of 12N for 25,000 cycles with a 0.2 m/s sliding velocity.
Figure 13G:
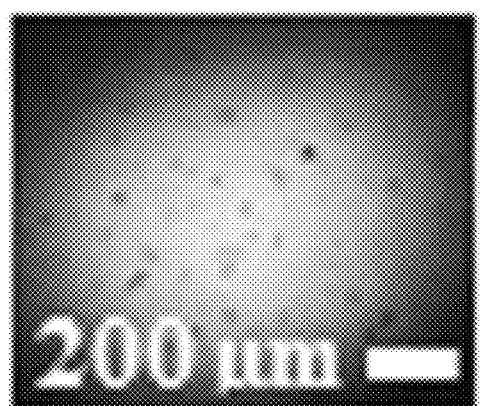
FIG. 13G shows an image of the counterface ball after the wear test of FIG. 13F and after cleaning.
Figure 13H:
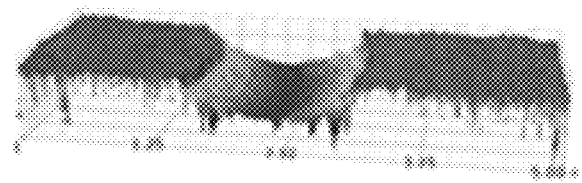
FIG. 13H shows a 3D optical profile image of the wear track of FIG. 13F.
Figure 13I:
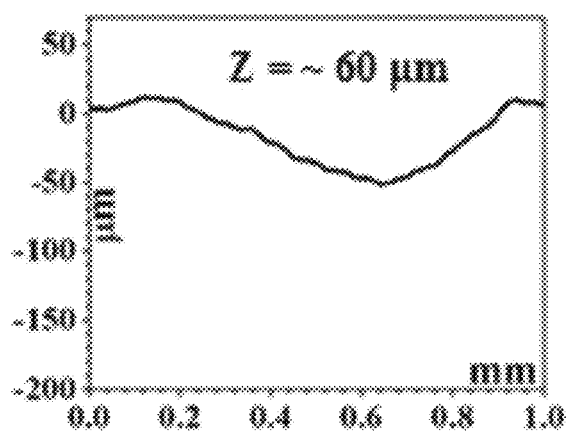
FIG. 13I shows the wear track profile depth Z of the wear track of FIG. 13F.
Figure 13J:
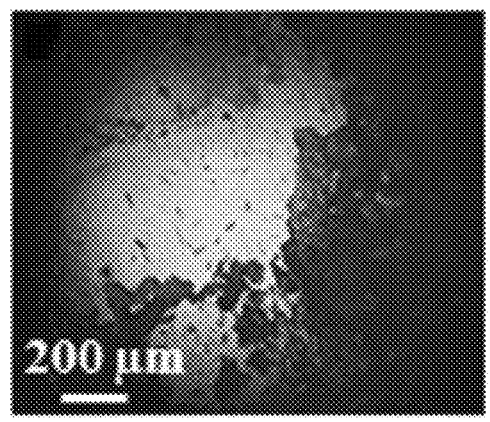
FIG. 13J shows the counterface ball after the wear test of FIG. 13F.
Figure 13K:
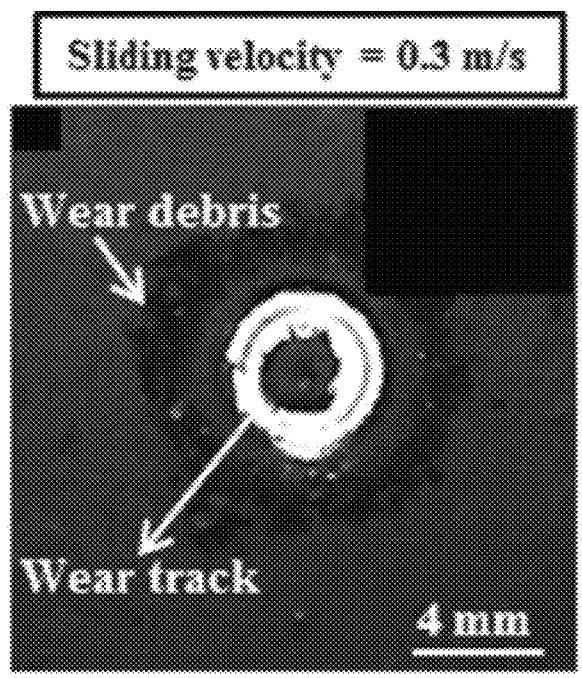
FIG. 13K shows the wear tracks on sample C after a wear test with a normal load of 12N for 25,000 cycles with a 0.3 m/s sliding velocity.
Figure 13L:
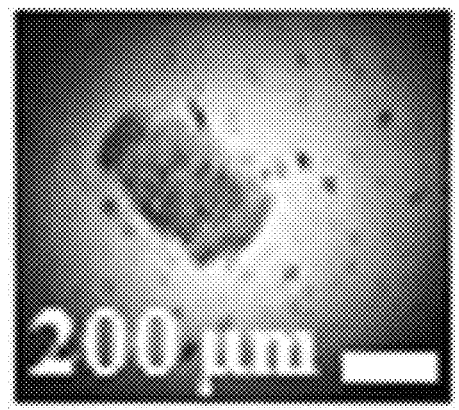
FIG. 13L shows an image of the counterface ball after the wear test of FIG. 13K and after cleaning.
Figure 13M:
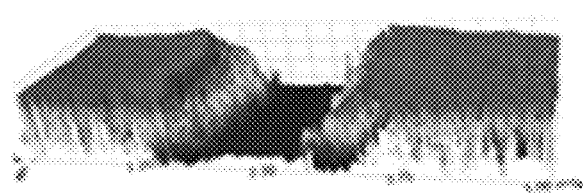
FIG. 13M shows a 3D optical profile image of the wear track of FIG. 13K.
Figure 13N:
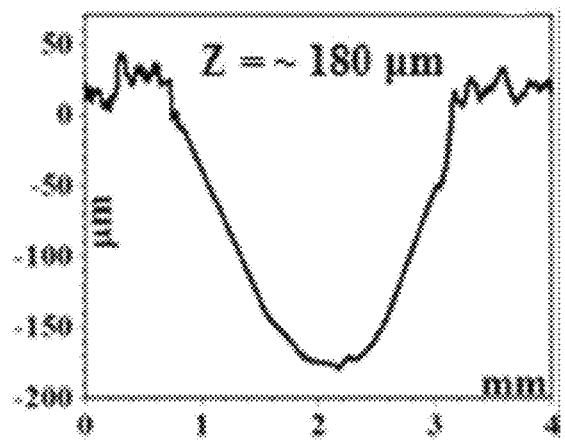
FIG. 13N shows the wear track profile depth Z of the wear track of FIG. 13K.

FIG. 12 shows that hybrid nanocomposite coating at linear speeds of 0.1 and 0.2 m/s did not fail even until 25,000 cycles as confirmed by the corresponding photograph of wear tracks on samples as well as wear track profile depths (Z) which were ~39 µm and ~60 µm (less than the coating thickness of ~180 µm), respectively, as confirmed in FIGS. 13D and 13I. However, the coating failed at a linear sliding speed of 0.3 m/s, showing an average wear life of ~10,000 cycles. The corresponding photograph of sample in FIG. 13K showing a peel off of the coating and wear profile depths approaching to the thickness of the coating (~180 µm, FIG. 13N) confirmed the failure of the coating at a linear sliding speed of 0.3 m/s.

Figure 13O:
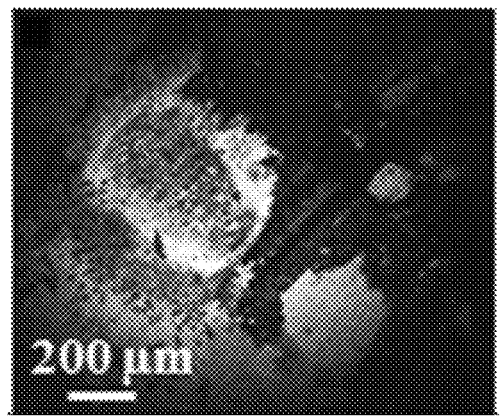
FIG. 13O shows the counterface ball after the wear test of FIG. 13K.

At higher speeds, the contact temperature plays a very significant role in wear of the polymers. See Mimaroglu, A., Unal, H., and Arda, T., 2007, "Friction and Wear Performance of Pure and Glass Fibre Reinforced Poly-Ether-Imide on Polymer and Steel Counterface Materials," Wear, 262 (11-12), pp. 1407-1413; Senthur, P. S., Prathiba, S., Sharma, A., Garg, S., Manikandan, G., and Sriram, C., 2014, "Investigation on Adhesive Wear Behaviour of Industrial Crystalline and Semi-Crystalline Polymers Against Steel Counterface," Int. J. Chem. Tech. Res., 6(7), pp. 3422-3430; and Laux, K. A., Jean-Fulcrand, A., Sue, H. J., Bremner, T., and Wong, J. S. S., 2016, "The Influence of Surface Properties on Sliding Contact Temperature and Friction for Polyetheretherketone (PEEK)," Polymer, 103, pp. 397-404. Since UHMWPE polymer starts to lose its dimensional stability above 80-90° C., it is possible that by increasing the linear sliding speed, the localized contact temperature would have been raised beyond 80-90° C., which caused the softening of the polymer resulting in the failure of the coatings at higher linear sliding speeds. See previously-cited Stein et al. (1999). It is also clear from the counterface ball images in FIGS. 13E, 13J, and 13O that the material pull out became more predominant with the rise in sliding speed resulting from the softening of polymer due to increase in the localized temperature.

Advantages

In this work, pristine, C15A-nanocomposite and C15A/CNT hybrid nanocomposite coatings were developed and their tribological performance was evaluated at different loads and sliding speeds under dry conditions. Conclusions that can be deduced are summarized as follows:

In general, an increase in the hardness was observed by reinforcing the pristine UHMWPE coating with nanoclay and nanoclay/CNTs. The hardness was increased with the increase in loading of CNTs from 0.5 to 3 wt %.

By reinforcing the pristine UHMWPE with 1.5 wt % C15A, load bearing capacity was enhanced from 7 to 9 N because of bridging effect provided by clay platelets in the polymer matrix.

Among hybrid nanocomposite coatings, 1.5 wt % C15A/1.5 wt % CNTs/UHMWPE hybrid nanocomposite coating showed excellent tribological results as it did not fail even until 100,000 cycles at a normal load of 12 N. The increase in the wear life of this coating is attributed to efficient dispersion of nanoclay and CNTs and in the hybrid nanocomposite coatings that provide the bridging and anchoring of the polymer chains in the matrix resisting their pull out.

The 1.5 wt % C15A/1.5 wt % CNTs/UHMWPE hybrid nanocomposite coating, at sliding speeds of 0.1 and 0.2 m/s, did not fail even until 25,000 cycles at a normal load of 12 N. However, it failed at higher sliding velocity of 0.3 m/s due to softening of the polymer.

A novel hybrid polymer nanocomposite coating of ultra-high molecular weight polyethylene (UHMWPE) reinforced with nanoclay (C15A) and carbon nanotubes (CNTs) has been developed to protect metallic mating surfaces in tribological applications. The hybrid nanocomposite coatings were deposited on aluminum substrates using an electrostatic spraying technique. Ball-on-disk wear tests using a 440C stainless steel ball as the counterface were conducted on the coatings under dry conditions to determine the amount of the loadings of the nanofillers and evaluate their tribological performance at different normal loads and linear velocities. Micro-indentation, Raman spectroscopy, scanning electron microscopy (SEM), and optical profilometry techniques were used to characterize the coatings in terms of hardness, dispersion of the nanofillers, morphology, and wear mechanisms, respectively. Results showed that the UHMWPE hybrid nanocomposite coating reinforced with 1.5 wt % of C15A nanoclay and 1.5 wt % of CNTs did not fail even until 100,000 cycles at a normal load of 12 N and a linear speed of 0.1 m/s showing a significant improvement in wear resistance as compared to all other coatings evaluated.

Example 4

Wet Conditions—Materials and Substrate

Square coupons of 25×25×6 mm of aluminum alloy (Al) were used as substrates. UHMWPE powder, functionalized multi-walled carbon nanotubes (MWCNTs), and Montmorillonite, i.e., Cloisite (C15A) clay was provided by Good Fellow Corp (Cambridge, UK), Chemical Laboratory at KFUPM, and Southern Clay Product (USA), respectively. UHMWPE powder has a particle size of 80-90 µm and density of 0.94 g/cm$^3$. MWCNTs have average diameter of 23±3 nm. C15A clay having a platelet size of 8-15 µm was modified with quaternary dimethyl dihydrogenated ammonium and has specific gravity of 1.7-1.9.

Deposition of the Coatings on Aluminum Substrates

Figure 14:
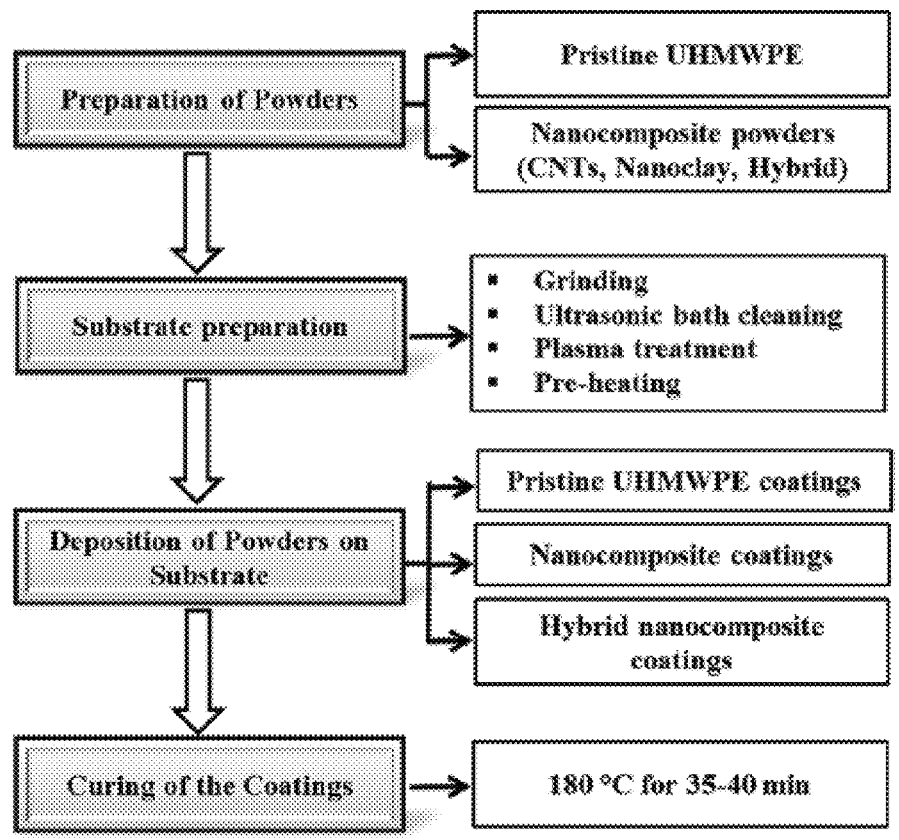
FIG. 14 is a flow diagram for the development of the current coatings.

Pristine UHMWPE coating, different types of nanocomposite, and hybrid nanocomposite coatings as mentioned in Table 2 were developed. A loading of 1.5 wt % nanoclay, for the development of all hybrid nanocomposite coatings, has been selected based on our previous studies where 1.5 wt % nanoclay/UHMWPE bulk nanocomposite exhibited excellent mechanical and tribological properties and an excellent resistance to water uptake. See Azam et al. (2018); and Samad M A, Ali A B, Merah N. Investigating the effect of water uptake on the tribological properties of organoclay reinforced UHMWPE nanocomposites. Tribol Lett 2016; 62(2):1-9, each incorporated herein by reference in its entirety. FIG. 14 shows the flow diagram for the methodology implemented for the development of the current coatings.

TABLE 2

Different types of nanocomposite and hybrid nanocomposite coatings with their compositions and designations.

| Composition of the Samples | Sample Designation | Group |
| --- | --- | --- |
| 1.5 wt % C15 A/UHMWPE | C15 A/UHMWPE nanocomposite | |
| 0.5 wt % CNT/UHMWPE | Sample-1 | CNT-nanocomposites |
| 1.5 wt % CNT/UHMWPE | Sample-2 | |
| 3 wt % CNT/UHMWPE | Sample-3 | |
| 0.5 wt % CNT/1.5 wt % C15 A/UHMWPE | Sample-4 | Hybrid nanocomposites |
| 1.5 wt % CNT/1.5 wt % C15 A/UHMWPE | Sample-5 | |
| 3 wt % CNT/1.5 wt % C15 A/UHMWPE | Sample-6 | |

A sonication method coupled with magnetic stirring was used for the development of the nanocomposite and hybrid nanocomposite powders with specific compositions as mentioned in Table 2. First, the weighted amount of required filler(s) was/were added in ethanol solvent (50 ml) for the sonication to disperse them uniformly with following sonication parameters (sonication time=10 min, amplitude=30% and an on/off cycle time=20/5 s). Later on, magnetic stirring was used to further disperse the nanofiller(s) uniformly in ethanol for 2 min at an rpm of 1000. After uniform dispersion of nanofiller(s) in ethanol, a weighted amount of UHMWPE powder was added slowly in this mixture. Then this nanocomposite mixture was left for 1 h magnetic stirring followed by drying of mixture in the furnace for 80° C. for 24 h.

Substrate preparation was carried out by grinding (with two different grit size papers of 120 and 240), ultrasonic cleaning in acetone (for 15 min) followed by drying, plasma treatment (for 10 min) and preheating (for 5 min at 180° C.)

respectively. Plasma equipment with a radio-frequency power of 30 W was used to clean the samples and functionalize the surface of the samples as also observed in a previous study which showed that it increased the adhesion between the coating and the substrate by increasing the surface free energy. See Samad M A, Satyanarayana N, Sinha S K. Tribology of UHMWPE film on air-plasma treated tool steel and the effect of PFPE overcoat. Surf Coating Technol 2010; 204(9-10):1330-8.

An electrostatic spray gun (Craftsman®, Model #17288) was used for the deposition of prepared powders on the pre-treated aluminum substrates. Finally, uniform coatings were obtained after subjecting the powder coated samples to a post heat treatment process on the heating plate at 180° C. for 30-35 min followed by air cooling.

Characterization Techniques

Table 3 shows the details of characterization techniques for different analyses performed on the developed powders and coatings.

For friction and wear tests under water, a tribometer having ball-on-disk configuration with a lubricant holder was used. The counterface stainless steel ball used in the current study has the following specifications; Grade 440C, hardness=62 RC and ø=6.3 mm. The counterface ball was cleaned well with acetone before each test. For each of the tests the lubricant holder was filled with 45 mL of deionized water (DI water). For testing under water with abrasives, 1 g of silicon carbide (SiC) having a particle size of 6 µm±0.2 µm was added to 45 mL DI water in the lubricant holder. In view of the long duration of the tests, the lubricant container was refilled with DI water after every 4 h to maintain a constant water level (up to 45 mL) to compensate for the evaporation of some quantity of water during testing. After every test, the counterface ball was examined under an optical microscope to analyze the transfer film phenomenon/scar mark before and after cleaning of the ball with acetone. Three wear tests were performed for each set of samples, and the average value of wear life is reported.

TABLE 3

Details of characterization techniques.

| Analysis | Purpose | Instrument | Instrument Details | Operating Parameters |
| --- | --- | --- | --- | --- |
| Raman Spectroscopy | To analyze the interfacial interaction of CNT's within polymer matrix | Raman microscope | DXR ™, Thermo Scientific ®, (USA) | Laser power = 1-2 (mW), Laser wavelength = 455 nm, aperture = 50 mm and spot size = 0.6 mm |
| Dispersion analysis & Thickness measurement | Examine the typical dispersion of nanofillers in UHMWPE matrix & thickness measurement of the coatings | Scanning electron microscope (SEM) | TESCAN ®, (Czech Republic) Having Schottky field emission gun | Beam Voltage = 20 kV, Secondary electron imaging (SEI) |
| Tribiological testing | Friction & Wear tests on coatings | Tribometer | UMT-3, Bruker (USA) | Normal Loads = 9, 12 & 15N, Sliding velocity = 0.1 m/s, room temperature, a relative humidity of 55 ± 5%, under water (with/without presence of abrasives) |
| Morphological analysis of wear tracks and surface roughness measurements of the coatings | To study the wear morphology & mechanism of the coatings and roughness measurements | SEM, 3D-Optical profilometer | GTK-A, Bruker (USA) | Energy-dispersive X-ray spectroscopy (EDS) analysis, 2D and 3D wear profiles of wear tracks were captured at 5 × |
| Micro-indentation | Hardness measurements of the coatings | Micro-combi tester | CSM instruments ®, (USA) | Pyramidal shaped diamond indenter Load = 0.2N, Dwell time = 10 s Constant Loading and unloading rate = 0.4N/min |
| Scratch testing | To evaluate the debonding strength/scratch resistance of the coatings | Micro-combi tester | CSM instruments ®, (USA) | Rockwell type diamond indenter with tip radius of 100 µm Progressive load 0-30N, Speed = 5 mm/min, Scratch length = 10 mm |

It is to be noted that for Raman spectroscopy, three spectra were obtained on each of the powdered samples at different locations, and typical images are reported. SEM analysis to examine the typical dispersion of nanofiller(s) in UHMWPE matrix and thickness measurements of the coatings was carried out at various locations and typical SEM images and average value (of five readings) of thickness are reported. Prior to SEM analysis, a thin gold coating was deposited on each sample to make it conductive. For hardness measurement, ten readings on each sample at different locations were taken and an average value is reported. Surface roughness measurements of the coatings were recorded at five different places and the average value is reported. For scratch testing, three readings for each sample were taken, and the average value of the critical load ($L_c$) is reported.

For the confirmation of coating failures, EDS analysis was carried out by analyzing the composition of coatings inside and outside the wear tracks. Moreover, 2D and 3D wear profiles were recorded to measure the depth of wear track (Z) with the help of the optical profilometer.

Example 5

Wet Conditions—Results and Discussion
Raman Spectroscopy on the Samples

Figure 15:
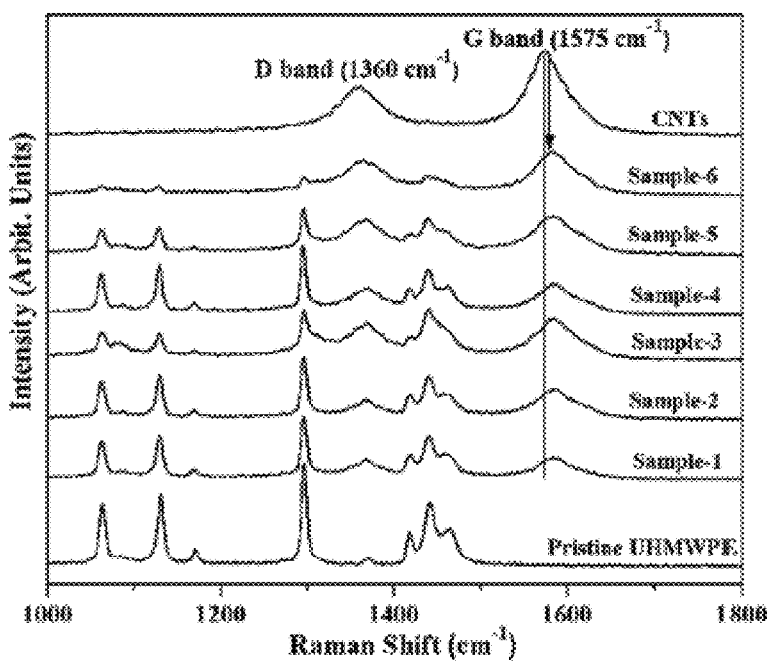
FIG. 15 illustrates the Raman spectra for CNT-nanocomposites and hybrid nanocomposites.
Figure 16B:
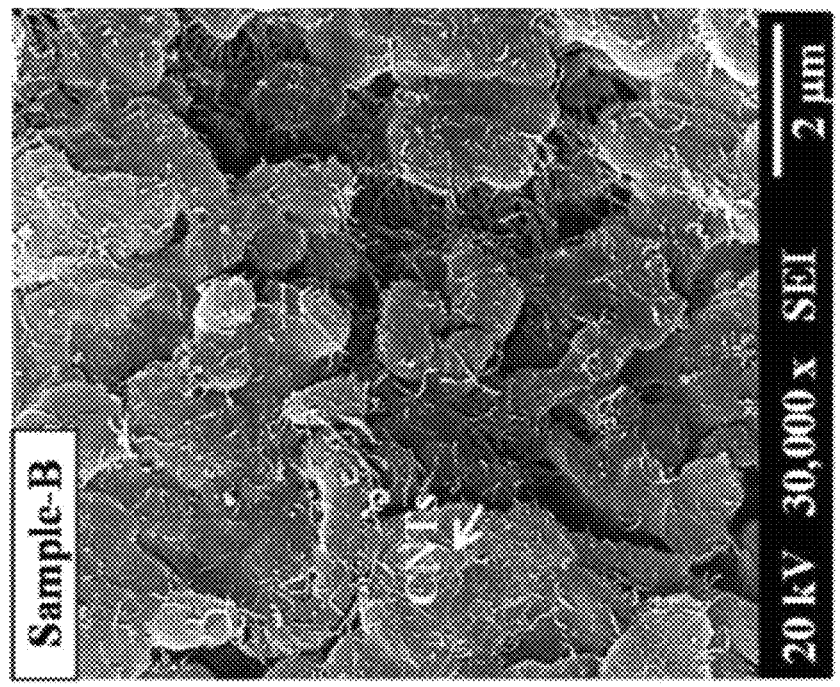
FIG. 16B is an SEM image of Sample-B powder.
Figure 16A:
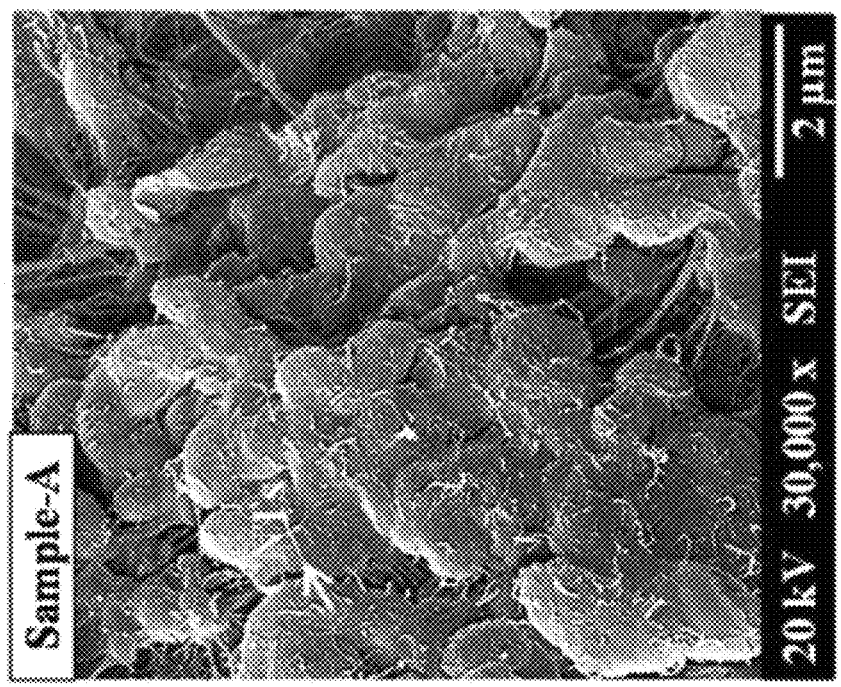
FIG. 16A is an SEM image of Sample-A powder.
Figure 16D:
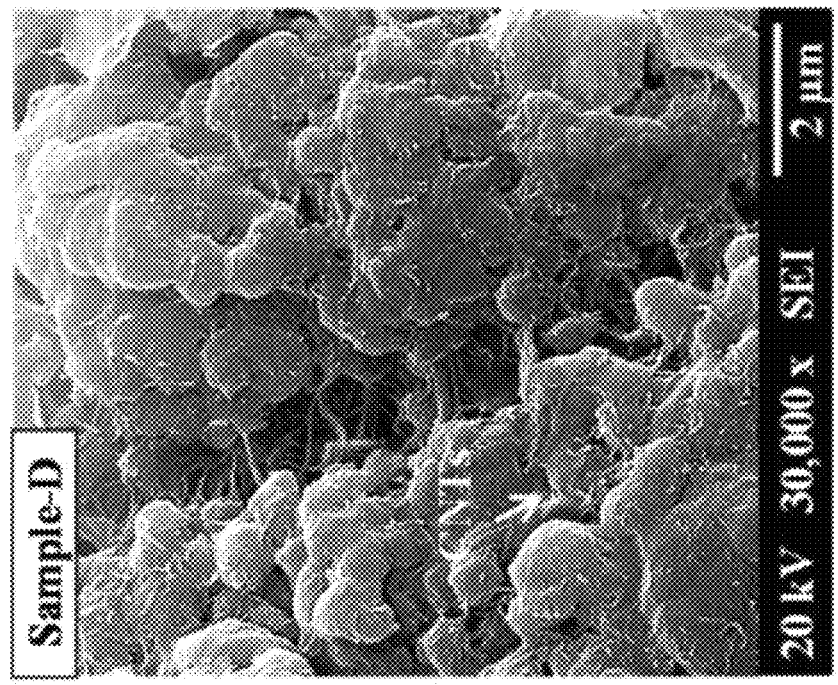
FIG. 16D is an SEM image of Sample-D powder.
Figure 16C:
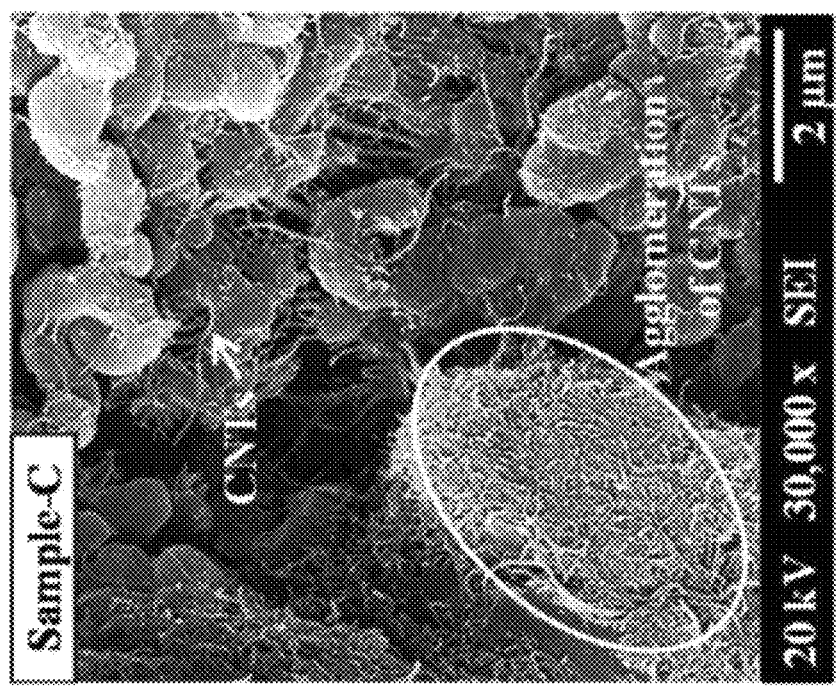
FIG. 16C is an SEM image of Sample-C powder.
Figure 16F:
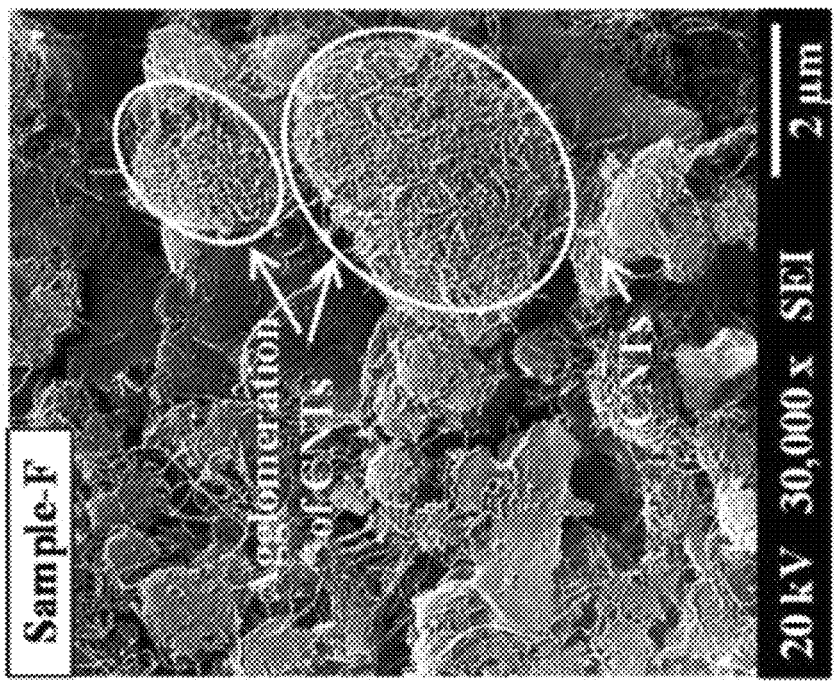
FIG. 16F is an SEM image of Sample-F powder.
Figure 16E:
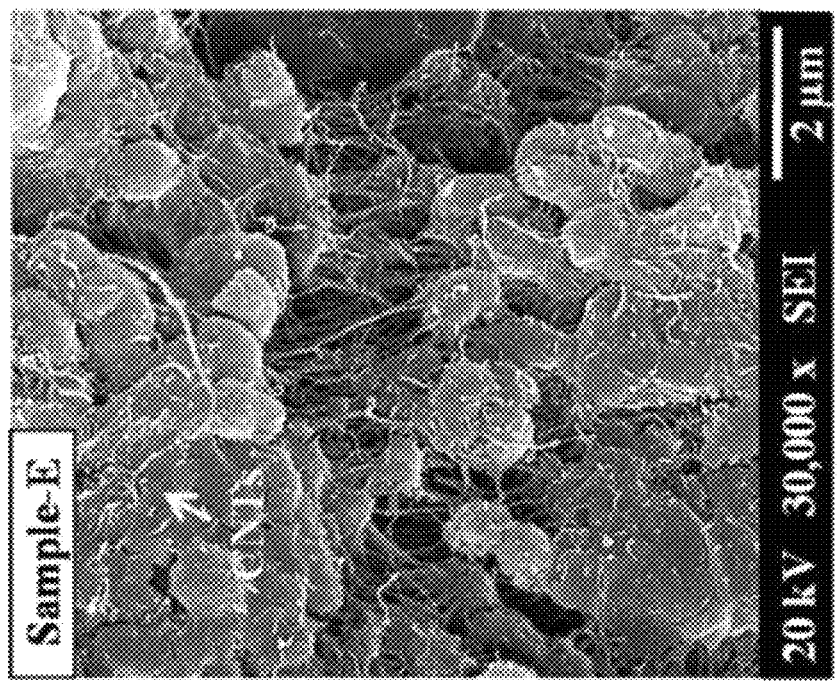
FIG. 16E is an SEM image of Sample-E powder.
Figure 17A:
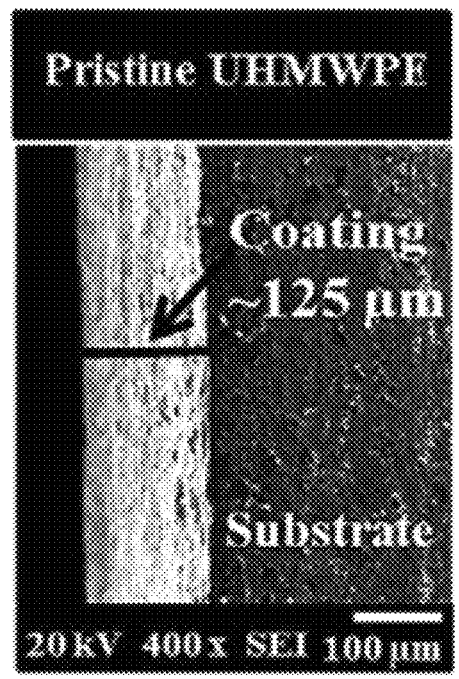
FIG. 17A is a cross-sectional SEM image of a pristine UHMWPE coating.
Figure 17B:
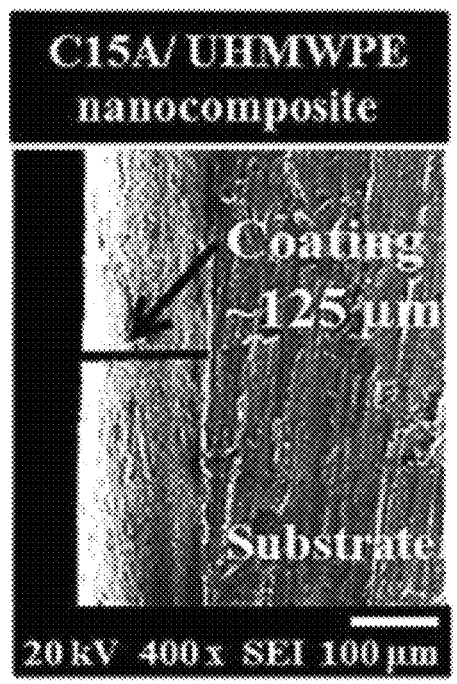
FIG. 17B is a cross-sectional SEM image of a C15A/UHMWPE coating.
Figure 17C:
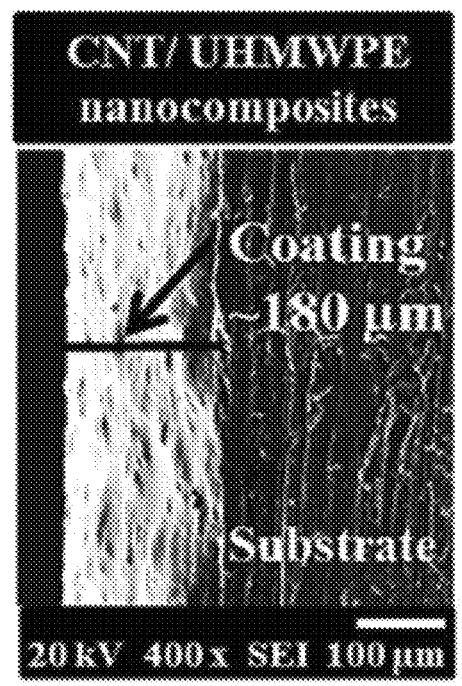
FIG. 17C is a cross-sectional SEM image of a CNT/UHMWPE coating.
Figure 17D:
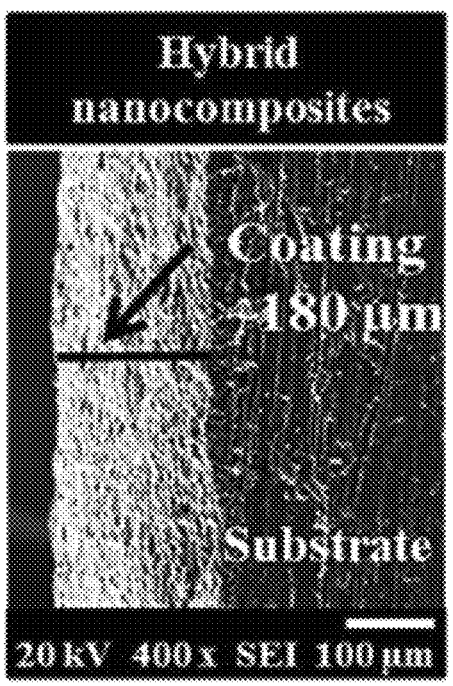
FIG. 17D is a cross-sectional SEM image of a hybrid nanocomposite coating.

FIG. 15 shows the results of Raman spectroscopy performed on pristine UHMWPE, CNT-nanocomposites, and hybrid nanocomposites. The spectra in the range of 1000-1800 cm$^{-1}$ are presented in FIG. 2 where the characteristic peaks for CNTs can be seen at 1360 cm$^{-1}$ and 1575 cm$^{-1}$, corresponding to D and G bands. Whereas the characteristic peaks for pristine UHMWPE can be seen at 1064 cm$^{-1}$, 1130 cm$^{-1}$, 1297 cm$^{-1}$, and 1440 cm$^{-1}$. D and G bands basically represent disordered graphitic structures and tangential stretching of C—C bond respectively. See Nemanich R J, Solin S A. First- and second-order Raman scattering from finite-size crystals of graphite. Phys Rev B 1979; 20(2):392-401; and Saito R, Dresselhaus G, Dresselhaus M S. Physical properties of carbon nanotubes. UK: Imperial College Press; 1998.

FIG. 15 clearly indicates the shifting of the G band towards higher frequency up to ~14 cm$^{-1}$ in all CNT-nanocomposites and hybrid nanocomposites. The shifting of the G band towards higher frequencies can be attributed to disentanglement of the MWCNTs in the UHMWPE matrix as a result of polymer penetration into the CNT bundles. This upshifting also indicates the good load transfer in the coatings due to strong compressive stresses associated with polymer chains on MWCNTs. See McNallya T, Potschke P, Halley P, Murphy M, Martin D, Bell S E J, Brennan G P, Bein D, Lemoine P. Polyethylene multiwalled carbon nanotube composites. Polymer 2005; 46(19):8222-32.

Dispersion Analysis of Nanofillers in UHMWPE Matrix

Dispersion analysis of nanofillers in polymer matrix was carried out with the help of SEM. FIGS. 16A-16F shows the SEM images of CNT-nanocomposite and hybrid nanocomposite powders. In all the samples, no or negligible signs of CNTs/nanoclay agglomeration was observed except Sample-3 (3 wt % CNT/UHMWPE nanocomposite) and Sample-6 (3 wt % CNT 1.5 wt % C15 A/UHMWPE hybrid nanocomposite), where agglomerates or clusters of CNTs/nanoclay can be observed. This agglomeration of nanofiller(s) indicates the ineffective dispersion and bonding between polymer and nanofiller(s), which is possibly due to more loading of CNTs.

Thickness and Roughness Measurement of the Coatings

Cross sectional SEM of coated samples are shown in FIGS. 17A-17D, which show the average value of coating thickness with a variation of ±5 µm. In case of pristine UHMWPE coating (FIG. 17A) and C15 A/UHMPWE coatings (FIG. 17B), no change in coating thickness was observed, and it was found to be ~125 µm. However, in case of all CNT-nanocomposite and hybrid nanocomposite coatings, increase in thickness values was observed and they were found to be ~180 µm. The increase in thickness can be attributed to higher thermal conductivity of CNTs, which converted the nanocomposite powders into partial molten state more quickly as compared to pristine UHMWPE during the deposition of powders on the preheated substrate. In consequence of this early partial melting, more powder particles of nanocomposites were fused or deposited on preheated substrate as compared to that of pristine UHMWPE under the same powder deposition rate and time.

The surface roughness (Ra) of the pristine UHMWPE and 0.5 wt % C15 A/UHMWPE coatings were found to be 5±0.5 µm, whereas the roughness was decreased to 3.5±0.3 µm by adding CNTs into the matrix. This is attributed to the high thermal conductivity of CNTs which assists in a uniform flow of the polymer matrix during the post heat treatment process resulting in a smoother surface as observed in the previous study as well. See Samad et al. (2011).

Tribological Evaluation of the Coatings Under Water

In order to evaluate tribological performance, initial sliding wear tests were performed on pristine UHMWPE coating at a normal load of 9 N under water for 150,000 cycles (Sliding distance=1.9 km) at a linear speed of 0.1 m/s (480 rpm) and wear track radius of 2 mm. At 9 N, pristine UHMWPE coating failed very early (~22,000 cycles) as shown in FIG. 18A after which test was stopped. The exposed substrate on the coated samples as shown in FIG. 18B and scar mark on counterface ball in FIG. 18C clearly indicate the failure of the coating.

Figure 19D:
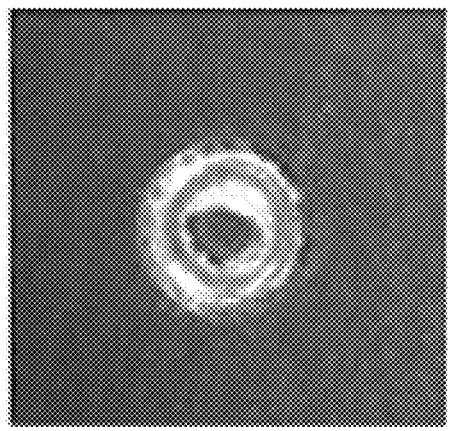
FIG. 19D shows the wear track of Sample-1.
Figure 19E:
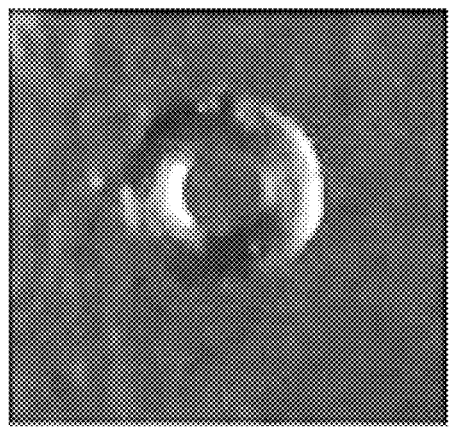
FIG. 19E shows the wear track of the Sample-2.
Figure 19F:
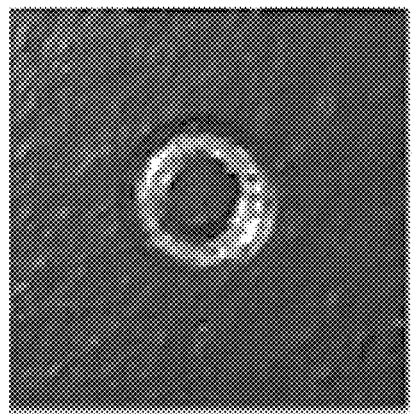
FIG. 19F shows the wear track of the Sample-3.
Figure 19G:
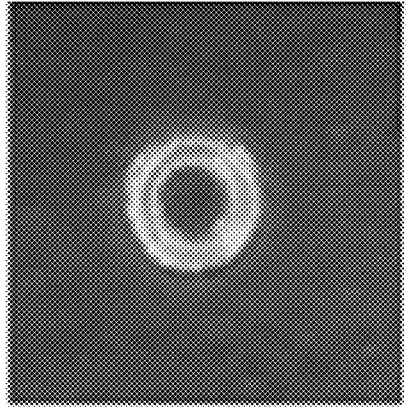
FIG. 19G shows the wear track of the Sample-4.
Figure 19H:
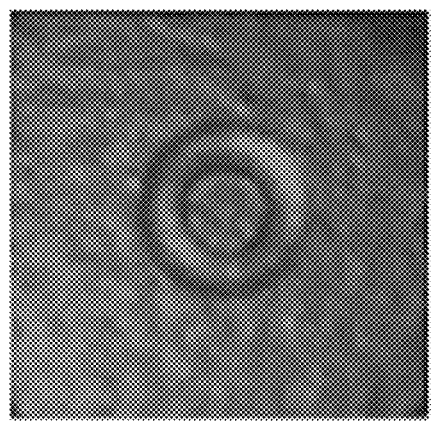
FIG. 19H shows the wear track of the Sample-5.
Figure 19I:
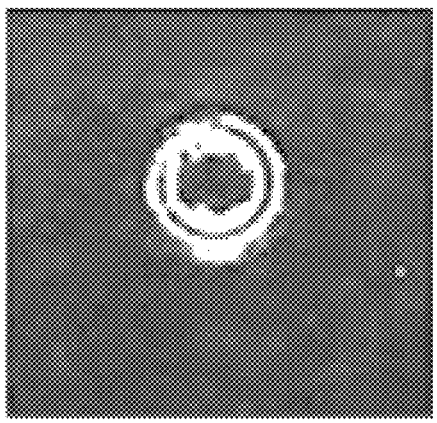
FIG. 19I shows the wear track of the Sample-6.

After this initial experimentation, whereby the pristine UHMWPE coating failed at a normal load of 9 N, sliding wear tests were performed on all developed nanocomposite coatings initially at normal loads of 9 N and then at 12 N, by keeping all other parameters constant as stated earlier, in order to evaluate the effect of adding the nanofillers on the tribological performance of the coatings. At 9 N all the nanocomposite and hybrid coatings did not fail even until 150,000 cycles. However, at 12 N, the tribological performance of these coatings in terms of wear life was different as can be seen in FIG. 19A which compares the wear life of all developed coatings with their corresponding samples (respective FIGS. 19B-19H) after the wear tests. The exposed substrate is the indication of failure of the coating after which the wear test was stopped. Among all the coatings, only Sample-2 (1.5 wt % CNT/UHMWPE nanocomposite) and Sample-5 (1.5 wt % CNT 1.5 wt % C15 A/UHMWPE hybrid nanocomposite) performed well as they did not fail even until 150,000 cycles after which tests were stopped. The better performance of Sample-2 & 5 is attributed to the uniform dispersion of nanofiller(s) in the UHMWPE polymer matrix as confirmed by SEM images as shown in FIGS. 16A-16F, which helps in anchoring the polymer chains in the polymer matrix and preventing them from being pulled out.

However, the failure of the coatings (pristine, 1.5 wt % C15A, and 0.5 wt % CNTs) earlier than 150,000 cycles, can be attributed to no or insufficient amount of CNTs leading to an ineffective anchoring of the polymer chains of the matrix. Whereas, the failure of the coatings (3 wt % CNTs) can be attributed to the agglomerations of CNTs or possible formation of two phase structures; softer phase (polymer matrix alone) and harder phase (CNT's agglomerates because of their high surface energy) as indicated in FIGS. 16A-16F causing poor bonding and insufficient bridging effect between the polymer chains resulting in an ineffective load sharing by the CNTs during the wear test. The softer phase (polymer matrix alone) may act as weak areas for the initiation of failure/peeling off of the coating.

Figure 20B:
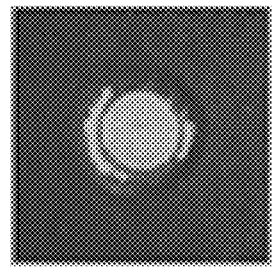
FIG. 20B shows the wear tracks produced in FIG. 20A.
Figure 20A:
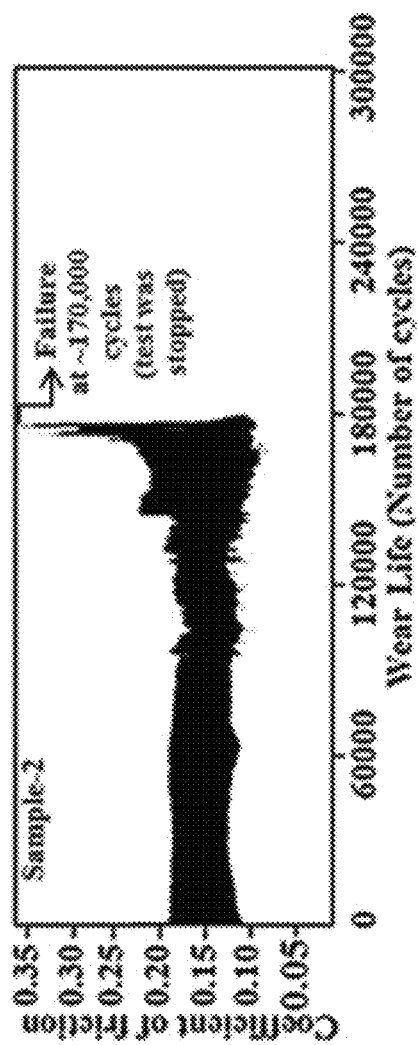
FIG. 20A shows a typical frictional graph of Sample-2 (CNT-nanocomposite) at a normal load of 12 N for 300,000 cycles under water.
Figure 20D:
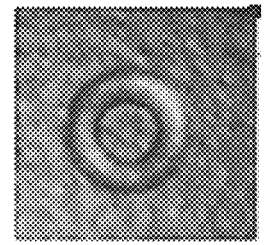
FIG. 20D shows the wear tracks produced in FIG. 20C.
Figure 20C:
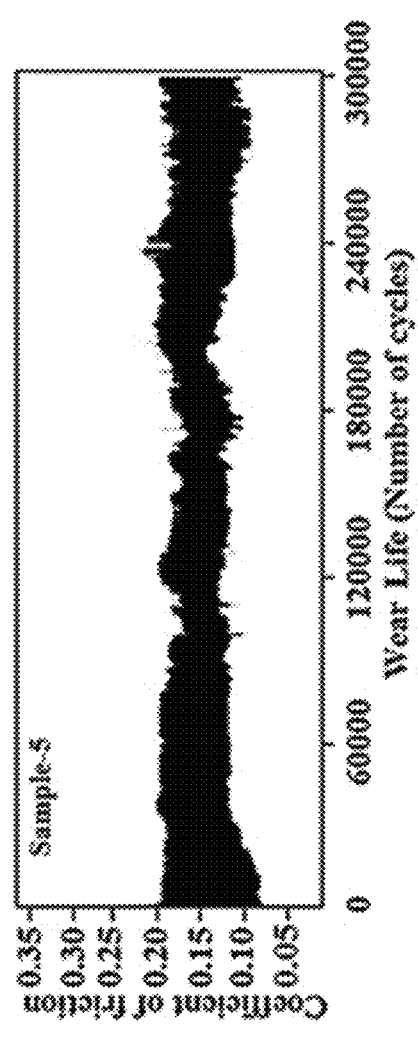
FIG. 20C shows a typical frictional graph of Sample-5 (hybrid nanocomposite) at a normal load of 12 N for 300,000 cycles under water.

It is to be noted that both Sample-2 (1.5 wt % CNT/UHMWPE) and Sample-5 (1.5 wt % CNT/1.5 wt % C15 A/UHMWPE) did not fail until 150,000 cycles under water making it difficult to evaluate the role of addition of nanoclay in the hybrid nanocomposite coating. Hence the two coatings were further tested for their tribological performance under water at a normal load of 12 N for a longer duration of 300,000 cycles (Sliding distance=3.8 km) at the same linear speed of 0.1 m/s (480 rpm) and wear track radius of 2 mm. After the long duration tests, it was found that Sample-5 (Hybrid nanocomposite coating) did not fail even until 300,000 cycles after which the test was stopped due to the time constraint (10 h), whereas Sample-2 (CNT-nanocomposite coating) failed at about ~170,000 cycles. The typical frictional graph as shown in FIG. 20A and the corresponding photograph (FIG. 20B) of the wear track of the tested sample with the substrate completely exposed confirmed that Sample-2 could not survive under water as the coating was completely peeled off from the wear track. This can be attributed to the swelling of the polymer due to the water absorption resulting in the deterioration of the properties in case of Sample-2. However, Sample-5 (hybrid nanocomposite coating) did not fail even until 300,000 cycles (FIGS. 20C and 20D) as confirmed by EDS analysis on the wear track as shown in FIGS. 21A-21D where no peak of bare aluminum was observed and wear profile depth (~112 µm) was also much less than the coating thickness. This improvement in wear life is mainly attributed to the addition of C15A nanoclay which helps in reducing the water absorption by providing a torturous path for the diffusion of water molecules in the polymer matrix due to its platelet-like structure coupled with the presence of CNTs which provide the bridging/anchoring effect by holding the polymer chains together leading to an improvement in wear resistance as compared to that of the Sample-2. See Bagherzadeh et al. (2007); and Samad et al. (2016).

Figure 22:
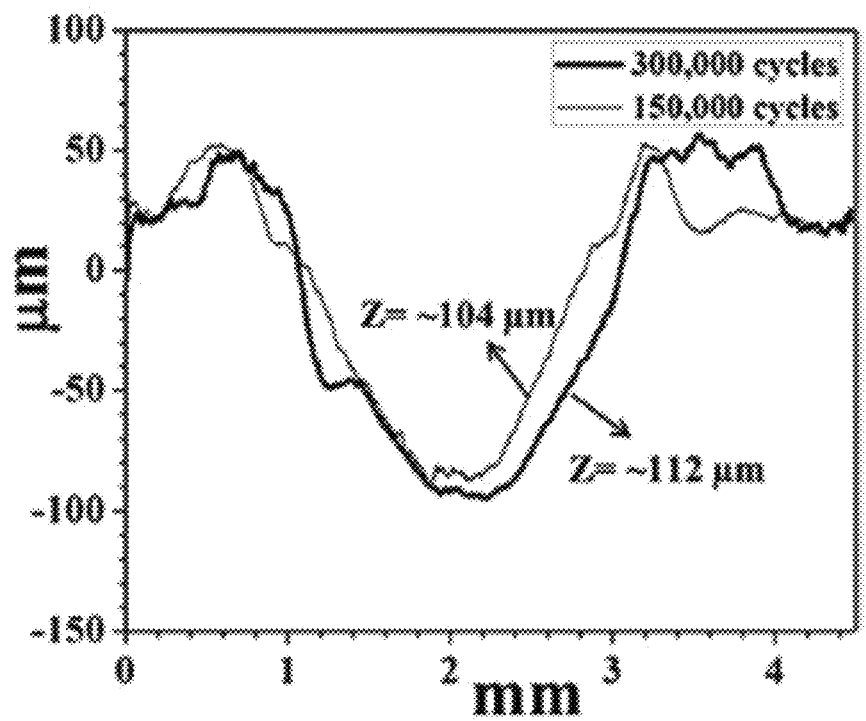
FIG. 22 shows the 2D-Optical wear profiles from wear tracks of Sample-5 (Hybrid nanocomposite) after sliding tests conducted under water for 150,000 and 300,000 cycles at a normal load of 12 N.

FIG. 22 compares the wear depth profiles of the hybrid nanocomposite coating (Sample-5) after the wear tests conducted for 150,000 and 300,000 cycles respectively at same normal load of 12 N under water. It can be observed that even though the number of wear cycles doubled, there is hardly any difference between the depth of the wear track showing the improved wear resistance of the hybrid nanocomposite coating and indicating that the wear life of the hybrid nanocomposite coating can go beyond 300,000 cycles at a normal load of 12 N.

In order to evaluate the impact of water on the overall hardness of Sample-2 (1.5 wt % CNT/UHMWPE nanocomposite) and Sample-5 (1.5 wt % CNT 1.5 wt % C15 A/UHMWPE hybrid nanocomposite), hardness measurements were carried out before and after the sliding test under water. From FIG. 23, it can be clearly seen that there was hardly any change (~2.5% decrease only) in hardness after the water lubricated test, indicating that the interaction of water with hybrid nanocomposite coating (Sample-5) did not deteriorate its mechanical properties leading to a significant improvement in its wear resistance as compared to CNT-nanocomposite (Sample-2) where a decrease of ~12% in hardness was observed because of possible absorption of the water. In case of Sample-2 (1.5 CNTs), the penetration depths were ~8 and ~10.5 µm under dry and wet conditions, respectively, whereas these values were ~7 and ~7.2 µm for Sample-5 (1.5CNT/1.5C15A) under dry and wet conditions, respectively, highlighting the role of C15A nanoclay in maintaining the mechanical properties under water conditions by improving the resistance of the coating to water absorption.

Figure 24A:
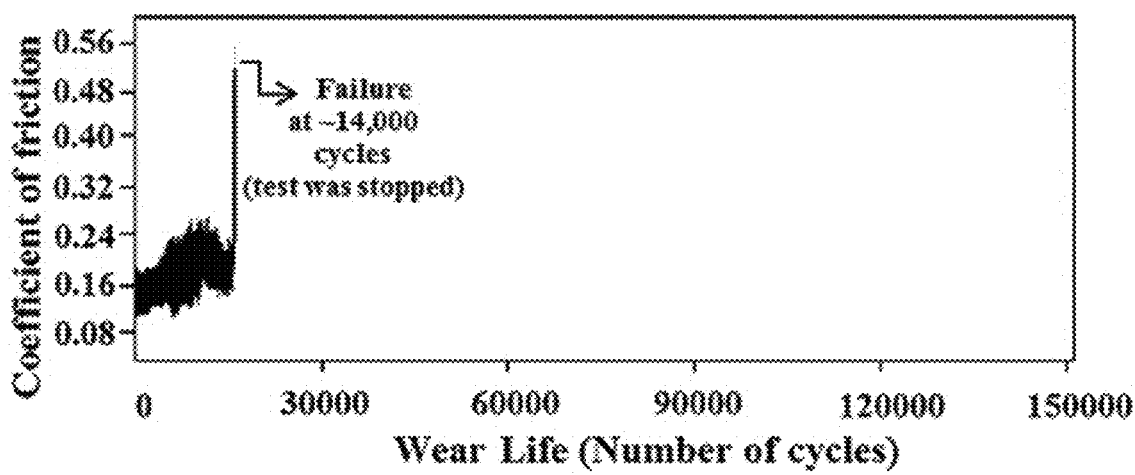
FIG. 24A shows a typical frictional graph of hybrid nanocomposite coating (Sample-5) after a sliding test performed at a normal load of 15 N under water at a linear speed of 0.1 m/s.
Figure 24B:
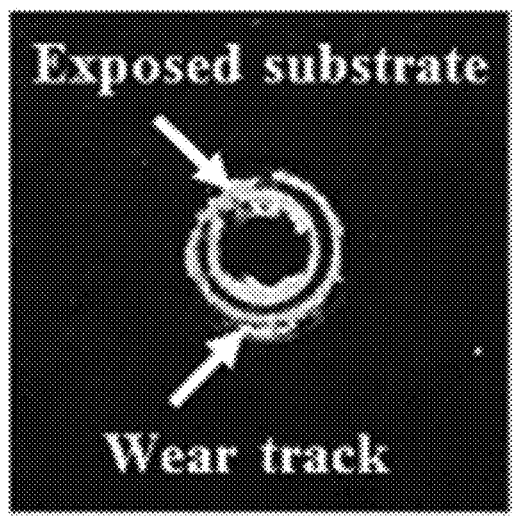
FIG. 24B is an image of the coated sample after the wear test of FIG. 24A.
Figure 24C:
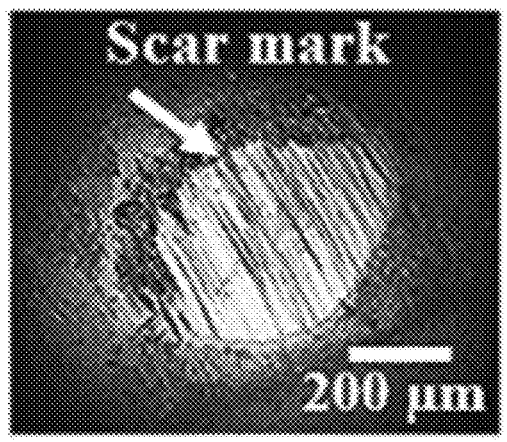
FIG. 24C is the surface of the counterface ball after the wear test of FIG. 24A and after cleaning with acetone.

To further evaluate tribological performance of the best coating (Sample-5) at higher load, sliding wear tests were performed with a normal load of 15 N under water for 150,000 cycles (Sliding distance=1.9 km) at a linear speed of 0.1 m/s (480 rpm) and wear track radius of 2 mm. At a normal load of 15 N, hybrid nanocomposite coating showed an average wear life of only 14,000±1,600 cycles after which the test was stopped. A typical COF graph is shown in FIG. 24A, and the exposed substrate on the coated samples (FIG. 24B) and scar mark on counterface ball (FIG. 24C) clearly indicate the failure of the coating.

Figure 25A:
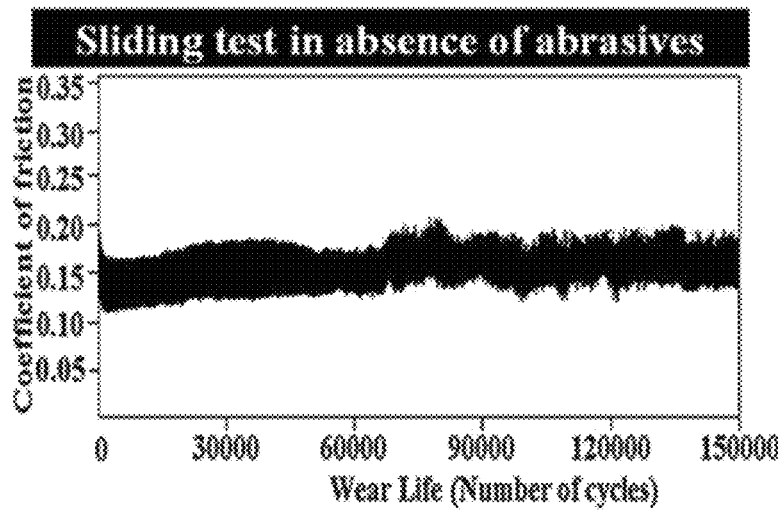
FIG. 25A is typical frictional graph of 1.5 wt % CNT/1.5 wt % C15A/UHMWPE hybrid nanocomposite coating with a 12 N normal load, a linear sliding speed of 0.1 m/s, water lubricated conditions, and without abrasive particles.
Figure 25B:
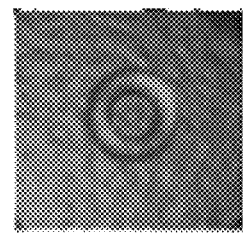
FIG. 25B show the wear track produced in FIG. 25A.
Figures 25C, 25D:
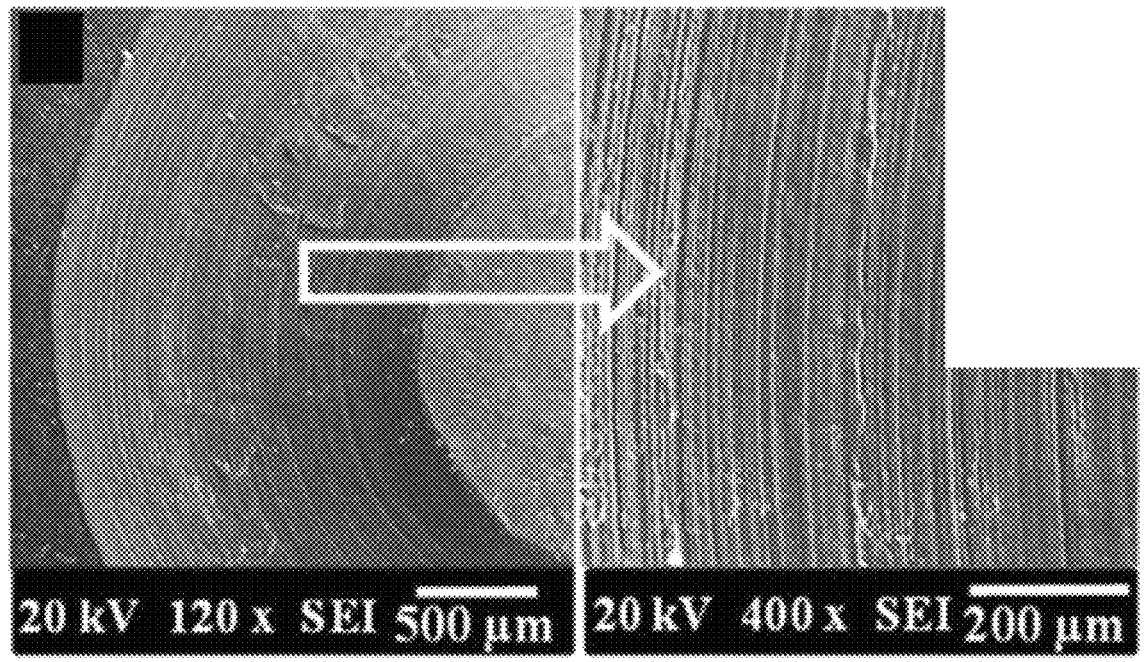
FIG. 25C shows an SEM image of the wear track produced in FIG. 25A.
FIG. 25D shows a zoomed-in SEM image of the wear track produced in FIG. 25A.
Figure 25E:
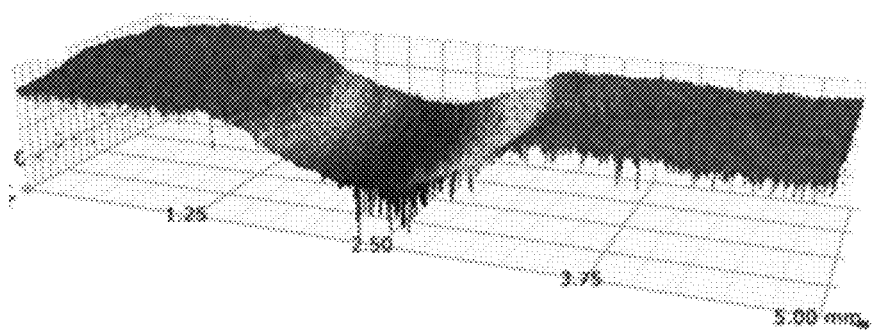
FIG. 25E shows a 3D optical profile of the wear track produced in FIG. 25A.
Figure 25I:
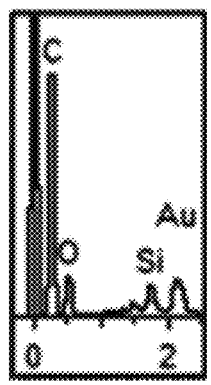
FIG. 25I is a depth profile of the wear track produced in FIG. 25A.
Figure 25I:
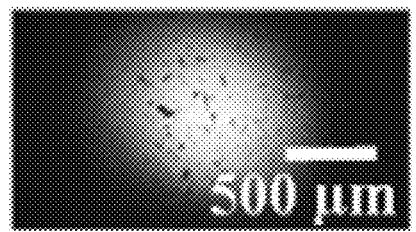
Figure 25I:
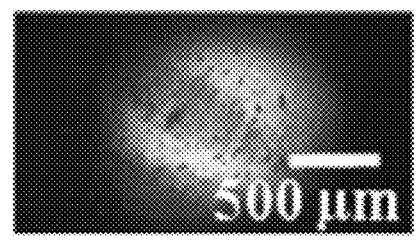
Figure 25I:
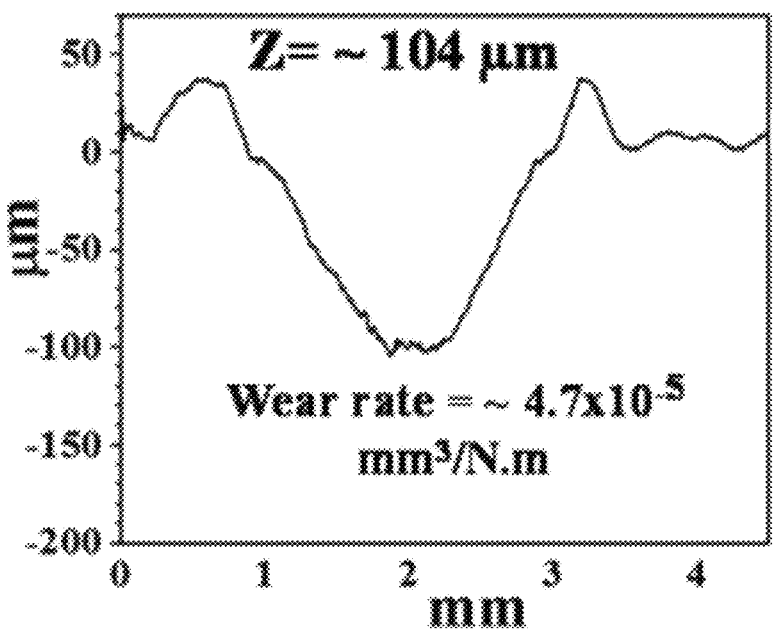

Tribological Evaluation of the Coatings Under Water in the Presence of Abrasive Particles After testing the tribological performance of the coatings under water, the most wear resistant coating such as Sample-5 (1.5 wt % CNT/1.5 wt % C15 A/UHMWPE) was evaluated for its tribological performance under water in the presence of hard abrasive particles such as SiC at a normal load of 12 N for a duration of 150,000 cycles (sliding distance=1.9 km), at a linear speed of 0.1 m/s (480 rpm), and a wear track radius of 2 mm. FIGS. 25A and 25J compare the typical frictional graphs of Sample-5 in the presence and absence of abrasives, respectively. FIGS. 25C and 25L compare SEM images of wear tracks at lower (120×) magnification in the presence and absence of abrasives, respectively, with FIGS. 25D and 25M showing respective SEM images at higher magnification (400×). FIGS. 25E and 25N show 3D optical profile images of wear tracks in the presence and absence of abrasives, respectively, with FIGS. 25I and 25R showing respective profile depths of the wear tracks. The data of FIGS. 25A-25S were acquired from wear tests with normal load of 12 N and linear sliding speeds of 0.1 m/s for 150,000 cycles under water lubricated conditions with the presence or absence of abrasive particles.

It is clearly observed from FIGS. 25A-25S that the hybrid nanocomposite coating (Sample-5) in both cases (with/without abrasives), survived until 150,000 cycles as confirmed by EDS analysis on the wear track as shown in insets of FIGS. 25F and 25O where no peak of bare aluminum substrate was observed. The wear profile depths in both cases were also much less than the coating thickness. However, it is interesting to note that wear profile depth of the coating was less (~80 µm) in case of the sliding test with abrasives as compared to the sliding test without abrasives, where wear profile depth was found to be ~104 µm. This is attributed to the strengthening of the polymer coating due to the embedment of abrasive particles in the softer polymer as indicated by the silicon (Si) peak (appearing at 1.49 keV) in the EDS spectrum on the wear track, which further helps in providing an enhanced anchoring effect of the polymer chains leading to an improvement in the resistance to their easy pull-out. A similar observation was made by Ezzat et al. wherein the wear rate of a polymer coating was reduced in the presence of abrasives. See Ezzat A A, Mousa M O, Ali W Y. Influence of Aluminum oxide nanofibers reinforcing polyethylene coating on the abrasive wear. Frict Wear Res 2016; 4:1-13.

However, it is to be noted that the hybrid nanocomposite coating is developed for the protection of both the surfaces in a tribo pair against wear and tear. It can be observed from the optical images of the counterface ball with/without abrasives as shown in FIGS. 25H and 25Q that the ball was severely abraded from sliding against the hybrid nanocomposite coating in the presence of abrasives as compared to when sliding against the coating in the absence of the abrasives.

Scratch Test Results

Scratch tests were conducted on the coatings to evaluate the effect of the nanofillers on the debonding strength. The four coatings selected were: Pristine UHMWPE, UHMWPE/1.5 wt % C15A nanocomposite coating, UHMWPE/1.5 wt % CNTs nanocomposite coatings (sample 2), and UHMWPE/1.5 wt % C15 A/1.5 wt % CNTs hybrid nanocomposite coating (sample 5). The critical load ($L_c$) was defined as the load at which the polymer coatings showed signs of failure such as peeling off/delamination and it was characterized by observing the difference in the acoustic emission (AE) % as measured by the scratch testing machine. FIG. 26A shows the comparison of the debonding strength of the coatings in terms of "$L_c$" at which they started to peel-off. FIGS. 26B-26E show the acoustic emission graphs corresponding to the applied progressive load where the debonding of the coating is represented by a sudden increment in the AE signal.

As can be observed from FIG. 26A, Sample-5 (UHMWPE/1.5 wt % C15A/1.5 wt % CNTs hybrid nanocomposite coating) showed the maximum scratch resistance as compared to all the other coatings as it did not fail even until a load of 30 N. It should be noted from the scratch results that the presence of both the nanofillers (Sample 5) enhanced the scratch resistance as compared to the presence of the individual nanofillers (UHMWPE/1.5 wt % C15A and Sample 2) or no nanofillers (Pristine UHMWPE) in the coating This is attributed to the advantageous loadings of both the nanofillers in the hybrid nanocomposite coating which provide an efficient bridging effect anchoring the polymer chains resulting in an improved resistance to the coating failure due to scratching.

Although the optical micrographs corresponding to AE graphs as presented in FIGS. 26B-26E show the failure of the coatings, SEM analysis along with EDS was also performed on the tested samples to confirm the failure of the coating. The SEM micrographs along with the corresponding EDS analysis spectrums are shown in FIGS. 27A-27L where an aluminum peak (from the substrate) in the EDS spectrums confirmed the failure of the coatings in case of pristine UHMWPE, UHMWPE/1.5 wt % C15A, and UHMWPE/1.5 wt % CNTs which verified the results of the optical images (FIGS. 26B-26E).

To summarize, generally, two major wear/failure mechanisms were observed during the tribological tests, namely; abrasive wear by ploughing action of the hard asperities of the counterface ball, and adhesive wear, which is signified by the material pull out. However, the severity of these mechanisms decreased by reinforcing the polymer matrix with advantageous loadings of nanofillers (CNTs and C15A). The Sample-5 (hybrid nanocomposite coating) as compared to all the other samples showed a very high wear resistance with mild abrasive wear due to plastic deformation. This can be attributed to the efficient bridging effect provided by both nanofillers which anchors the polymer chains together and prevents them from being pulled out easily from the matrix, as compared to other samples which showed complete failure due to material pull out. However, delamination, micro-chipping, and micro-cracking were the major failure mechanisms observed in the coatings during the scratch testing. It is to be noted that in case of pristine UHMWPE coating, the delamination occurred very easily due to the absence of reinforcements. The C15A/UHMWPE and CNTs/UHMWPE coatings showed some resistance against delamination but failed eventually. However, the Sample-5 did not show any delamination and failure even until a load of 30 N. This can be attributed to the efficient bridging effect provided by both nanofillers. This bridging effect anchors the polymer chains, making it difficult for the traversing of the scratch tip and hence prevents it from failing and delaminating.

Advantages

A UHMWPE hybrid nanocomposite coating reinforced with CNTs and nanoclay has been described for enhanced wear resistance under water. It was observed that the hybrid nanocomposite coating reinforced with 1.5 wt % CNTs and 1.5 wt % C15A nanoclay did not fail even until 300,000 cycles at a normal load of 12 N and a linear speed of 0.1 m/s under water. This improvement in wear life is mainly attributed to the addition of C15A nanoclay, which helps in reducing the water absorption by providing a torturous path for the diffusion of water molecules in the polymer matrix due to its platelet like structure coupled with the presence of CNTs, which provide a bridging/anchoring effect by holding the polymer chains together, leading to an improvement in wear resistance. Also, it showed hardly any change (~2.5% decrease only) in hardness after the water lubricated test as compared to the CNT-nanocomposite where a decrease of ~12% in hardness was observed because of possible absorption of the water in the absence of nanoclay. Furthermore, this hybrid nanocomposite coating showed excellent scratch resistance as it did not fail even when a progressive load of 30 N was applied. The hybrid nanocomposite coating also showed excellent tribological performance in the presence of hard SiC abrasives under water.

The invention claimed is:

1. A method for forming a nanocomposite coating on a substrate, comprising:
    mixing polyethylene microparticles with functionalized carbon nanotubes and nanoclay in an organic solvent to form a precursor mixture;
    heating the precursor mixture at a temperature in a range of 75-95° C. for 18-30 h to produce a dried precursor mixture; and
    applying the dried precursor mixture to the substrate heated at a temperature in a range of 160-200° C. to form the nanocomposite coating,
    wherein the nanocomposite coating comprises functionalized carbon nanotubes and nanoclay dispersed within a polymeric matrix.

2. The method of claim 1, further comprising sonicating the functionalized carbon nanotubes and nanoclay in the organic solvent prior to the heating.

3. The method of claim 1, wherein the polyethylene microparticles have a mean diameter in a range of 20-120 μm.

4. The method of claim 1, wherein the polyethylene microparticles consist essentially of UHMWPE.

5. The method of claim 1, wherein the nanoclay is in the form of nanoplatelets having an average diameter in a range of 5-20 μm.

6. The method of claim 1, wherein the nanoclay comprises montmorillonite modified with a quaternary ammonium salt.

7. The method of claim 1, wherein the functionalized carbon nanotubes have an average diameter in a range of 15-35 nm.

8. The method of claim 1, wherein the applying includes electrostatically spraying the dried precursor mixture onto the substrate.

9. The method of claim 1, further comprising heating the substrate at the temperature in a range of 160-200° C. for a period of 15-60 min immediately following the applying.

10. The method of claim 1, wherein the nanocomposite coating consists essentially of UHMWPE, nanoclay, quaternary ammonium salt, and functionalized carbon nanotubes.

11. The method of claim 1, wherein the nanocomposite coating comprises:
    0.5-5 wt % nanoclay, and
    0.5-5 wt % functionalized carbon nanotubes, each relative to a total weight of the nanocomposite coating.

12. The method of claim 1, wherein forming the coating does not include silanizing, and the nanocomposite coating does not comprise any silanes.

13. The method of claim 1, wherein the substrate comprises at least 97 wt % Al metal relative to a total weight of the substrate.

14. The method of claim 13, wherein the substrate is planar and has a thickness in a range of 1-20 mm.

15. The method of claim 1, wherein the nanocomposite coating has an average thickness in a range of 100-250 μm on the substrate.

16. The method of claim 1, wherein the nanocomposite coating has a Vickers hardness in a range of 10.5-12.5 HV.

17. The method of claim 1, wherein the nanocomposite coating, after being in contact with water for a time of 8-18 h, has a Vickers hardness that is decreased by 0.01-4% compared to a Vickers hardness before being in contact with water.

18. The method of claim 1, wherein the substrate has a profile roughness parameter arithmetic average, $R_a$, in a range of 0.30-0.50 μm.

19. The method of claim 1, wherein the nanocomposite coating has a wear resistance against a sliding normal load of 8-20 N, wherein the wear resistance is 20-30 times a wear resistance of a substantially similar polyethylene coating that does not comprise nanoclay and functionalized carbon nanotubes.

20. The method of claim 1, wherein the nanocomposite coating has a debonding strength of at least 25 N.

* * * * *